United States Patent [19]

O'Connell

[11] Patent Number: 5,331,111
[45] Date of Patent: Jul. 19, 1994

[54] SOUND MODEL GENERATOR AND SYNTHESIZER WITH GRAPHICAL PROGRAMMING ENGINE

[75] Inventor: Steven S. O'Connell, Scotts Valley, Calif.

[73] Assignee: Korg, Inc., Tokyo, Japan

[21] Appl. No.: 967,163

[22] Filed: Oct. 27, 1992

[51] Int. Cl.⁵ .................. G09B 15/04; G10H 7/00
[52] U.S. Cl. ........................... 84/602; 84/645; 84/477 R; 84/478
[58] Field of Search ........... 84/477 R, 478, 600–608, 84/622–625, 645, 647, 659–661, DIG. 6

[56] References Cited

U.S. PATENT DOCUMENTS

| | | | |
|---|---|---|---|
| 4,833,962 | 5/1989 | Mazzola et al. | 84/478 X |
| 4,901,221 | 2/1990 | Kodosky et al. | |
| 4,945,804 | 8/1990 | Farrand | 84/478 X |
| 4,984,276 | 1/1991 | Smith | |
| 5,146,833 | 9/1992 | Lui | 84/477 R X |
| 5,237,124 | 8/1993 | Tabei | 84/477 R X |

OTHER PUBLICATIONS

Comdisco Systems, Inc., CGS-Code Generation System for SPW, Sep. 1990, pp. 1–4.

Digidesign, Turbosynth User's Manual Version 1.0, 1987, pp. 13–23.

Titchener, Paul F., A Computer Aided Environment for the Design of Digital Audio Products, published Sep. 21–25, 1990, at the 89th Audio Engineering Society Convention, pp. i–18.

*Primary Examiner*—Stanley J. Witkowski
*Attorney, Agent, or Firm*—Haynes & Davis

[57] ABSTRACT

An apparatus for generating sound includes a user input and a graphical programming engine which the user manipulates to generate and connect graphic symbols into a graphical model representative of a sound generating program on a display. A translation mechanism coupled with the graphical programming engine translates the graphical model into a sound generating program, and a digital signal processor executes the sound generating program in response to user input to generate output data in real time representative of sound. This output data may then be coupled to a converter, amplifier and speaker to produce sounds in real time in response to modifications of the graphical model or in response to real time input data from a MIDI standard instrument.

49 Claims, 18 Drawing Sheets

FIG.—1

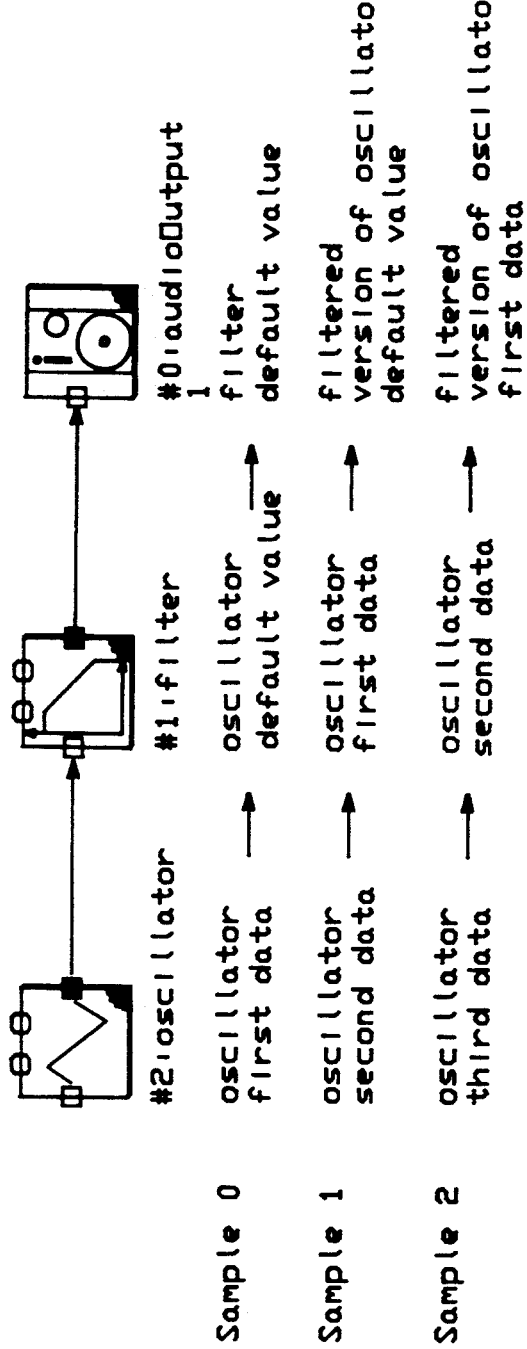
FIG.—5
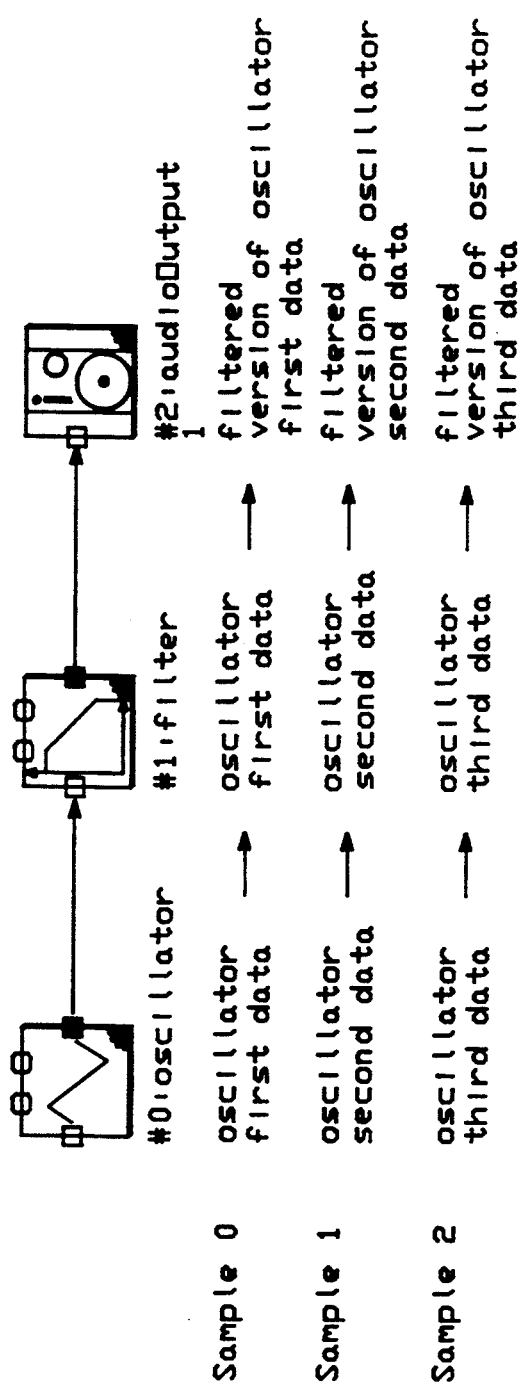
FIG.—6

Addin Block Diagram

Bow Table
(no curvature)
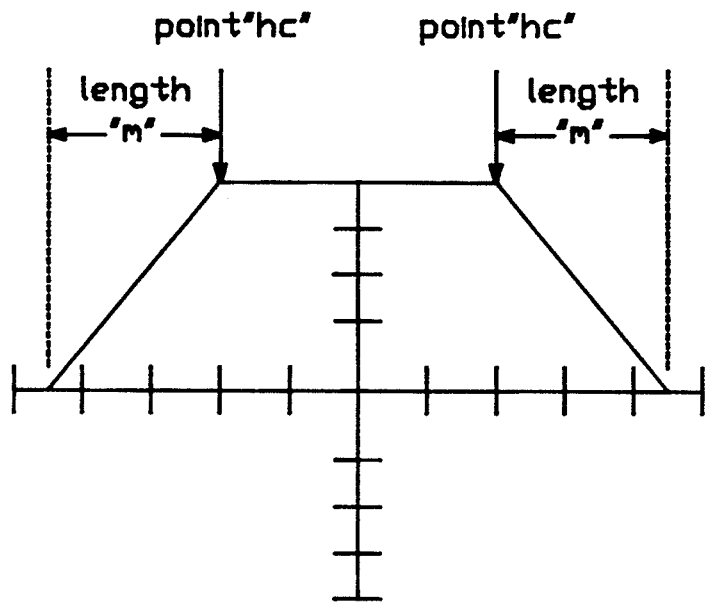
FIG.−9
Bow Table
(with curvature)
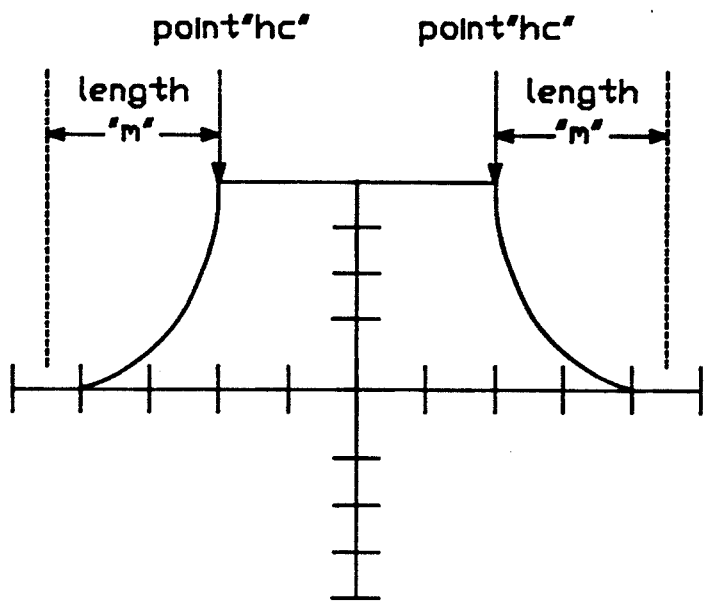
FIG.−10

Bow Block Diagram

Brass Block Diagram

Echo Block Diagram
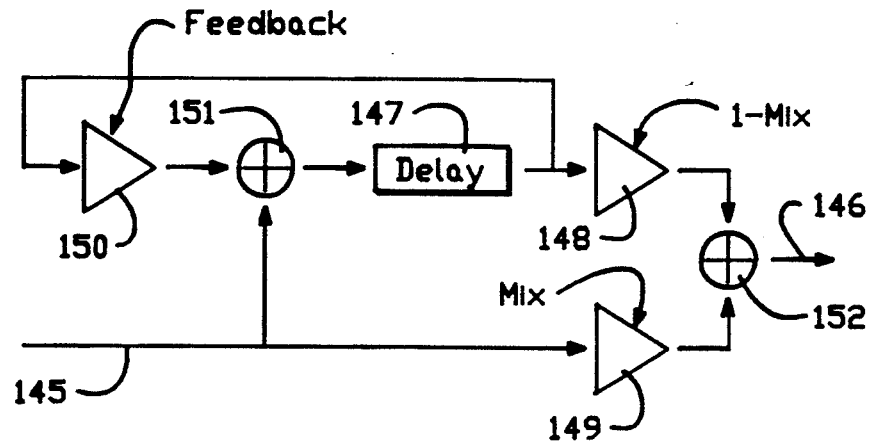
FIG.—13
Envelope Edit window
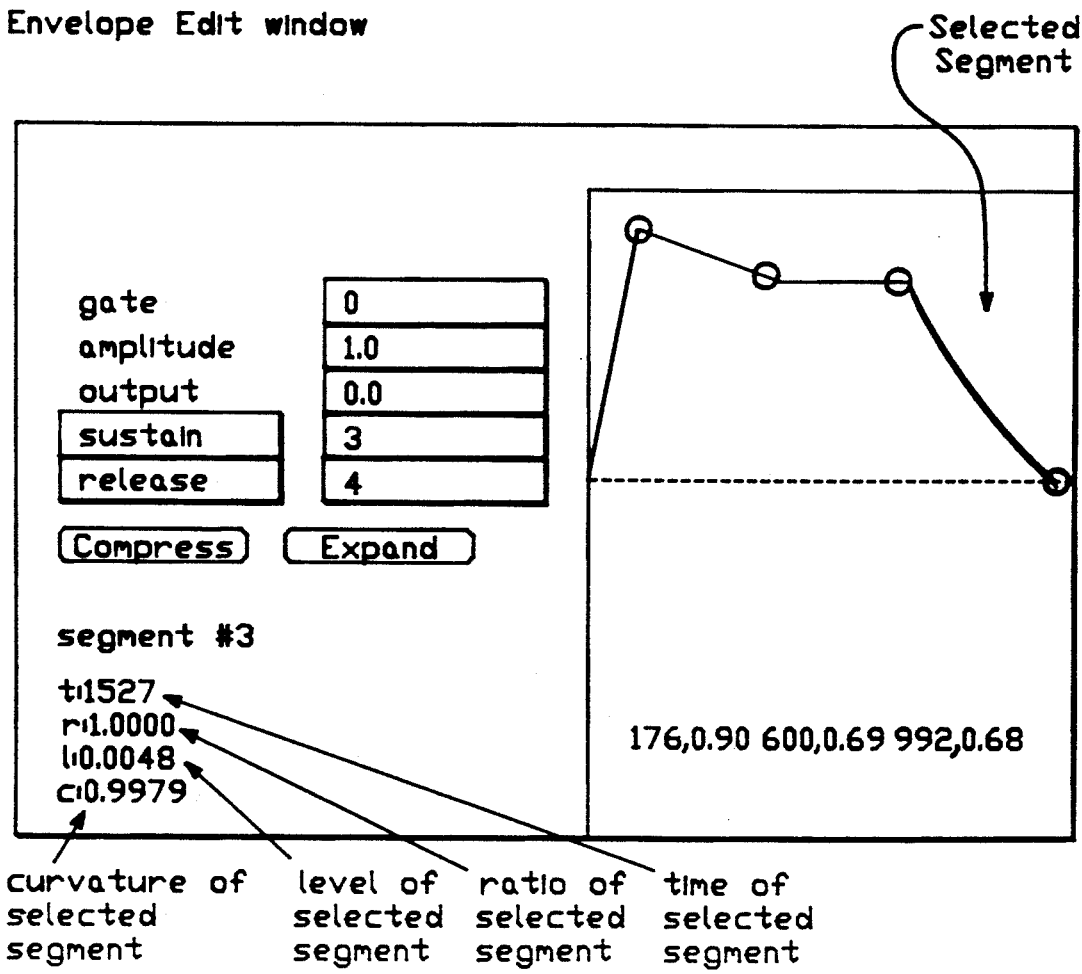
FIG.—14

Glottal 1 Diagram
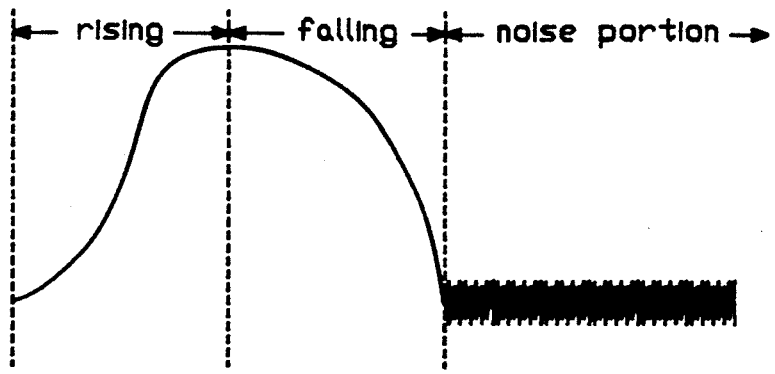
FIG.−15
Glottal 2 Diagram
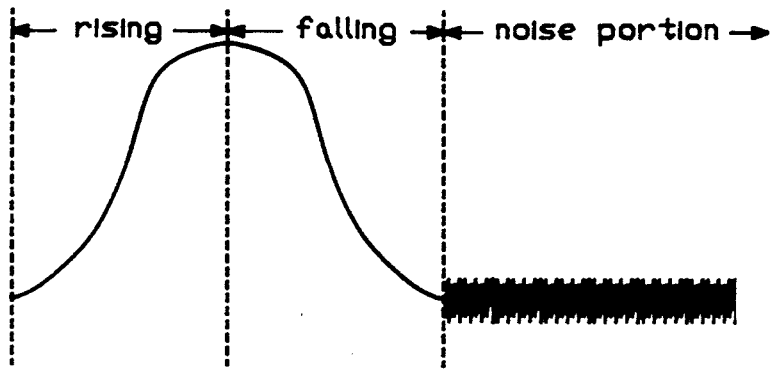
FIG.−16
Lattice Edit window
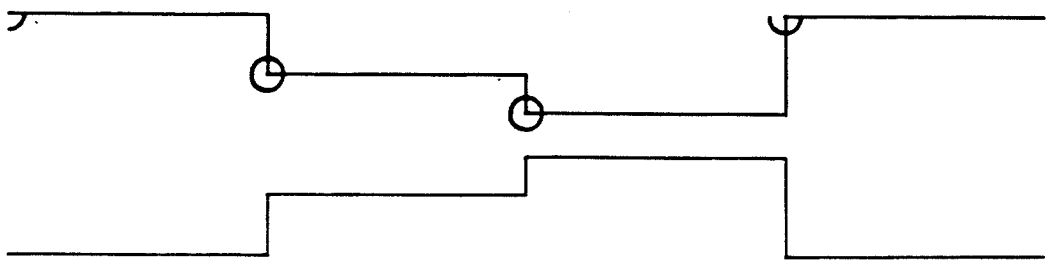
FIG.−17

Graphic Mixer Window
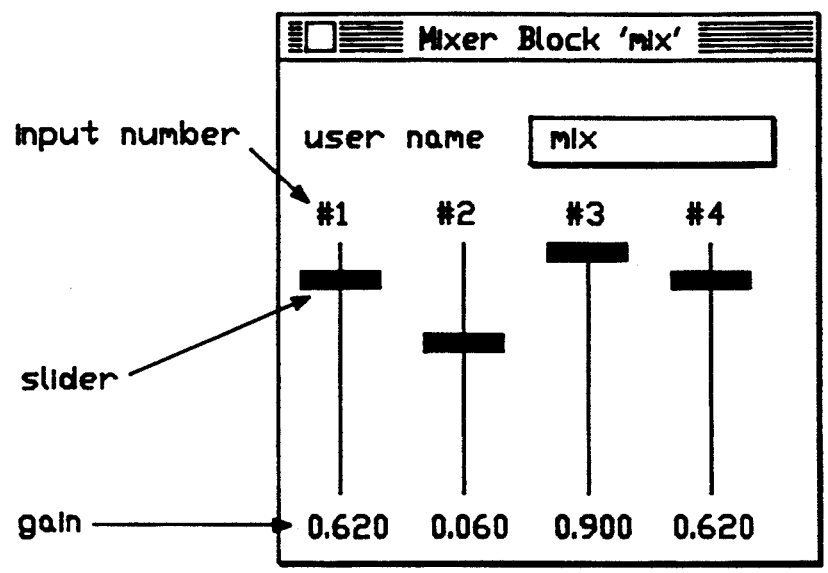
FIG.−18
Pan block diagram
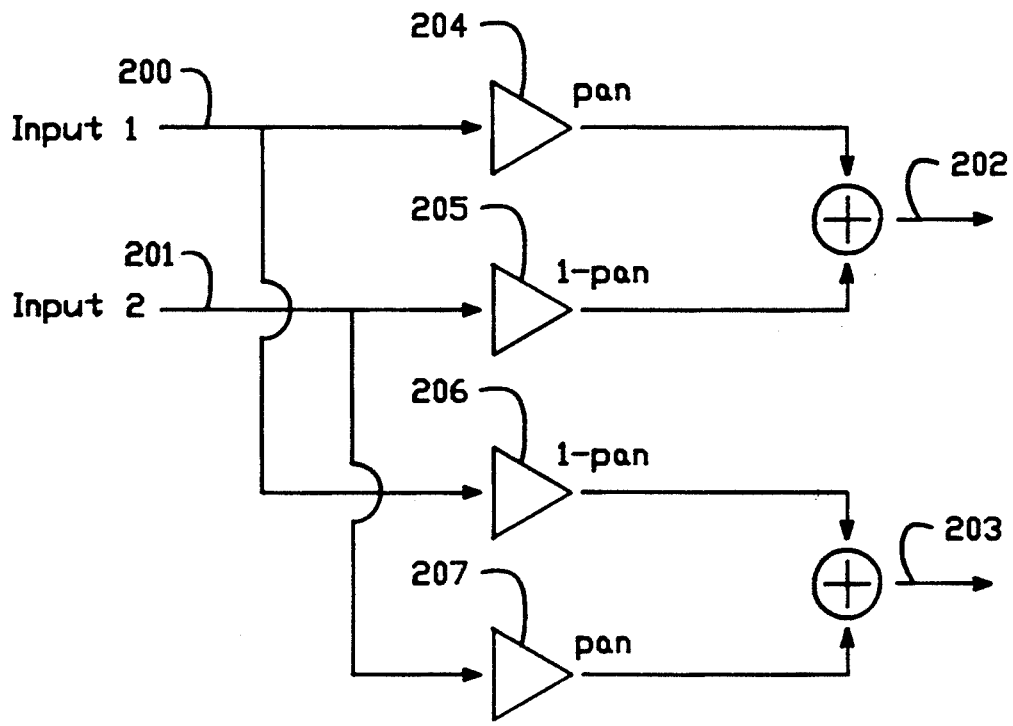
FIG.−19

Reed Block Diagram

Reed Table (no curvature)

Reed Table (with curvature)

SOUND MODEL GENERATOR AND SYNTHESIZER WITH GRAPHICAL PROGRAMMING ENGINE

LIMITED COPYRIGHT WAIVER

A portion of the disclosure of this patent document contains material to which the claim of copyright protection is made. The copyright owner has no objection to the facsimile reproduction by any person of the patent document or the patent disclosure, as it appears in the U.S. Patent and Trademark Office file or records, but reserves all other rights whatsoever.

BACKGROUND OF THE INVENTION

1. Field of the Invention

The present invention relates to music synthesizers, and more particularly to synthesizers based on digital signal processing in response to sound generating programs, and to methods and work stations for creating such sound generating programs.

2. Description Of the Related Art

There is a growing trend in the music synthesizer industry to synthesize sounds using sound generating programs executed by digital signal processors. The sound generating programs are based upon computational models of musical instruments, the human voice, or other sound source. Thus, the developer of a sound generating program typically first defines a computational model of the sound source he/she desires to create, and then writes a computer program to execute the model. Prior art examples of such sound generating programs are described in U.S. Pat. No. 4,984,276, invented by Julius O. Smith, entitled "DIGITAL SIGNAL PROCESSING USING WAVE GUIDE NETWORKS".

However, the typical user of a music synthesizer may not be skilled in programming digital signal processors. Thus, the trend towards developing sound generating programs has been hampered by the long learning curve required for musicians who desire to use this technique.

Also, in the development of a computational model of a source of sound, often involves trial and error. The process of trial and error is quite difficult when in order to modify a computational model, one must go to the source code of a computer program and modify it, recompile the modified computer program and execute it, before the developer of the model can listen to the results of the modification.

Finally, the sound generating programs which are developed using the prior art techniques, are unique to a single system. Thus, when the developer of the sound generating program wants to execute his/her model on a different system, a completely new program must be written.

Accordingly, there is a need for a system for creating models of musical instruments or other sources of sound for use with music synthesizers which is powerful, easy to use, and results in models that are portable across a number of systems.

SUMMARY OF THE INVENTION

The present invention provides a work station for developing a model of a sound generating program, and for generating sound using the model which simplifies the development process, allows the developer to receive essentially real time feedback concerning modifications of a model, and results in a portable specification of a sound generating program.

The invention can thus be characterized as an apparatus for generating sound including a graphical programming engine which the user manipulates to generate and connect graphic symbols on a display into a graphical model representative of a sound generating program. A translation mechanism coupled with the graphical programming engine translates the graphical model into a sound generating program, and a digital signal processor under host computer control executes the sound generating program in response to user input to generate output data in real time representative of sound. This output data may then be coupled to a digital-to-analog converter, amplifier and speaker to produce sounds in real time.

The user input devices include a standard alphanumeric keyboard and a mouse for generating a connecting the graphic symbols into a graphical model, and may include other instruments for supplying input data to the processor for execution of the sound generating program, such as MIDI standard keyboards or other music oriented input devices.

According to one aspect of the invention, the graphical model is characterized in a host processing system by an ordered list of object names, with associated parameters, such that each member of the ordered list corresponds to a symbol on the graphic model, and the parameters associated with the object names specify variables of the object and connections between the objects. A set of function code segments corresponding to the object names is stored by the host computer. A macro preprocessor selects function code segments in response to the ordered list and establishes connections for communication of data between the function code segments. A compiler compiles the selected function code segments generated by the preprocessor into an executable sound generating program.

The sound generating program may also include code segments that are executed by the host processing system in combination with segments executed by the digital signal processor.

The graphical programming engine according to another aspect of the invention includes at least one controllable data source symbol which is representative of input data having a controllable value selected by the user. For instance, the data source symbol may represent a slide switch or a knob which the user can position using a mouse or other tool for manipulating a graphical symbol on a display. The data thus indicated by the user is then directed as a source of data into the sound generating program in real time so that the developer of the model has control of selected parameters with real time feedback. Also, the data source symbol may represent a source of data from a MIDI standard input device or other input device, allowing the user to play the modeled program as a real time instrument.

The ordered list of object names and associated parameters, and the graphical model from which the ordered list is derived, provide a portable specification of the sound generating program. A set of function code segments, a preprocessor and a compiler can be adapted for a specific target system, at a level below the ordered list of object names.

According to another aspect, the present invention can be characterized as a method for developing a sound generating program which comprises:

providing a set of object names with associated parameters, object names in the set representing a function used in generating sound and the parameters associated with objects in the set representing variables of the associated functions;

selecting a subset of the set of objects for execution by the sound generating program, the set of objects including an object representing a real time audio output function and an object representing a real time input data function;

specifying connections among members of the subset to identify sources and destinations of data to be generated by the associated functions;

specifying an order of execution for the functions associated with members of the subset; and setting the parameters for members of the subset to establish an instantiation of the sound generating program.

Using a graphical programming engine as described above, the step of selecting a subset of the set of objects, in the method for developing a sound generating program includes:

providing a set of graphical symbols representing the objects in the set of objects;

selecting graphical symbols from the set of graphical symbols; and positioning the graphical symbols on a display.

Because the preprocessor and compiler are automatic, the developer of the model is relieved of the advanced programming details necessary to execute a model under development. This allows the developer to test a model in essentially real time, notwithstanding short delays involved in preprocessing and compiling a graphical model when structural changes to the model under development are made.

Other aspects and advantages of the present invention can be seen upon review of the Figures, the detailed description in the claims which follow.

BRIEF DESCRIPTION OF THE DRAWINGS

FIGS. 5 and 6 are used to illustrate a manner in which the order of operations are specified according to the present invention.

FIGS. 9 and 10 illustrate the tables used with the bow model function.

FIG. 13 is a block diagram of the Echo function block.

FIG. 14 is an example of the envelope edit window for use with the Envelope function block.

FIGS. 15 and 16 are diagrams of glottal impulses used with the Glottal function block.

FIG. 17 is an example of the lattice edit window for use with the Lattice function block.

FIG. 18 is an example of the graphic mixer window for use with the Mixer function block.

FIG. 19 is a block diagram of the Pan function block.

DETAILED DESCRIPTION

Figure 1:
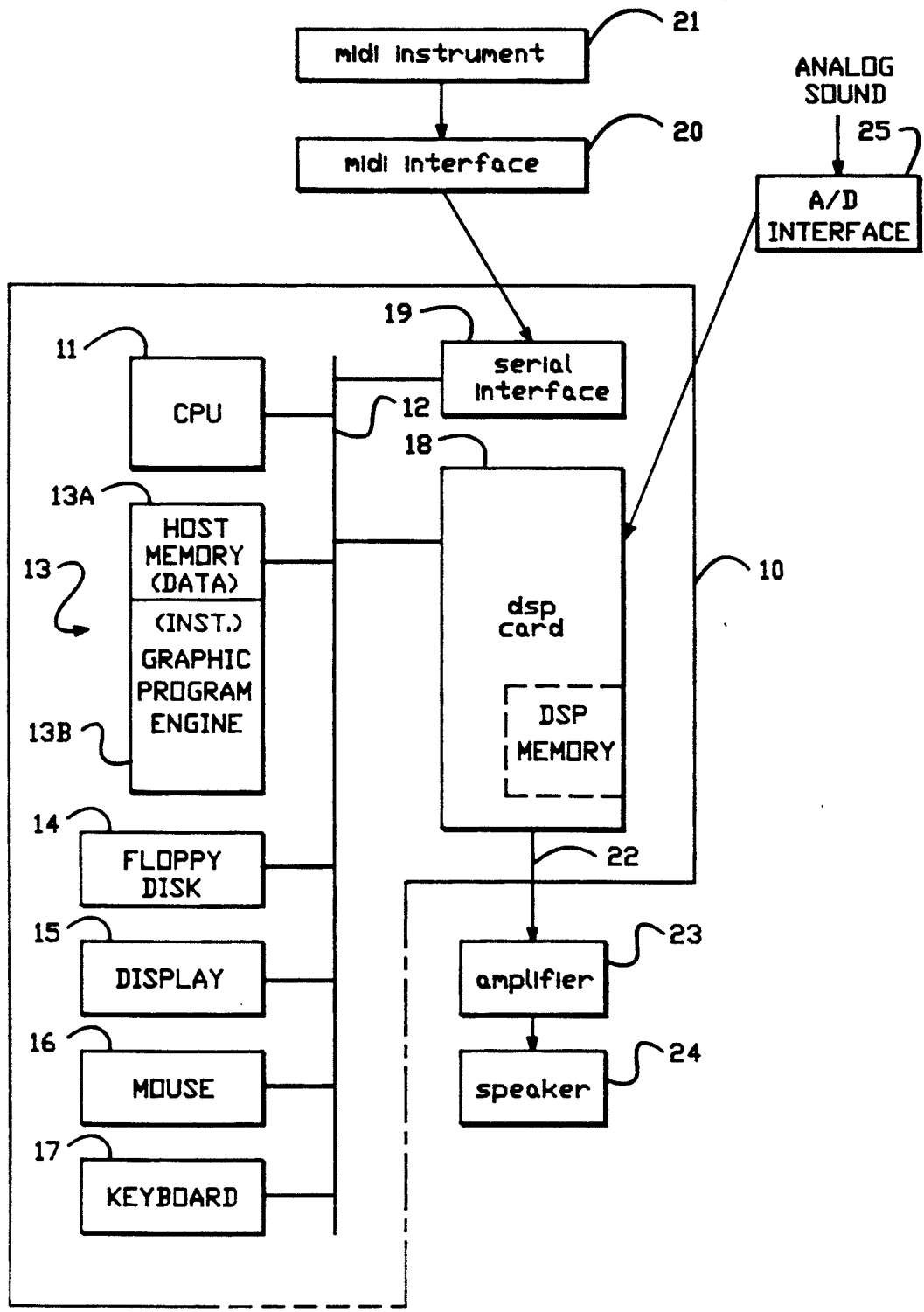
FIG. 1 is a schematic block diagram of a synthesizer with a graphic programming engine according to the present invention.
Figure 2:
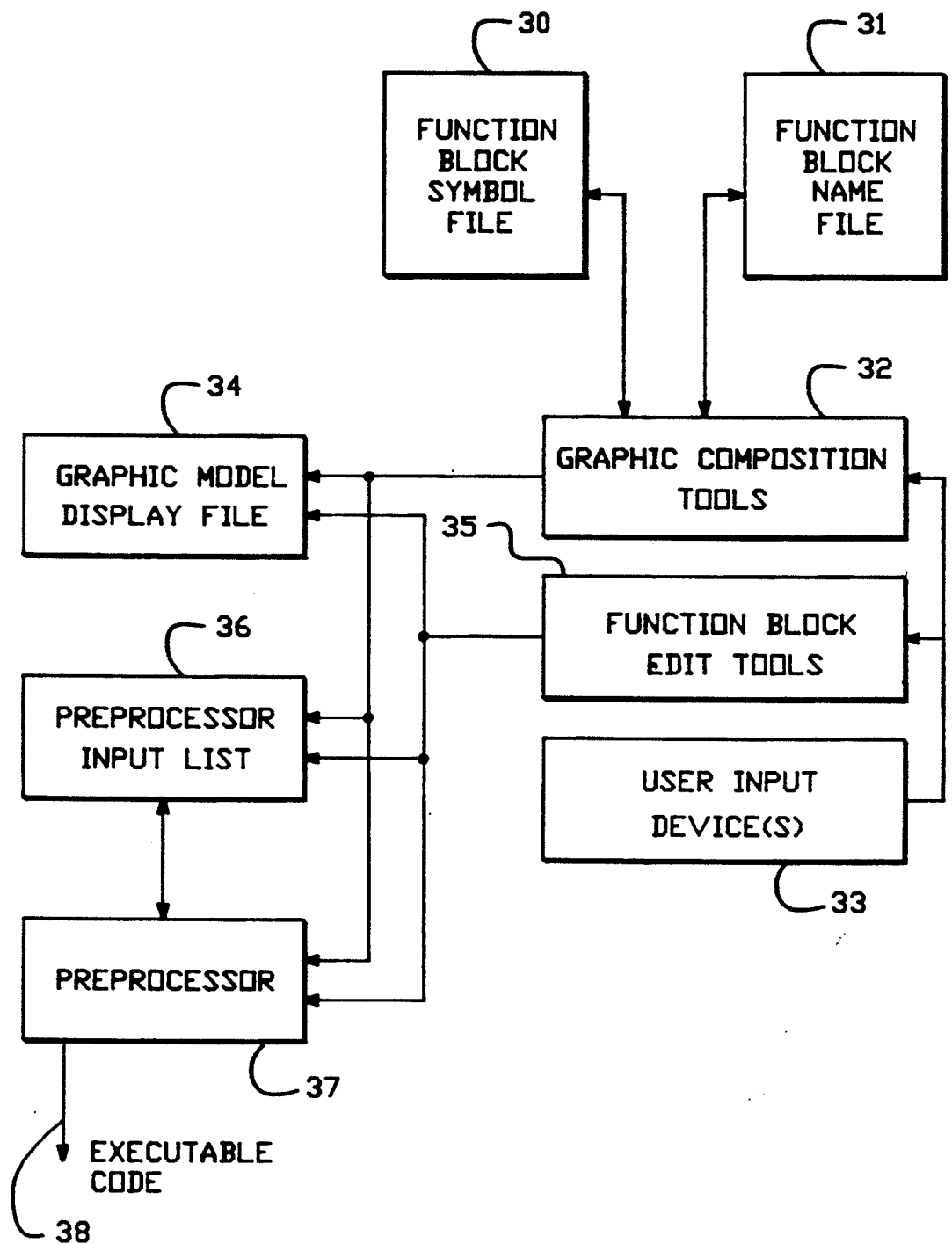
FIG. 2 is a functional block diagram of the graphic programming engine according to the present invention.
Figure 3:
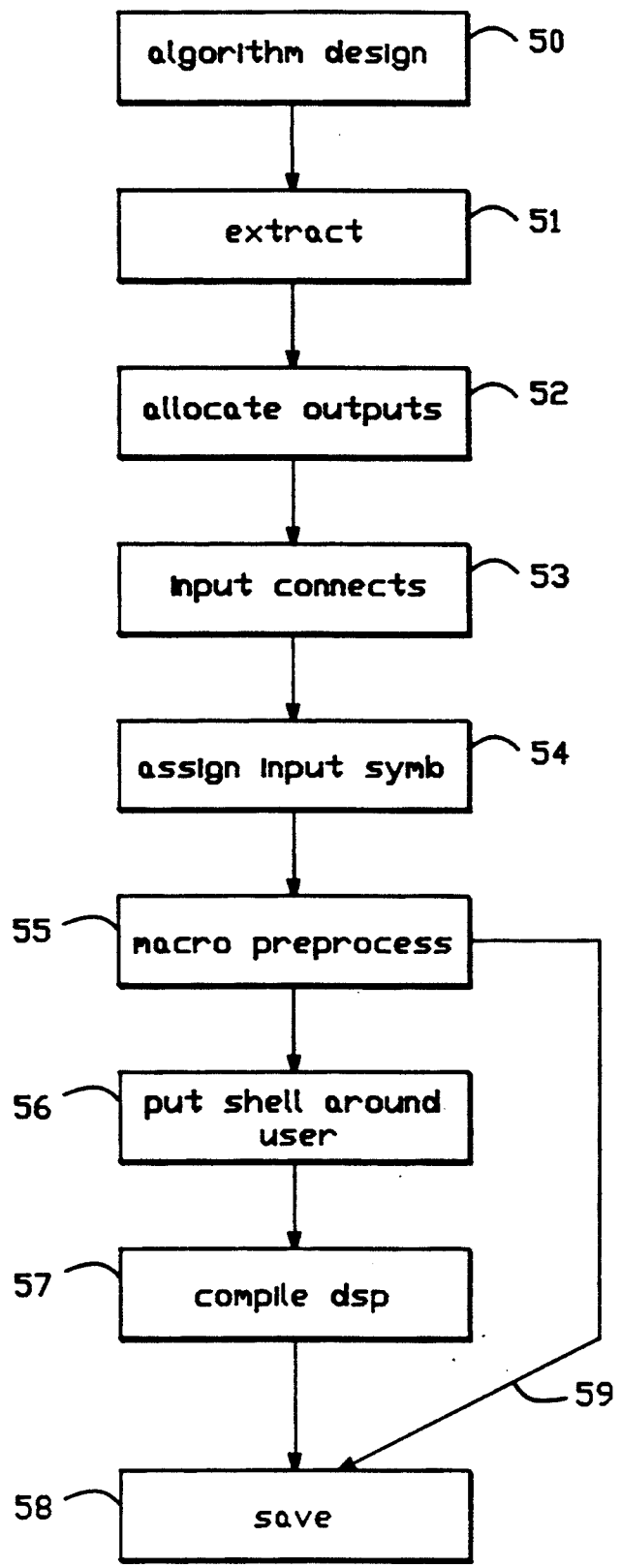
FIG. 3 is a flow chart of the compile process for use with the graphic programming engine according to the present invention.

A detailed description of the preferred embodiments of the present invention is provided with respect to the Figures. FIG. 1 provides a hardware system block diagram. FIGS. 2 and 3 provide a functional block diagram of the graphical programming engine. FIGS. 4–23 illustrate a preferred embodiment of the tools and function blocks used with the graphic programming engine. FIGS. 24–28 provide examples of models created using the tools and function blocks described with respect to FIGS. 4–23.

FIG. 1 illustrates an apparatus for generating sound using a graphic programming engine. The apparatus includes a host computer 10, such as a Macintosh II family (or Quadra) computer manufactured by Apple Computers of Cupertino, Calif. The host system 10 includes a central processing unit 11, coupled to a host system bus 12. A display 15 and user input devices, such as a mouse 16 and an alpha-numeric keyboard 17, are connected to bus 12. The host system bus is coupled to host memory 13 which includes data memory 13A and instruction memory 13B. The memory 13 holds the graphic programming engine according to the present invention.

The host computer 10 is also coupled to a digital signal processor 18, such as the Digidesign Sound Accelerator board including a Motorola 56000 DSP, for executing programs generated by the graphic programming engine in real time.

A serial interface 19 is also coupled to the host system bus 12. The serial interface 19 is connected to a MIDI interface 20 for connection to an MIDI controller 21, such as a keyboard, in a preferred embodiment. The MIDI controller allows the user to provide input to the sound generating program according to the MIDI standard. The host computer also includes software for managing the MIDI interface, such as the MIDI manager and MIDI driver code available with the Macintosh computer.

The digital signal processor card 18 includes an on-board digital to analog converter which supplies output sound signals on line 22. These signals on line 22 are coupled to an amplifier 23 and a speaker 24 for the real time production of sound by the system.

Also coupled to the host system bus 12 is a floppy disk drive 14, so that models generated using the graphic programming engine may be stored on a removable medium for transfer to other systems. The system also includes a hard disk drive (not shown). Obviously other techniques may be used for transferring models generated using the programming engine as known in the art. Also, an optional analog to digital interface 25 for importing sound from other sources may be coupled to the system, such as through the DSP card 18, for use in executing certain types of sound generating programs according to the present invention.

FIG. 2 is a functional block diagram of the graphical programming engine. The engine includes a function block symbol file 30 and a function block name file 31. The function block symbol file consists of a plurality of graphical symbols (icons) corresponding to segments of code, or objects, for executing a specific function. A name and parameter list for each of the segments of code is included in the function block name file 31. The name of the function block, associated with parameters of the function, uniquely specifies the object to be executed. Thus the block name file 31 includes a name, and a prespecified set of arguments for each function block having in some cases a variable number of arguments (see, Grow Tool below).

The function block symbol file 30 and the function block name file 31 are coupled to graphic composition tools 32 which are executed by the host computer in response to user input supplied through user input devices 33. Graphic composition tools include a menu showing function block symbols, and tools for positioning and connecting the symbols on a display system. These tools 32 are used for composing a graphic model in a graphic model display file 34, which corresponds to the symbols and connections which are being displayed on the display of the host system.

As the graphic model is composed using the graphic composition tools 32, a preprocessor input list 36 is compiled using the function block name file 31, and connections between the function blocks indicated in the graphic model display file 34.

The function block edit tools 35 are also coupled to user input devices 33, the graphic model display file 34, and preprocessor input list 36. The function block edit tools are used for setting the parameters of arguments associated with each object, in response to user input. These parameters include default values of data, names of function blocks, and other information such as that described in more detail below.

Thus, using the graphic composition tools 32 and the function block edit tools 35, a graphic model of a sound generating program is compiled in the graphic model display file 34. As it is compiled in the display file 34, it is displayed by the host system. The user manipulates the objects represented by the function blocks in the display file 34 to uniquely define a sound generating program in the format of a preprocessor input list 36.

The function block edit tools 35 also include tools for specifying an order of execution for the function blocks in the display file 34. The preprocessor input list 36 is thus an ordered list of function block names, and arguments associated with each name including input and output connections, to uniquely specify an object to be executed.

A preprocessor 37 is coupled to the preprocessor input list 36, the graphic composition tools and the function block edit tools. The preprocessor 37 is responsive to user commands to compose executable code 38 specified by the input list 36.

FIG. 3 illustrates the process of generating a program using the tools described in FIG. 2 on a system such as that shown in FIG. 1.

The first step includes algorithm design (block 50). This involves using the graphical user interface of the host system to arrange the blocks and connections of the blocks, and to use the function block edit tools to specify block parameters.

The next step includes extracting the macro preprocessor source text (block 51). This source text corresponds to the preprocessor input list 36 of FIG. 2.

For example, a simple algorithm may include a function block named "noise" and a function block named audioOutput. The arguments associated with the function block "noise" include an output destination, an amplitude parameter, a filter parameter, and a noise type (see description of the "Noise" function block below). The function block named audioOutput includes arguments for a source of the input data, an output channel to which the audio is to be supplied, and a type of audio output (see description of the "Audio Output" function block below). Thus, a simple source text for the preprocessor would be as follows:

```
#dsx OUTPUT 1
noise(OUTPUT,0.9,0.1,additive)
audioOutput(OUTPUT,1,type)
       © KORG 1992
```

This algorithm is simply a noise generator connected to a speaker audioOutput. There are four arguments for the Noise block. Here the amplitude parameter is 0.9, the filter parameter is 0.1 and the noise type is additive. The output is written to a memory location on the digital signal processor (DSP) specified by the #dsx command as OUTPUT. Thus the argument is a name of an associated memory location. The audioOutput block includes the parameters OUTPUT, the channel specification for channel 1, and a type specification "type". The "type" specification allows implementation of a number of different kinds of audio output function blocks. In systems that have only one type of audio output, this argument may be deleted. Thus, this preprocessor source text uniquely specifies an algorithm which generates noise according to the specified arguments and supplies the output data at a memory location OUTPUT. The data at DSP memory location OUTPUT is then coupled to an audio output function block which translates the data into an audio output format on channel 1.

The next step involves allocating memory for the output, table and sample symbols in the model (block 52). In this step, the preprocessor 37 determines a DSP or host address for block outputs, or reserves space for tables or samples used in the model. Each block output receives a unique address to which its output is written when calculated. The local variables assigned in the DSP chip are preferably written to register files within the DSPs themselves. Most modern DSPs include 256 or more internal high speed memory locations which can be used to pass data from one block to the next. This process is done as part of the macro preprocessor execution, to assign actual addresses to sources and destinations of data in the computational model.

The next step involves assigning input symbols to the connected inputs of blocks on the graphical model (block 53). If a block's input is connected to another block's output, that input is given the same address as a source of data as the connected block's output destination. Thus, the noise block output goes to address OUTPUT, and audio output block input is received from the address OUTPUT. In this manner, connections are made between blocks. A block with an output writes its result to a unique location. Blocks connected to this output read this same location when they need to process their inputs.

The next step accomplished during the macro preprocessor execution involves allocating constant symbols for unconnected inputs (block 54). If a block input is unconnected, space is reserved for a constant specified as a block parameter. For example, if a cutoff input to a filter block is unconnected, a default value for that port is used by the function, and space is reserved for the constant.

In the next step, the preprocessor 37 performs macro substitution and host function assembly (block 55). The macro preprocessor replaces the predefined text strings with other strings from a file of function code blocks which correspond to the function names in the preprocessor input list.

As a result of this process, the macro preprocessor may insert arguments into a result. For the example above, the noise block would look something like the following, where lines beginning with a ";" are comments, lines beginning with "#" are macro preprocessor functions, the "@=" symbol is a variable indicating the arguments of the function block, and other lines are part of the actual code for the block.

```
;noise
#if TYPE == 0
noise_additive(@=)
#else if TYPE == 1
noise_length17(@=)
#else if TYPE == 2
noise_length23(@=)
#else if TYPE == 3
noise_mac(@=)
#else
# error noise type
#endif
                    © KORG 1992
```

This string of text parses out the options for the noise block specified by the type parameter. As indicated in the example, the noise type is additive, which is represented by a 0 in the string shown. As can be seen, other noise types include length 17 noise, length 23 noise, mac noise. If it is not one of these four noise types, then an error signal is generated.

This string is further replaced by the noise_additive block below. The first preprocessor line determines whether the OUTPUT address resides in host memory. If it does reside in host memory, then the routine noiseAdditive host routine is selected. Otherwise, the digital signal processor routine is selected. The results of a noise generating routine called Noize (0:1) after "OR" with 1 to guarantee the least significant bit is always 1, are loaded in DSP memory location @_noise. Then a 56000 code block for manipulating the data is inserted. The next sequence of preprocessor functions parse out the filter parameter of the noise block. If first line determines if the filter parameter is not a number or if it is not equal to 1.0. If the filter parameter is 1.0 or not a number, then the filter routine is trivial, else a filter routine is inserted and the parameter from the input list is inserted in the routine. Then the code for implementing the filter is inserted.

```
;noise_additive
#if symbolh OUTPUT
# routine 1 noiseAdditive @=
#else
#dcx @_noise noize(0.1)|1
move x:@_noise,x0
move x0,a
lsl a
lsl a
add x0,a
move #1,x0
add x0,a
move a1,x:@_noise
move a1,x0
#if(notnumber FILTER) || (FILTER!=1.0)
; insert filter
; y[n]=filter*x[n]+(1−filter)*y[n−1]
# dsx @_output 1
# if symbolx FILTER
    move x:FILTER,y0
# else if number FILTER
# dcx @_filter FILTER
    move x:@_filter, y0
# else
#     error noise additive filter
# endif
    move x:@_output,x1
; filter calculations
    move x21,a
    mac −1,y0,a
    mac y0,x0,a
    move a,x0
    move a,x:@_output
#endif
```

Finally, the amplitude parameter is parsed in code for executing the amplitude parameters inserted as shown:

```
#if symbolx AMPLITUDE
    move x:AMPLITUDE,y0
#else if symbolh AMPLITUDE
# dsx @_amplitude 1
# routine1 connection AMPLITUDE,@_amplitude
    move x:@_amplitude,y0
#else if number AMPLITUDE
# dcx @_amplitude AMPLITUDE
    move x:@_amplitude,y0
#else
# error noise additive amplitude
#endif
; amplitude
mpy y0,x0,a
#if symbolx OUTPUT
    move a,x:OUTPUT
#else
# error noise additive output
#endif
#endif
        © KORG 1992
```

The audio output macro definition is carried out as follows:

```
; audio output
#if symbolx INPUT
    move x:INPUT,x0
#else if symbolh INPUT
#   dsx @_input 1
#   routine1 connection INPUT,@_input
    move x:@_input, x0
#else if number INPUT
#   dcx @_input INPUT
    move x:@_input,x0
#else
#   error audio output input
#   dsx @_input 1
#endif
    move x0,IO:IO_ADDROUT+CHANNEL
        © KORG 1992
```

The audio output routine involves determining whether the INPUT value is in the DSP memory, and if so moving the value of x at the input address, to x0. Else, if the input value resides in host memory, then a local variable is assigned in the DSP memory, and a connection is made from the host memory location to the local variable in the DSP memory. Then, the value of x at the local variable is moved to the location x0. This occurs, for instance, when the parameter is a value processed by the host, asynchronous to the DSP. The host routine is connected to the DSP routine by moving the parameter into the specified DSP location at a host update rate.

If the input is a number, then a constant is allocated at the local variable location, and that value is moved to the x0 location. Else an error has occurred. Finally, the code for executing the audio output involves moving the value at x0 to the IO channel.

It can be seen that the channel number is specified by a block of addresses which are sampled periodically by the system to supply output. Each channel number is specified by an offset from the IO_ADDROUT base address.

Given this input, the output of the macro preprocess block 55 is as follows:

```
; noise
; noise_additive
    move x:1,x0
    move x0,a
    lsl a
    lsl a
    add x0,a
    move #1,x0
    add x0,a
    move a1,x:1
    move a1,x0
    move x:2,y0
    ; amplitude
    mpy y0,x0,a
    move a,x:0
    ; audio output
    move x:0,x0
    move x0,x:$300+0
        © KORG 1992
```

This last result is code for the Motorola 56000 DSP on the digital signal processor board ready to be compiled.

In this particular example, there is no host function specified. The macro preprocessor can pick all host functions, such as the #routine1 noiseadditive . . . , as meaning that a host function is to be done. The function type and its arguments are added to a list of host functions in a manner similar to that described above, which are to be executed during execution of the model and sampled by the DSP at a specified host update rate. In the Macintosh, the hardware timer is used to service the list of host functions within the limits of the update rate. Connections between data locations in the host memory and those in the DSP memory are made with the connection routine identified above.

The next step in the process involves putting a shell around the user DSP code (block 56). Before compiling the DSP code, it may be necessary to put a shell around user code for initialization and data transfer. This code is hidden from the user and may never need to be changed, unless the target hardware is changed. The shell for the 56000, is based on the desired sampling rate, the memory sizes of external memories attached to the 56000, how to control external delay lines implemented in large external memories, and how data is to be transferred between the 56000 and the host computer (a Macintosh in one implementation). In the 56000, the shell is also used to set up interrupts and timers. Other DSPs may not require any shell, having particulars taken care of in the hardware of the DSP itself.

The next step in FIG. 3 involves assembling or compiling the DSP code (block 57). This step involves converting the source text output of the macro preprocessor and the shell in the DSP object code. Finally, the result of the compilation is saved (block 58). Also, the host code blocks generated in the macro preprocessor in block 55 as shown above are saved as indicated by arrow 59.

FIGS. 4-23 are used to provide illustration of the function block symbols, the tools for composing a graphic model of a sound generating program using these function block symbols, and the functions associated with each symbol. Also, examples of graphical models of sound generating programs developed using these tools are provided in FIGS. 24-28.

GRAPHIC PROGRAMMING ENGINE OVERVIEW

Figure 4:
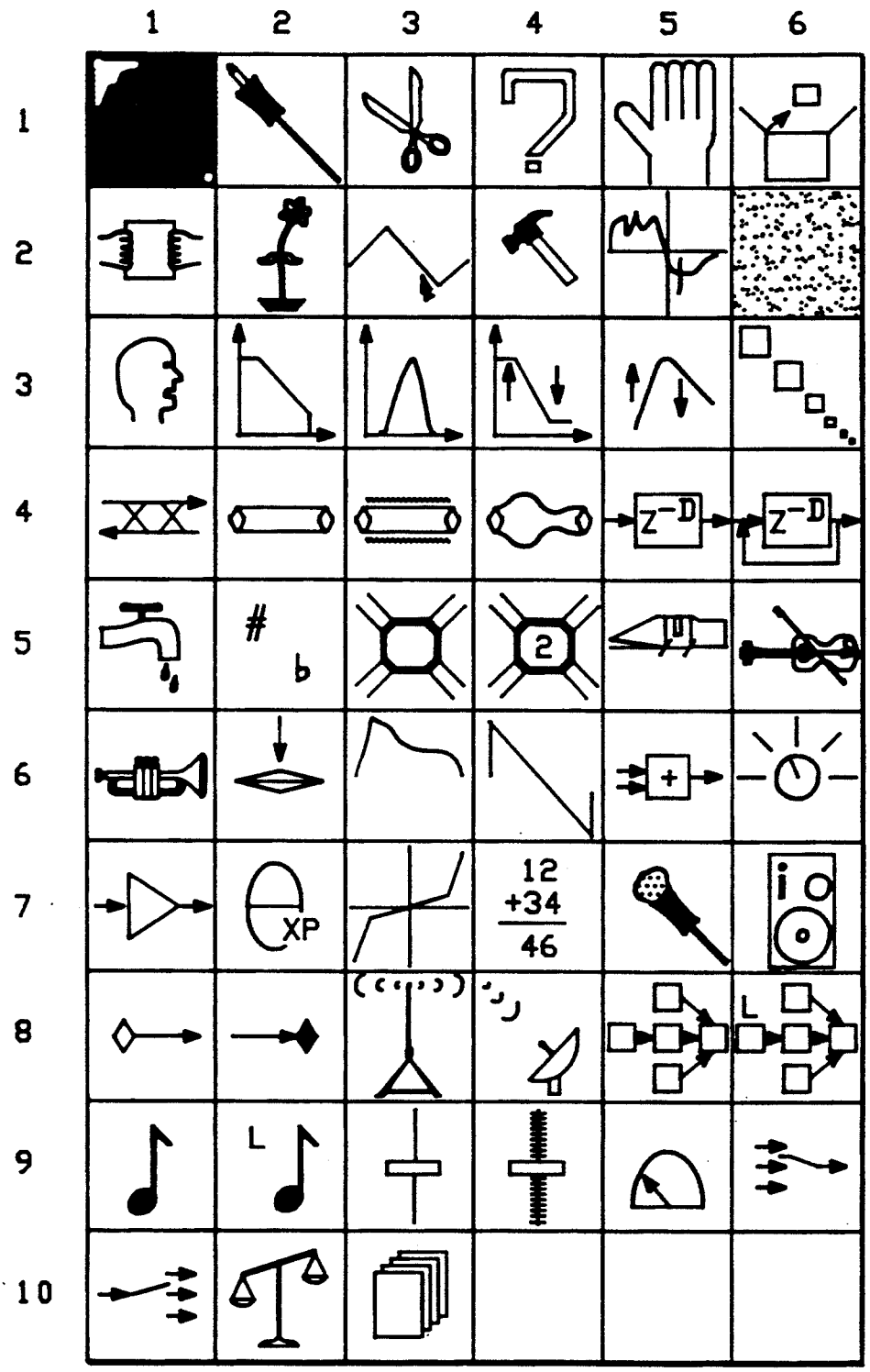
FIG. 4 is a drawing of a set of function symbols for use with a graphic programming engine according to the present invention.

FIG. 4 illustrates a pallet of graphical composition tools and function block symbols used in a preferred system running on the Macintosh computer. The pallet is labelled with six columns and ten rows as indicated on the figure. The symbols are referred to by their column number and row number in the following discussion.

The selected block is highlighted by reversing the field as illustrated for the pointer tool at column 1, row 1.

The graphical programming engine is described from the point of view of a user interface to specify the features provided by the preferred embodiment of the graphical programming engine and the apparatus for generating sound or composing a model of a sound generating program, according to the present invention.

FIG. 4 illustrates the basic tools menu used in the system. Pulling down the tools menu brings up a pallet of icons or symbols for functions blocks and tools used. The six blocks in the first row, and the blocks in columns one and two of the second row are the eight graphical composition tools used for composing a graphical model of a sound generating program. The other symbols are used as synthesizer building blocks, such as wave guides, filters, oscillators, and envelopes.

The tools and blocks described are representative of the type of objects that may be used in a system according to the present invention. Any given implementation may include more or fewer objects as suits the needs of the user.

This pallet is a "tear off" menu; if the user moves the mouse to one side while it is selecting, the pallet will also move, remaining in the location in which it is left (as opposed to disappearing after it is used). Clicking in a closed box in the upper left hand corner will cause the pallet to disappear again.

When the user clicks on a tool or block, the user is changing the function of the cursor. This changes the cursor's shape, so that if one of the eight tools is selected, the cursor assumes the shape of that tool. If a block is selected, the cursor shape changes to the word "BLOCK". This way, the current function of the cursor is always clear.

Mouse actions

Certain mouse actions are involved in use of the tools and blocks described below. For Macintosh II computers, the actions are defined as follows.

Clicking is briefly pushing on the button of the mouse. When the button is depressed, the user will hear a click. After the user hears the click, let go of the button.

Double-clicking is clicking the mouse button twice rapidly. Shift-clicking is clicking while the shift key is held down. The shift key must be depressed before clicking, and let up after the click.

Option-clicking is clicking while the option key is held down. The option key must be depressed before clicking, and let up after the click.

Command-clicking is clicking while the command (cloverleaf-) key is held down. The command key must be depressed before clicking, and let up after the click.

Dragging is a combination of clicking and mouse movement. The mouse is positioned over an object, and the button depressed. Instead of immediately letting go of the button, it is held down while the mouse is moved. This causes the object to move with the mouse. After the object is moved to its intended location, the button is let up.

Hierarchical Menus

In addition to using normal Macintosh menus, the Engine uses a slightly more advanced system. Related menu selections may be grouped under a main menu selection, like files are grouped under folders in the Macintosh Finder. Menu selections which have a ( ) next to them contain submenus. Submenus may be nested; that is, a submenu may contain its own submenus. These work just like normal menus; simply negotiate the hierarchy until the user reaches the desired selection.

User Names

When placed, blocks display their default user name under their icon—"filter" for a Filter Block, "waveguide" for a Waveguide Block, and so on. Each block also has a user name, which appears as a parameter in the block's text edit window. By typing into this field, the user may give the block a more descriptive label (such as, "2nd order highpass"), which will appear instead of the default.

Some blocks, such as the Receive and Slider, have both a user name and a "name." The "name" designates an Engine bus on which that block will receive or transmit, similar to selecting a MIDI channel on a keyboard. The user name is entirely independent from the bus name.

Host and DSP Ports

Many RealTime functions may be performed on either the Host (for example, the Macintosh CPU) or the DSP (the Sound Accelerator card). Some can only be performed on one or the other. Since the DSP can carry out only so many instructions, it is best to use the Host as much as possible.

The DSP has a single update rate, as set in the Sample Rate selection under the Parameters sub-menu under the DSP menu; the default DSP rate is 44.1 kHz. The Host will preferably have a plurality, e.g., four, different update rates, which will allow the user to save processing power by experimenting with coarser and finer LFOs, envelopes, and so on. In a simpler system, all Host functions are performed at the same rate. The host typically executes routines that are asynchronous, relative to the DSP. Thus, such functions as processing user input data with slower sample rates may be best handled by a host routine.

If a block can be performed on both the DSP and the Host, the settings of the output port(s) determine which one is used. These settings may be changed by option-clicking on the desired port, which brings up a large dialog box containing all the possible port types (if it is an output port, for instance, all input port options will be grayed out).

In the algorithm displays, port types are distinguished by their shape and color. Input ports are hollow shapes, and output ports are filled in. DSP ports are square, Host ports are round, and Trigger ports are diamond-shaped. Fixed and constant ports do not appear on the icons.

Below is a list of the function block port types. Some of these options may not be available for a particular port. Specifically, the user can never change an output port to an input port, or vice-versa.

a. DSP Constant Input/Output: These are the same as the DSP Input and Output ports, except that they cannot be connected to. To make a connection, simply change the port type to the normal DSP Input/Output.

b. DSP Input/Output: This causes the block to be executed on the DSP, with an update rate as set in the Sample Rate selection under the Parameters sub-menu under the DSP menu; the default DSP rate is 44.1 kHz for the system of FIG. 1.

c. Host Constant Input/Output: This causes the block to be executed on the Host, with an update rate as set for Priority 1 in the Host Priorities dialog box in the RealTime menu. The default update rate is 1 ms.

d. Host Priority 1 Input/Output: This causes the block to be executed on the Host, with an update rate as set in the Host Priorities dialog box in the RealTime menu. The default update rate for Priority 1 is 1 ms.

e. Host Priority 2/3/4 Input/Output: This will cause the block to be executed on the Host at the Priority 2, 3, or 4 rates, as set in the Host Priorities dialog box under the RealTime menu. A simpler version may support only a single Host update rate.

f. Fixed Input/Output: The type of these ports cannot be altered—this is shown only for completeness.

g. Trigger Input/Output: Triggers are simple momentary pulses, which can be used for tasks such as starting envelopes and synching LFOs.

An alternative system may execute the synchronous blocks that produce the sound output data and the asynchronous blocks that, for instance, supply or process inputs to the synchronous blocks on a single processor that could execute the required number of instructions within the real time limitations of the synchronous blocks.

Referencing Files

Patches and PatchLinks, Samples, Links, and Algorithms (function blocks described below) are all imported from other files, and they share a standard procedure for doing so. When the user places one of these blocks in the system of FIG. 1, a variation of the Macintosh standard file dialog box appears, prompting the user to "Select (Sample, Link, Algorithm) file." Use the standard Macintosh conventions to locate the file containing the desired sample or algorithm, and then push the Open button. A new dialog box will appear which lists all the algorithms or samples within that file. Choose the desired algorithm or sample by selecting its name and then pushing the Okay button, or by simply double-clicking on the name. This will place the file as a block in the current algorithm. Imported Algorithms and Patches are actually copied into the current file, and so any changes to the original file will not be reflected in the placed block. Samples, PatchLinks, and Links, however, are re-created every time the algorithm is opened. If the user renames, move or delete the original file, it won't be where the link expects it to be. The system will therefore attempt to find that file, looking first in the original folder and then throughout the disk. If the user is using a large hard disk, this search procedure may take some time.

If the file has been moved to another folder but not renamed, the system will eventually find it. If it has been renamed or deleted, however, this will not be the case, and the user will be prompted by a dialog box to manually specify a new link or sample. If the user wishes to change the source file of a Link or PatchLink, select the default edit window of the block by double-clicking or using the Edit tool, and press the Specify Link button. This will bring up the file dialog, and the user can then go through the procedure described above to select a new source file and algorithm to be linked.

Order of Operations

Unlike the components of a real world system, the Engine's blocks do not operate simultaneously; they each perform their function in turn. Each block is marked with a number at its lower left corner, denoting its place in the order of operations. The blocks are originally marked in the order in which they are placed down; the Numbering command, under the special menu, allows this numbering to be changed. The block marked #0 performs its function first, then the block marked #1, and so on. This order of operations can sometimes have an affect on the sound, as described below, especially in algorithms incorporating feedback.

Default Values Of Ports: A block's ports are used to pass audio or modulation data to or from the block. Normally, the input ports receive values from other blocks, and the output ports send out values resulting from the block's signal processing functions. There are two exceptions to this, however.

If there is no connection to an input port, the default value for that port is used instead. The user may often have parameters which the user does not wish to modulate; in that case, entering a default value sets the parameter to a specific amount, which will be used unless and until a modulator source is connected.

If a block's port is polled by another block before any computation has taken place, the default value for that port is used. This will generally only happen at the very beginning of the sound. For instance, in the example of FIG. 5, a simple oscillator-filter patch is fed to an output. The blocks are numbered entirely backwards, with the output block #0, the filter #1 and the oscillator #2.

The first block to function is the audio output block. It looks back up the signal path at the output of the filter. Since the filter has not yet made any computations, it sends out the default value of its output port. Next is the filter's turn to function, so it looks back up the signal path to the oscillator. Since the oscillator has yet to be calculated, it sends out the default value of its output port to the filter, and the filter carries out its processing on that value. Finally, the oscillator is calculated, and stands ready with its first real data.

When the audio output port is calculated for the second time, it looks back up the signal chain to the filter, which passes on its current value—the processed version of the oscillator's default output. The second calculation of the filter operates on the first data of the oscillator, and then the oscillator calculates its second data.

It is not until the third sample that the audio output receives any real data from the oscillator. This is, then, not the best way to set up the block order of execution.

In the example of FIG. 6, the blocks are numbered so that the oscillator is calculated first, then the filter, and then the audio output. Notice that, unlike the previous example, the oscillator data makes it to the output with no sample delays, and the default values of the oscillator and filter are not used.

GRAPHIC COMPOSITION TOOLS

The graphic composition and edit tools of FIG. 4, rows 1 and 2, are described below.

Pointer Tool (col. 1, row 1)

The Pointer Tool is the most basic part of engine. It may be used to select Blocks, Ports, and Wires, to move them, edit them, open them, and connect them.

Clicking on a block or wire with the Pointer selects that item. A group of blocks and wires may be selected by clicking on empty space and dragging a selection box around the desired items. Once an item is selected, it may be edited by menu selections, including cut (command-X), flip, and others. Selecting a wire and then choosing "clear" from the Edit menu is the same as using the Scissors Tool. Selected blocks appear in inverse video; selected wires are double their ordinary width.

Dragging from a Port of one Block to a Port of another Block connects those two ports, creating a wire. This is the same as using the Patch Cord Tool.

Double-clicking on a Block with the Pointer brings up that block's default edit window. Often, this is a graphic editor—for envelopes, tubes, etc. For all blocks except Audio Input, Audio Output, and Algorithm, this is the same window brought up by clicking with the Edit Tool (see below). The description of each Block below explains which edit window is brought up by double-clicking.

Command-clicking on a block brings up an alternate, generally text-based edit window.

Control-clicking means that the pointer will select only connections, and not blocks. This makes it much easier to select a wire connecting two ports on the same object.

Selecting and dragging a block moves that block. This is the same as using the Move Tool.

Scissors Tool (col. 3, row 1)

Clicking on a wire or wire endpoint with the Scissors Tool cuts that wire, removing the connection from the patch.

This is the same as selecting a wire with the Pointer Tool and then choosing "clear" or "cut" from the Edit menu, or pressing (command-X), the shortcut for "cut."
Edit Tool (col. 4, row 1)

Clicking on a block with the Edit Tool brings up the default edit window for that block.

This is usually the same as double-clicking with the Pointer Tool.
Patch Cord Tool (col. 2, row 1)

Dragging from one port of a block to another port with the Patch Cord Tool creates a wire between those two ports.

This is the same as dragging from port to port with the Pointer Tool.

Ordinarily, if the user attempts to connect two different types of ports (e.g., Host and DSP), or two ports of similar direction (e.g., two output ports), the error message "algorithm: cannot make connection" will appear. If the user holds the command key down while making a connection with the Patch Cord tool, connections may be made between Host and DSP ports (with the Pointer Tool, this shortcut is not necessary—it can always make these connections). Connections between ports of similar direction are still prohibited.
Grow Tool (col. 2, row 2)

Some blocks, such as Mixers and Junctions, have a flexible number of inputs and outputs. Clicking the Grow Tool on such a block will cause that block to add another input, or another set of inputs and outputs. The descriptions of the function blocks below describe the specific effects of the Grow Tool on each Block. Command-clicking with the Grow tool will un-grow a block, removing one port (or set of ports) per click.

Blocks which can be grown:

| | |
|---|---|
| Delay | Grow adds additional delay lines and outputs. |
| Envelope | Grow adds additional envelope segments. |
| Junction | Grow adds additional inputs. |
| Lattice | Grow adds additional filter segments. |
| Math | Grow adds additional argument inputs. |
| Mixer | Grow adds additional mixer inputs. |
| Selector | Grow adds additional states. |
| Tap | Grow adds additional tap outputs. |
| Tube | Grow adds additional tube segments. |

Move Tool (col. 5, row 1)

Dragging with the Move Tool on a Block, or a selected set of Blocks, moves that Block or set of Blocks.

This is the same as dragging with the Pointer Tool.
Expand Tool (col. 6, row 1)

Clicking on a merged algorithm with the Expand Tool brings up a window which shows that algorithm. Linked algorithms cannot be expanded.

This is the same as double-clicking on an algorithm with the Pointer Tool.
Resize Tool (col. 1, row 2)

Dragging on a block with the Resize Tool will cause it to be stretched or shrunk in the direction in which the user drags. This may be used to make it easier to see and make connections to blocks which have variable numbers of ports, such as mixers, junctions, and merged algorithms. Resizing has no effect on a block other than changing the way that it is displayed—specifically, the number of ports will remain the same.

This is the same as dragging with the Pointer Tool on the resize triangle in the lower right corner of each block.

FUNCTION BLOCKS

The basic element of the Engine algorithm is the function block. All of Engine's blocks in alphabetical order, and explains each of their functions in detail. The graphic symbols or icons for each block shown in FIG. 4 is identified by column and row.
Addin (col. 2, row 6)

Figure 7:
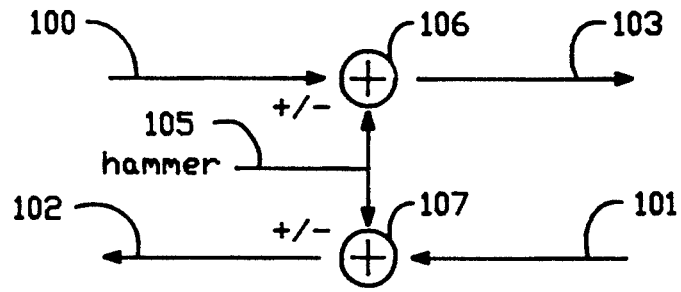
FIG. 7 is a block diagram of the Addin function.

The Addin block is used to insert a hammer pulse, or other stimulus, into a waveguide system, as shown in FIG. 7. The stimulus is connected to the hammer input port on the top of the Addin block.

There is only one edit window for this block.

a. user name: Please see "User Names" described above.

b. inputLeft 100, inputRight 101: Min value: $-\infty$ Max value: $+\infty$ c. outputLeft 102, outputRight 103: These are the default values for the inputLeft, outputLeft, inputRight, and outputRight audio ports.

d. hammer 104: Min value: $-\infty$ Max value: $+\infty$. This is the default value for the hammer input port. If a hammer or other audio source is connected to this port, that audio is added by address 106, 107 to the signals flowing through the addin.

e. inversion: This feature inverts the shape of the hammer pulse added to either or both of the outputs. This may be used as a shortcut for switching an end of a waveguide system from positive (a gain block) to negative (a junction block).

1. None. No inversion occurs.
2. Left. The hammer added in adder 106 to the left output is inverted.
3. Right. The hammer added in adder 107 to the right output is inverted.
4. Both. The hammer is inverted for both outputs.

f. type: Addin 1, Addin 2. These allow different addin types to use same icon.
Algorithm (col. 5, row 8)

This block represents a merged algorithm, containing one or more blocks and/or ports. Ports are created by placing the connectInput and connectOutput blocks within the Algorithm. The user may use up to 40 ports on an Algorithm; the only standard parameter for the block is the user name.

Special Edit window (Edit tool)

user name: Please see "User Names" described above.

The rest of this window is organized into a system of columns and rows, as described below. Each row represents the parameters for one of the ports.

name column: This is the name of the port. Changes made here will be reflected both in the names of the Algorithm's ports in the main patch edit window, but also in the names of the connection blocks for those ports. Changing the names of the connection blocks will also change the name here.

vertical column: This is the vertical position of the port on the Algorithm block. 1 is the bottom, and 0 is the top.

horizontal column: This is the horizontal position of the port on the Algorithm block. 1 is the right, and 0 is the left.

value column: This is the default value of the port.
Patch Edit window (double-click or Expand tool)

Double-clicking on an Algorithm block opens it up so that the user can edit the algorithm's patch, just as the user would a top-level patch.

Text Edit window (command-click)

This window contains no new parameters.

Audio Input (col. 5, row 7)

The Audio Input block plays audio from its specified channel. This is similar to an audio Receive, except that it reproduces audio from one of the 8 audio channels in a standard format. This can be used for audio bussing. Double-clicking brings up the display window; command-clicking brings up the text edit window.

Display Window (Double-Click)

Double-clicking on this block brings up the Display Window, as shown under "Audio Output". This displays the sample file on the assigned channel, and is identical to that of the Audio Output block on the same channel.

Text Edit (Command-Click)

user name: Described above.

output: Min value: $-1.0$ Max value: $+1.0$. This is the default value for the output audio port. Values outside the range of the port will be clipped.

channel: This is the audio channel whose sample the block will play. In RealTime operation, a limited number of channels may be functional.

The Engine has 8 audio channels, which are roughly equivalent to sends and receives. Audio Outputs write to these channels; the Listen options in the Synthesize menu allow the user to assign the left and right speakers to play any two of them; the Audio Inputs can play them and send the information through an Engine algorithm; and they are stored as samples along with the algorithm file (according to the settings in the File Format sub-menu).

Audio Output (col. 6, row 7)

The Audio Output block is used to bring the sound out to the speaker.

Double-clicking on this block opens the Display window; command-clicking or using the Edit Tool brings up the text edit window; and option-clicking plays the block's sample.

Figure 8:
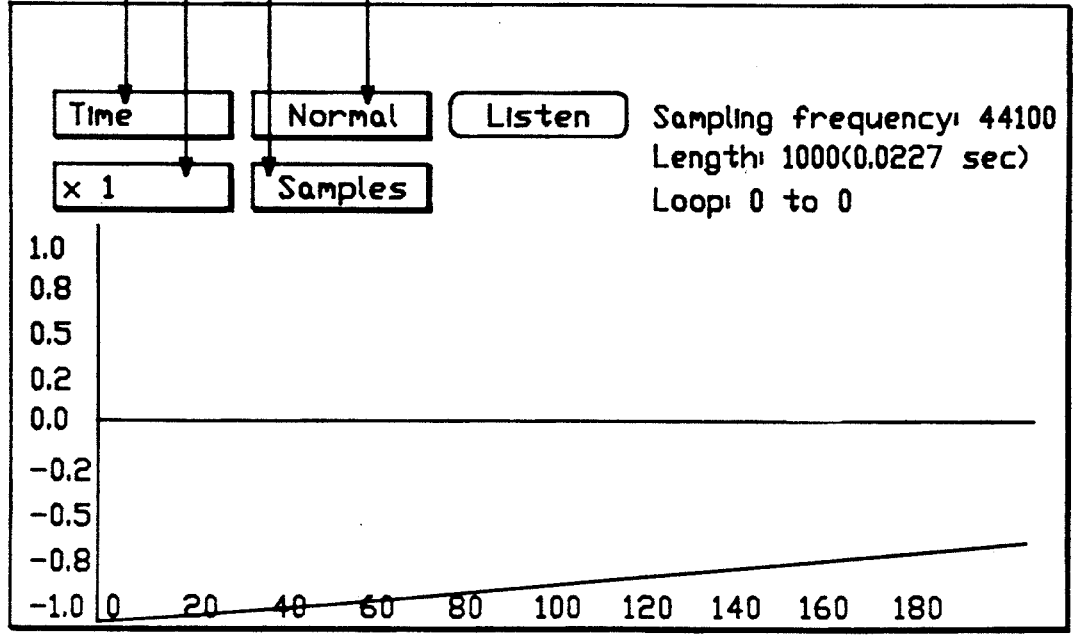
FIG. 8 is a diagram of a display window for displaying an audio output generated by a sound generating program, used primarily in nonreal time operation.

The Display Window (Double-Click) is used for viewing the data generated by a patch in non-RealTime as shown in FIG. 8.

View Sample As . . . Time. This is the normal option, showing the sample as a waveform, oscilloscope-style.

Magnitude. This displays the magnitude of the sample over frequency.

Phase. This displays the phase of the sample over frequency.

Text Integer. This displays the sample numerically, as integers.

Text Float. This displays the sample numerically, as floating-point numbers.

Text Hex. This displays the sample numerically, as hexadecimal numbers.

Sample Magnification. Min value: $+64$ Max value: $\times 64$

This allows the user to set the resolution of the sample display, so that the user can zoom in on selected details or zoom out to see a large portion of the sample. $+64$ is the smallest magnification, showing the most detail; $\times 64$ is the greatest magnification, showing the largest amount of the sample data at once.

Graphic Smoothing. Normal. This creates curves between the sample points.

Terrace. This does not smooth the samples into curves; the exact value of the sample is shown for the entire sample length.

View time as . . . Samples. The sample number is shown as the x-axis in the display.

Time. The time, in milliseconds, is shown as the x-axis of the display.

Text Edit (Command-Click)

User name: Described above.

input: Min value: $-1.0$ Max value: $+1.0$. This is the default value for the input audio port. Values outside the range of this port will be clipped.

channel: This is the audio channel to which the block will write its sample. In RealTime operation, only channels 1 and 2 (Left and Right) are functional.

The Engine has 8 audio channels, which are roughly equivalent to sends and receives. Audio Outputs write to these channels; the Listen options in the Synthesize menu allow the user to assign the left and right speakers to play any two of them; the Audio Inputs can play them and send the information through a Engine algorithm; and they are stored as samples along with the algorithm file (according to the settings in the File Format sub-menu).

Bow (col. 6, row 5)

Figure 11:
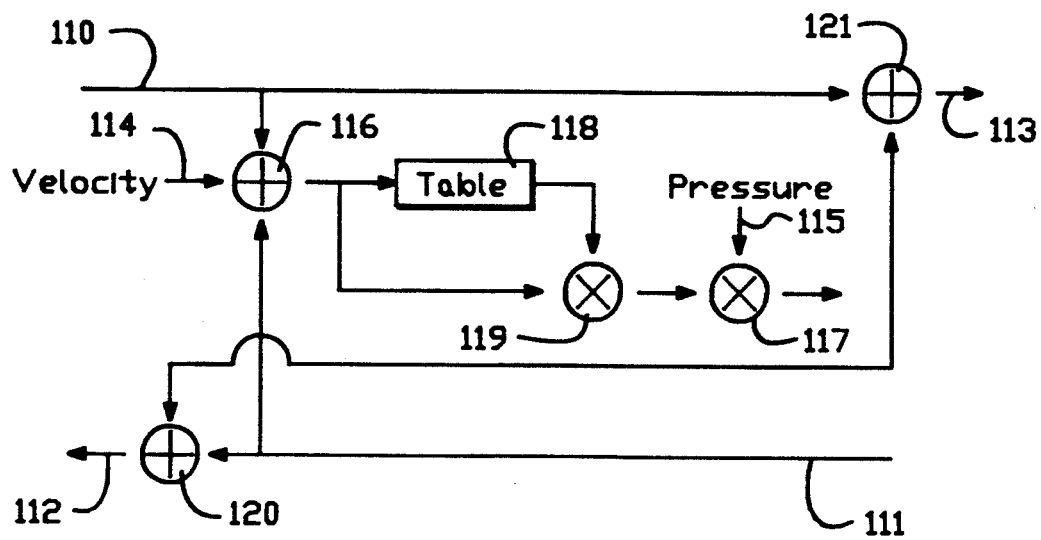
FIG. 11 is a block diagram of the Bow function block.

This block is used to create a bow model as shown in FIG. 11 in a waveguide system. The bow shape may be derived from the hc, m, curvature, and noise parameters, drawn directly into the table, or derived from an equation. It may also use a table imported from another file.

Double-clicking on this block brings up the edit window with a table editor; command-clicking brings up only the text edit window, without the table.

Table Editor (double-click)

user name: As above.

inputLeft 110, inputRight 111: Min value: $-\infty$ Max value: $+\infty$ outputLeft 112, outputRight 113: These are the default values for the inputLeft, outputLeft, inputRight, and outputRight audio ports.

velocity 114: Min value: $-\infty$ Max value: $+\infty$. This parameter represents the velocity of the bow moving across the string. It is supplied as an input to Adder 116 and interacts with pressure to affect volume and timbre.

pressure 115: Min value: $-\infty$ Max value: $+\infty$. This parameter represents the pressure of the bow pushing down on the string. It is supplied as an input to multiplier 117 and interacts with velocity to affect volume and timbre. When pressure is 0, the bow will have no effect (this makes sense, if the user thinks about a bow moving over a string—but not pressing down at all).

The interaction between the pressure and velocity is accomplished by supplying the output of adder 116 to table 118 and to multiplier 119 as shown in FIG. 11. Multiplier 119 multiplies the output of adder 116 with the output of the table 118 at a corresponding position, and supplies that output as an input to multiplier 117. Multiplier 117 multiplies that value by the pressure parameter and supplies an output to the adder 121 which combines it with the input on line 110 and to adder 120, which combines it with the input on line 111.

The value of the table 118 can take on a variety of shapes, such as shown in FIGS. 9 and 10.

hc: Min value: $-1.0$ Max value: $+1.0$. This sets the distance from 0 of the start points of the slope in the bow table as shown in FIGS. 9 and 10.

m: Min value: 0.0 Max value: +∞. This sets the length of the slopes in the bow table as shown in FIGS. 9 and 10 (see figure below).

curvature: Min value: −∞ Max value: +∞. This sets the curvature of the slopes in the bow table. If this is set to 0, the slopes are linear. FIG. 9 shows a linear slope. FIG. 10 shows a curved slope.

noise: Min value: −∞ Max value: +∞. This sets the amount of noise used when Calculating a bow shape, or the amount added to the current table when the Noise button is pressed.

Bow Shape menu: Bow 1, Bow 2. The same function block may specify more than one bow shape.

Calculate button: Calculates a new table based on the chosen bow shape, hc, m, and curvature values, and noise amount.

Import button: Import allows the user to use a table from another file. Clicking on this button will bring up the standard Macintosh File dialog box, allowing the user to choose the source file. The user will then be asked to select a table from that file.

Equation button: Equation allows the user to generate a table from an equation. Clicking on this button will bring up a dialog box with a text field, into which an equation may be entered. Entering the desired equation and then clicking OK will cause the table to be generated. For more information on equations, please see "Math" below.

Noise button: This adds an amount of noise (specified in the noise parameter above) to the current table.

Bandlimit button: This function may be used to smooth out a table. Pressing this button brings up the Bandlimit dialog box.

Bandlimit Dialog Box

Frequency: Min value: 0.0 Max value: +1.0. This parameter works in conjunction with Length to determine the amount of smoothing which occurs. The lower the frequency, the more smoothing.

Length: Min value: 0.0 Max value: length of table. This parameter determines the length of the bandlimiting window (how many samples are looked at for the generation of each point), and so works in conjunction with Frequency to determine the amount of smoothing which occurs. The greater the length, the greater the smoothing.

Window shapes: The shape of the bandlimiting window determines the weighting curve of the points within the window. The Rectangular shape weights all of the points equally; the other shapes may weight points closer to the center more heavily, and so on.

Rectangular. This is the default.
Hanning. This is an alternate window shape.
Hamming. This is another alternate window shape.
Blackman. This is yet another alternate window shape.

Limit: This option limits the output of the table to −1 and +1.

Normalize: This option normalizes the output of the bandlimiting, so that the maximum deviation of the waveform is 1.

Amplitude: This option scales the output of the bandlimiting function.

Text Edit (command-click): The Text Edit window contains the same parameters as the Table Edit window, but does not include the table editor.

ConnectionInput (col. 1, row 8)

This block is used to create an audio, constant, or modulation input port for a merged algorithm. When the user places a connectionInput, a dialog box appears, allowing the user to specify one of these three types. ConnectionInput blocks can only be placed within a merged algorithm.

Constant modulation ports do not actually appear as ports; rather, they appear in the text edit window of the merged algorithm, brought up by command-click. This allows the user to create a "control panel" for a merged algorithm.

user name: Changing this name will also change the name of the corresponding port on the Algorithm block.

output: Min value: −∞ Max value: +∞. This is the default value for the output port.

Brass (col. 1, row 6)

Figure 12:
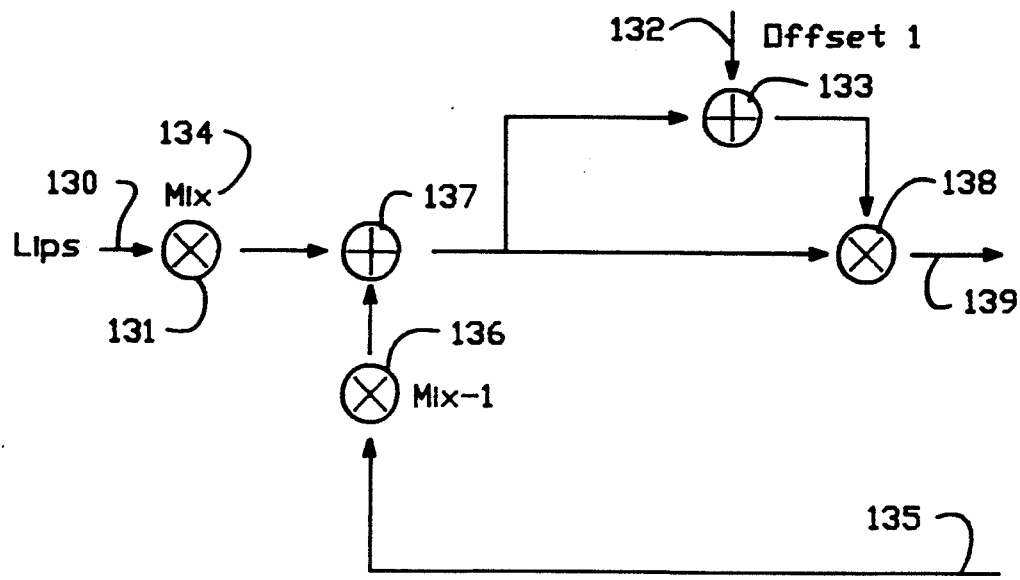
FIG. 12 is a block diagram of the Brass function block.

This block is used to create a brass model as shown in FIG. 12 in a waveguide system.

There is only one edit window for this block.

user name: As above.

input 135, output 139: Min value: −∞ Max value: +∞. These are the default values for the input and output audio ports, and the lips modulation input port.

lips 130: Min value: −∞ Max value: +∞. This is the default value for the lips modulation port. The lips port is the main input to the brass block. It simulates the buzzing of the lips against the mouthpiece; a typical modulation source would be an Oscillator. It is supplied to mixer 131.

offset 1 132: Min value: −∞ Max value: +∞. This is the default value for the offset 1 modulation port.

The brass block essentially performs a square function on the lips input. Squaring creates an absolute value effect, so that all values come out positive, producing a DC offset. Using a negative value for offset 1 helps to alleviate this effect. It is supplied to adder 133.

mix 134: Min value: −∞ Max value: +∞. This mixes the input 135 to the block between the lips and the returning signal in mixer 131, mixer 136, and adder 137.

The output of adder 133 is combined with the output of adder 137 in mixer 138, which supplies the output data 139.

ConnectionOutput (col. 2, row 8)

This block is used to create an audio or modulation output port for a merged algorithm. When the user places a connectionOutput, a dialog box appears, allowing the user to specify one of these two types. ConnectionOutput blocks can only be placed within a merged algorithm.

user name: Changing this name will also change the name of the corresponding port on the Algorithm block.

input: Min value: −∞ Max value: +∞. This is the default value for the input port.

Delay (col. 5, row 4)

This block may be grown for multiple delays from a single input. When creating a multi-tapped delay line, the user must enter the longest delay time first.

user name: As above.

input, output (n): Min value: −∞ Max value: +∞. These are the default values for the input and output(n) audio ports.

interpolate: Interpolation improves the quality of the generated audio.

| | |
|---|---|
| None. | No interpolation. |
| Linear. | This uses simple lowpass filtering for interpolation. This is less computationally |

| | |
|---|---|
| | expensive than Allpass (below), but will slightly alter the timbre. |
| Allpass Host. | This uses allpass filtering for interpolation, calculated on the Host. Currently, this will cause zippering effects when the delay time is modulated. Usually, either Linear or Allpass Table interpolation are better choices. |
| Allpass Table. | This option generates a table stored on the DSP to provide high-quality allpass filtering, allowing glitchless modulation of the delay time. It is somewhat more computation-intensive than Linear (above), but does not alter the timbre. | correction: Min value: 0.0 Max value: +50.0. This is a pitch-correction option, which can be used to compensate for the total delay of a system (in samples). The default value is 0, which causes the correction to be optimized out. If the user inserts a filter into the loop, it will introduce a small amount of extra delay, which will affect the tuning. To compensate for this, try entering a correction amount of 0.25, or 0.5.

delay (n): Min value: 0.0. Max value: limited by available memory. This is the delay, in milliseconds, of delay number (n).

ratio (n): Min value: 0.0. Max value: 2.0. This is the default value for the ratio modulation input port (n).

The ratio scales the delay time; modulating this amount by an LFO can be used to create chorus and flanging effects.

Echo (col. 6, row 4)

The Echo block is a delay with built-in feedback as illustrated in FIG. 13. Unlike the Delay block, it cannot be grown.

user name: As above.

input 145, output 146: Min value: $-\infty$ Max value: $+\infty$. These are the default values for the input and output audio ports.

interpolate: Interpolation improves the quality of the generated audio.

| | |
|---|---|
| None. | No interpolation. |
| Linear. | This uses simple lowpass filtering for interpolation. This is less computationally expensive than Allpass (below), but will slightly alter the timbre. |
| Allpass Host. | This uses allpass filtering for interpolation, calculated on the Host. Currently, this will cause zippering effects when the delay time is modulated. Usually, either Linear or Allpass Table interpolation are better choices. |
| Allpass Table. | This option generates a table stored on the DSP to provide high-quality allpass filtering, allowing glitchless modulation of the delay time. It is somewhat more computation-intensive than Linear (above), but does not alter the timbre. | delay 147: Min value: 0.0. Max value: limited by available memory. This is the delay of the echo, in milliseconds.

ratio: Min value: 0.0. Max value: 2.0. This is the default value for the ratio modulation input port which modifies mixers 148 and 149.

The ratio scales the delay time; modulating this amount by an LFO can be used to create chorus and flanging effects.

feedback: Min value: $-\infty$, Max value: $+\infty$. This controls the amount of feedback in the delay line by modifying mixer 150. The output of mixer 150 is added to the block input 145 in adder 151, and then supplied to delay block 147.

Envelope (col. 3, row 6)

The Envelope block allows the user to create envelopes with an arbitrary number of segments, each with their own times, levels, and curvatures. Double-clicking brings up the special Envelope Edit window; command-clicking on this block brings up the text edit window.

The Envelope Edit window (Double-Click) is shown in FIG. 14.

gate: This port expects the Note On Gate message, which it uses to trigger the start of the envelope (on key down) and begin the release phase (on key up).

amplitude: Min value: $-\infty$ Max value: $+\infty$. This sets the maximum amplitude of the envelope. This makes it easy to scale all of the levels at once.

output: Min value: $-\infty$ Max value: $+\infty$. This is the default value for the modulation output port.

sustain menu: This allows the user to set the segment number to sustain upon. If sustain is set to 3, for instance, the envelope will progress to segment 3's level and then stay there as long as the key is held down (assuming that the envelope is triggered by Note on).

release menu: This allows the user to set the segment number on which the release will begin. If release is set to 4, for instance, the envelope will progress to segment 4's level as soon as the key is let up. Note that there may be additional segments after the release segment, allowing the user to create complex shapes to occur after key-up.

Compress button: This feature compresses the time axis of the envelope graphic, so that longer envelopes may be seen at one time. This button may be pressed repeatedly for greater compression.

Expand button: This feature expands the time axis of the envelope graphic, so that greater detail can be seen. This button may be pressed repeatedly for greater expansion.

Envelope Edit mouse commands

The Envelope Edit window incorporates a few special mouse-based commands, as described below.

Click and drag on point: changes the level of that point and/or the time of that segment.

Click and drag on line: changes the curvature of that segment.

Click on "empty" space: inserts a new envelope segment, with a point at the place that the user clicked.

Text Edit window (command-click)

user name: As above.

amplitude: Min value: $-\infty$ Max value: $+\infty$. This sets the maximum value of the envelope, and thus allows the user to easily scale the total modulation amount.

output: Min value: $-\infty$ Max value: $+\infty$. This is the default value for the modulation output port.

time (segment #): Min value: 0 Max value: $+\infty$. This is the time value, in milliseconds, of the specified envelope segment,. This value must be an integer.

ratio (segment #): Min value: 0 Max value: $+\infty$. This is a scaling factor for the time of the specified envelope segment. A ratio of 1 causes no change. Ratio is initially a constant port, but its type may be changed to allow real-time modulation of the segment time.

level (segment #): Min value: $-\infty$ Max value: $+\infty$. This is the amplitude value for the specified envelope segment. If this is greater than 1 or less than $-1$, it will not be plotted properly in the graphic editor.

curvature (segment #): Min value: 0.90 Max value: 0.999. This is the curvature value for the specified envelope segment. In RealTime operation, the maximum curvature is 1.0; in non-RealTime, it is 1.1.

Equalization (col. 3, row 3)

The Equalization block provides a fixed parametric EQ filter. Alternative systems may adapt this function for real time execution.

user name: As above.

input, output:Min value: $-\infty$ Max value: $+\infty$. These are the default values for the input and output audio ports.

center: Min value: 0.0 Max value: 1.0. This sets the center frequency of the equalization filter. A value of 1.0 is equal to the Nyquist frequency of the DSP sampling rate. This will be the Generate Frequency set under the Synthesize menu).

width: Min value: 0.0 Max value: 1.0. This sets the width of the equalization filter.

gain: Min value: 0 Max value: $+\infty$. This sets the amplitude change at the center frequency of the equalization filter. This is not measured in dB, but in the engine's standard amplitude amounts.

Exponential (col. 2, row 7)

The Exponential block allows the user to convert linear pitch modulation sources into exponential pitch modulation sources. The most frequent use for this block is in adding pitch bend to a keyboard pitch-modulation source. The keyboard is received as note or length linear, and then the pitch bend added by using a mixer; the sum may then be processed through the Exponential block and sent to its destination.

user name: As above.

input, output: Min value: $-\infty$ Max value: $+\infty$. These are the default values for the input and output audio ports.

type: Note. This should be used when converting for an oscillator, hammer, sample, glottal, or filter.

Length. This should be used when converting for a waveguide, tube, or delay.

Filter (col. 2, row 3)

The Filter block can create any one of a number of different filter types.

user name: As above.

input, output:Min value: $-\infty$ Max value: $+\infty$. These are the default values for the input and output audio ports.

outputLP: Min value: 0.0 Max value: 1.0. This output is currently used only by the SV Generic filter type. It is initially a DSP Constant Output port; to use its output, the port must first be converted to a normal DSP Output. For a brief description of this process, see under "SV Generic" below.

outputHP: Min value: 0.0 Max value: 1.0. This output is currently used only by the SV Generic filter type. It is initially a DSP Constant Output port; to use its output, the port must first be converted to a normal DSP Output. For a brief description of this process, see under "SV Generic" below.

cutoff: Min value: 0.0 Max value: 1.0. This sets the cutoff frequency of the filter. A value of 1 is equal to the Nyquist frequency of the current DSP sampling rate, as set under Parameters in the DSP menu. This means that if the user changes the DSP sampling rate, the user may need to alter the user's cutoff frequency as well. If the user wishes to modulate the filter with note number, use Note Exponential.

width: Min value: 0.0 Max value: 1.0. This sets the width of the filter.

type: This menu sets the type of filter to be used. There are many variations on the four main filter types, allowing for great programming flexibility. All but the optimized filters work in RealTime.

Optimized filters

These filters use specially optimized algorithms to achieve extremely high-quality filtering can be used to achieve similar effects.

Lowpass. Cuts frequencies above the cutoff point.

Highpass. Cuts frequencies below the cutoff point.

Bandpass. Cuts all frequencies except for those around the cutoff (center) point, except for the range set by the filter width parameter.

Bandstop. Cuts frequencies around the cutoff (center) point, in the range set by the filter width parameter.

FIR lowpass, FIR highpass, FIR bandpass, and FIR bandstop. These options are not currently supported.

Cascade filters

These are constructed of one or more first-order filters in series, as opposed to optimized algorithms for each filter order, and therefore are easier to implant in RealTime.

Cascade lowpass. Cuts frequencies above the cutoff point.

Cascade highpass. Cuts frequencies below the cutoff point.

Cascade bandpass. Cuts all frequencies except for those around the cutoff (center) point, except for the range set by the filter width parameter.

Cascade bandstop. Cuts frequencies around the cutoff (center) point, in the range set by the filter width parameter.

Cascade allpass. This provides a number of allpass filters in series.

State-Variable filters

These filters may be excited by a source, such as a hammer, as if they were resonating bodies. They are essentially models of a damped spring. The cutoff frequency controls the pitch, and the width controls the decay time (in addition to focusing the pitch). SV lowpass. This is a lowpass State-Variable filter.

SV highpass. This is a highpass State-Variable filter.

SV bandpass. This is a bandpass State-Variable filter.

SV bandstop. This is a bandstop State-Variable filter.

SV infinite Q. This is a State-Variable filter of an infinitely narrow width.

SV generic. This filter allows simultaneous access to the lowpass, highpass, and bandpass results. The normal output port carries the bandpass result; the ports for highpass and lowpass are initially constant ports, so that they do not appear on the icon and cannot hold a connection. They can be located by moving the mouse over the right hand side of the filter icon and watching the message in the upper right of the algorithm window. To make them connectable, bring up the Port Type dialog box by option-clicking on the desired port (outputLP or outputHP). Select DSP Output, and then press "Okay;" the port will become visible as a black square, and can now hold a connection.

Allpass filters

These filters can be used to create dispersion.

Allpass. This filter causes diffusion of the input signal.

Allpass Recursive. This is a recursive first order allpass within an allpass, which provides slightly different dispersion characteristics than the Cascade allpass.

Allpass Delay. This allpass filter is identical to the one used in the waveguides for tuning. The cutoff controls the delay time from 0.0 to 1.0 samples (cutoff from 1.0 to 0.0).

order: This sets the order, or strength, of the filter. 1st order is (roughly) 6 db per octave, 2nd order 12 db per octave, 3rd order 18 db per octave, 4th order 24 db per octave, and so on.

Gain (col. 1, row 7)

The Gain block is a simple volume control module. It may also be used to reverse the polarity of a signal, or to provide loss in a waveguide system.

user name: As above.

input, output:Min value: $-\infty$ Max value: $+\infty$. These are the default values for the input and output audio ports.

gain: Min value: $-\infty$ Max value: $+\infty$. This sets the amount of gain provided by the block. Values less than one reduce gain.

Glottal (col. 1, row 3)

The Glottal block creates a pulse wave suitable for seeding a waveguide vocal model. Unless the periodRising and periodFalling are modulated, they stay the same as the frequency changes, so that only the length of the noise portion varies.

user name: As above.

phase: Min value: $-1.0$ Max value: $+1.0$. This is the default value for the phase modulation port, which controls the phase of the glottal pulse.

output: Min value: $-\infty$ Max value: $+\infty$. This is the default value for the modulation output port.

frequency: Min value: 0.0 Max value: $+1.0$. This sets the default value for the frequency modulation port, which controls the frequency of the glottal pulse. It expects Note Exponential as input.

periodRising: Min value: 0.0 Max value: 1.0. This sets the time which the pulse takes to rise to its maximum amplitude. The total combined time of the rising and falling portions should always be less than the frequency; otherwise, the pulse will be re-started before it has completed its cycle.

periodFalling:Min value: 0.0 Max value: 1.0. This sets the time which the pulse takes to fall from its maximum amplitude to the noise portion. The total combined time of the rising and falling portions should always be less than the frequency; otherwise, the pulse will be re-started before it has completed its cycle.

amplitude: Min value: $-\infty$ Max value: $+\infty$. This sets the default value for the amplitude modulation port, which controls the amplitude (loudness) of the glottal pulse.

noise: Min value: $-\infty$ Max value: $+\infty$. This sets the amount of noise included in the glottal pulse.

Type menu:

Glottal 1. This pulse has a falling edge which drops abruptly into the noise portion (see FIG. 15).

Glottal 2. This pulse has a falling edge which curves gradually into the noise portion (see FIG. 16).

Hammer (col. 4, row 2)

The Hammer Block is used to add an impulse to a waveguide system (in conjunction with an Addin block), or to excite a state-variable filter. Hammers derive their shape from a table, and several common shapes are available under the Hammer Shape menu. Additionally, hammers may use hand-drawn or equation-generated tables, or tables imported from other files.

user name: As above.

phase: Min value: 0.0 Max value: 1.0. This sets the default value of the phase modulation port, which controls the phase of the hammer shape.

output: Min value: $-\infty$ Max value: $+\infty$. This is the default value for the output audio port.

frequency: Min value: 0.0 Max value: $+1.0$. This controls the frequency of the hammer, and expects Note Exponential as input.

amplitude: Min value: $-\infty$ Max value: $+\infty$. This sets the default value for the amplitude modulation port, which controls the amplitude (loudness) of the hammer.

noise: Min value: $-\infty$ Max value: $+\infty$. This sets the amount of noise that will be added to the current hammer when Add Noise (under Hammer Type) is used.

Hammer Shape menu: After selecting a hammer shape, the user must push the Calculate button to apply the shape to the hammer.

Raised Cosine. This produces a rounded hammer shape.

Peak. This produces a triangular hammer shape.

Pulse. This produces a single pulse.

Noise. This produces random noise for the hammer shape.

Table

The hammer uses a table to display and generate its waveform.

Calculate button: Calculate causes the waveform specified by the Hammer type and noise amount to be calculated, used, and displayed in the table.

Import button: Import allows the user to use a table from another file. Clicking on this button will bring up the standard Macintosh File dialog box, allowing the user to choose the source file. The user will then be asked to select a table from that file to be used in the hammer.

Equation button: Equation allows the user to generate a table from an equation. Clicking on this button will bring up a dialog box with a text field, into which an equation may be entered. Entering the desired equation and then clicking OK will cause the table to be generated.

Noise button: This adds an amount of noise (specified in the noise parameter above) to the current table.

Bandlimit button: This function may be used to smooth out a table. Pressing this button brings up the bandlimit dialog box.

Bandlimit Dialog Box

Frequency: Min value: 0.0 Max value: $+1.0$. This parameter works in conjunction with Length to determine the amount of smoothing which occurs. The lower the frequency, the more smoothing.

Length: Min value: 0.0 Max value: length of table. This parameter determines the length of the bandlimiting window (how many samples are looked at for the generation of each point), and so works in conjunction with Frequency to determine the amount of smoothing which occurs. The greater the length, the greater the smoothing.

Window shapes: The shape of the bandlimiting window determines the weighting curve of the points within the window. The Rectangular shape weights all of the points equally; the other shapes may weight points closer to the center more heavily, and so on. In practice, the user may not notice much of a difference between the various shapes.

Rectangular. This is the default.

Hanning. This is an alternate window shape.

Hamming. This is another alternate window shape.

Blackman. This is yet another alternate window shape.

Limit: This option limits the output of the table to −1 and +1.

Normalize: This option normalizes the output of the bandlimiting, so that the maximum deviation of the waveform is 1.

Amplitude: This option scales the output of the bandlimiting function.

Junction (col. 3, row 5)

The Junction Block is used to connect elements in a waveguide system. It may be grown for more input and output ports. If the user needs only a two-input junction, and the user wishes to modulate the admittances, use the Junction2 block instead.

user name: As above.
normalize menu:
True. This attempts to equalize the energy on all sides of the junction, to avoid clipping within the block.
False. This preserves energy in the junction, allowing clipping to occur within the block.

junction: Min value: 0.0 Max value: +1.0. This sets the admittance for the junction itself. A value of 0.0 means that the junction has an infinite impedance, reflecting signals with a −1; a setting of 1.0 has no effect.

input (n), output (n): Min value: −∞ Max value: +∞. These are the default values for the input and output(n) audio ports.

admittance (n): Min value: 0.0 Max value: +∞. This sets the admittance for input and output ports (n). The admittance may be thought of as the cross-sectional area of the waveguide; the greater this value is, the more the waveguide interacts with the junction and the other waveguides connected to the junction.

The following are the equations for the Junction block. $P_J$ is the total pressure in the Junction; $Pin_i$ is the input pressure for input i; $Pout_i$ is the output pressure for output i; $\Gamma_i$ is the admittance of input and output ports i; $\alpha$ is the weighting factor for the pressure.

$$P_J = \sum_{i=1}^{N} \alpha_i Pin_i$$

$$Pout_i = P_J - Pin_i$$

$$\alpha_i = \frac{2\Gamma_i}{\sum_{j=1}^{N} \Gamma_j}$$

Junction 2 (col. 4, row 5)

The Junction2 Block is similar to a normal 2-input junction. Instead of allowing the admittances to be individually adjusted, it offers a single parameter, named reflection, to control the ratio between them. Unlike the admittances of a normal junction block, the Junction2's reflection parameter may be modulated, without glitching.

user name: As above.

input 1, output 1: Min value: −∞ Max value: +∞. These are the default values for the input and output(n) audio ports.

reflection: Min value: −1.0 Max value: +1.0. This sets the ratios of the two admittances. At 0.0, the two admittances are identical; at +1.0, it is as if the left admittance (input/output 1) were 0 and the right admittance (input/output 2) infinite; and at −1.0, it is as if the left admittance (input/output 1) were infinite and the right admittance (input/output 2) equal to 0.

The admittance may be thought of as the cross-sectional area of the waveguide; the greater this value is, the more the waveguide interacts with the junction and the other waveguides connected to the junction.

This is the equation behind the reflection value. $\Gamma$ represents admittance, so $\Gamma_1$ is admittance 1, and $\Gamma_2$ is admittance 2.

$$\text{Reflection} = \frac{\Gamma_1 - \Gamma_2}{\Gamma_1 + \Gamma_2}$$

Lag (col. 4, row 3)

The Lag block is a simple one-pole lowpass filter which has 2 separate cutoff frequencies. The attack frequency is used when the input level to the Lag is rising, and the decay frequency is used when the input is diminishing.

Due to the low sampling rate of MIDI controllers, it is often desirable to filter them before use. Filtering, however, has the drawback of introducing delays, which can sometimes cause difficulties—especially with breath control, which can be responsible for shaping the attack of a sound. If the controller is delayed by the filter, the attack may not be fast enough. The Lag block helps to alleviate this problem. Setting a high attack frequency and a low decay frequency allows fast response to a quick burst of data, while smoothing the less time-sensitive decay portions.

The Lag block may also be used as a simple envelope generator, controlled by either a trigger or a gate.

user name: As above.

input, output: Min value: −∞ Max value: +∞. These are the default values for the input and output ports.

attack: Min value: 0.0 Max value: 1.0. This is the cutoff frequency for the attack.

decay: Min value: 0.0 Max value: 1.0. This is the cutoff frequency for the decay.

Lattice (col. 1, row 4)

The Lattice Block is a filter made out of series of Junction2 modules and waveguides, each only a single sample long. It is particularly useful in vocal models. Similar to the Junction2, the Lattice block offers a single parameter, named reflection, to control the ratio between the admittances of its segments. Its editor is similar to that of the Tube block, except that the widths of the Lattice segments are always auto-normalized.

Segments may be added by simply clicking on a blank space in the Lattice Edit window, or by using the Grow tool. When operating in RealTime at 44.1 kHz, the user can create up to about 12 segments in the system of FIG. 1; in non-RealTime, the user can have up to about 40.

The Lattice Edit window (Double-Click) is shown in FIG. 17.

input 1, output 1, input 2, output 2: Min value: −∞ Max value: +∞. These are the default values for the input and output(n) audio ports.

Conical button: Pressing this button brings up a dialog box which allows the user to simulate a cone with the Lattice. The user may select two or more segments as the start and end points, to be interpolated between. If no segments are selected, the first and last segments are used as the endpoints.

Cone Type

Admittance. This creates a lattice of the specified shape by altering the admittance of each lattice segment. Since admittance is essentially an area (admittance is proportional to radius$^2$), as opposed to width, the 2-dimensional display may not look as the user would expect it to.

Radius. This creates a lattice of the specified shape by altering the radius of each lattice segment.

Cone Shape

Linear. This creates equal changes in admittance or radius from segment to segment.

Flare. This produces a cone with a variable amount of curvature, according to the flare amount set in the box at the right. Flare amounts of greater than one cause the greatest change to occur at the right side of the cone; amounts less than one cause the greatest change to occur at the left side of the cone; a flare amount of one is the same as selecting a Linear shape.

Exponential. This produces a cone with an exponential curve between the selected segments.

Logarithmic. This produces a cone with a logarithmic curve between the selected segments.

Lattice Edit mouse commands

The Lattice Edit window incorporates a few special mouse-based commands, as described below.

Click and drag on line: Dragging vertically changes the ratio between the selected segment and the segment to its right. Notice that the Lattice block always autonormalizes itself, so that the widest segment is always equal to 1, and all other segments are scaled accordingly.

Double-click on line Double-clicking: brings up a small dialog box, allowing the user to precisely set the segment's reflection.

Command-click on line: Command clicking, in this instance, is the same as double-clicking.

Click on "empty" space: Inserts a new Lattice segment, with its amplitude determined by the place at which the user clicked.

Text Edit Window

The Text Edit window contains a few other parameters, in addition to those discussed above.

user name: As above.

reflection (n): Min value: $-1.0$ Max value: $+1.0$. This sets the ratios of the two admittances for segment (n) of the Lattice filter. At 0.0, the two admittances are identical; at $+1.0$, it is as if the left admittance (input/output 1) were 0 and the right admittance (input/output 2) infinite; and at $-1.0$, it is as if the left admittance (input/output 1) were infinite and the right admittance (input/output 2) equal to 0.

The admittance may be thought of as the width of the waveguide; the greater this value is, the more the waveguide interacts with the junction and the other waveguides connected to the junction.

Lfo (col. 4, row 6)

The Lfo block is used to efficiently create a simple oscillator for modulation. For more complex waveforms, an oscillator block can be used instead.

user name: As above.

trigger: Min value: $-\infty$ Max value: $+\infty$. A trigger received at this port will reset the Lfo to the beginning of its waveform, allowing the user (for instance) to sync the Lfo to key down.

output: Min value: $-\infty$ Max value: $+\infty$. This is the default value for the modulation output port.

phase: Min value: 0.0 Max value: 1.0. This sets the phase of the Lfo waveform.

frequency: Min value: 0.0 Max value: $+1.0$. This sets the frequency of the Lfo waveform.

amplitude: Min value: $-\infty$ Max value: $+\infty$. This sets the amplitude of the Lfo. To avoid clipping, the sum of this parameter and the offset should be no greater than one.

offset: Min value: $-1$ Max value: $+1$. This allows the user to shift the entire Lfo waveform around the zero crossing, so that the user can (for instance) create a wave that oscillates between 0 and 1, without ever going negative. To avoid clipping, always make sure that the sum of the offset and the amplitude is no greater than one.

type menu: This menu sets the waveform of the Lfo.

Sine.

Triangle.

Square.

Sawtooth.

Noise.

interpolate menu: The Lfo block (along with the Oscillator block) features a special interpolation method, which "wraps" from the end of the table back to the beginning—so that interpolation of points near the end of the table takes into account the points at the beginning, and vice-versa. This is conceptually similar to cross-fade looping a sample.

None. This option is computationally efficient, but may sometimes cause the user's wave shapes to sound grainy.

Linear. This option uses linear interpolation to clean up the sound of the table.

Link (col. 6, row 8)

The Link Block is similar to the Algorithm Block, in that it represents a merged group of one or more blocks and ports. The Link stores a reference to another file, however, allowing the user to maintain a link between the two files—if the user makes a change in the referenced file, it is automatically reflected in the Link block. The user cannot edit Links directly—the user must instead edit the source file. Links can save memory on disk, and allow the user to easily keep and maintain a library of basic algorithms, to be used in many larger algorithms.

Basic Text Edit window (double-click)

connectOutput: Min value: $-\infty$ Max value: $+\infty$. These are the default values for the various ports of the Linked algorithm.

Specify Link button: Pressing this button enables the user to create a new link for the block. The user can re-create the link if the user has moved the original file, for instance, or use another file entirely.

The name and directory of the original file are displayed in the edit window, along with other file information. For more explanation, see the alternate edit window description, below.

Check Link button: This function checks to make sure that the linked file still exists.

Expert Text Edit window (command-click)

user name: As above.

connectOutput: Min value: $-\infty$ Max value: $+\infty$. These are the default values for the various ports of the Linked algorithm.

File Characteristics

These values are presented primarily for reference purposes, and changing them is not recommended. If the user wishes to change the link, use the Specify Link button in the basic editor instead.

name: This is the name of the source file which contains the linked algorithm.

VolNum: This identifies the disk containing the source file of the linked algorithm.

dirID: This identifies the folder containing the source file of the linked algorithm.

creationDate: This is the time when the source file was created, just like the Creation Date of a folder, application, or document in the Macintosh Finder.

number: Since some files can contain more than one algorithm, it is necessary to differentiate between them. This is the number of the linked algorithm in the source file.

algorithm: This is the user name of the linked algorithm within the source file. It is redundant with the linked algorithm number.

Lms (col. 6, row 3)

The least mean square (Lms) block is a self-adjusting filter, which can be used to make one waveform resemble another, for vocoding-like effects.

user name: As above.

input, output:Min value: $-\infty$ Max value: $+\infty$. These are the default values for the input and output audio ports.

error: Min value: $-\infty$ Max value: $+\infty$. This is the default value for the error port. The filter tries to alter its characteristics so that this value approaches zero.

update: Min value: 0.0 Max value: 1.0. This sets the amount by which the filter will change in one sample period.

type: Lms 1, Lms 2. This parameter allows an argument specifying more than one type of Lms filter routine.

order: Min value: 0 Max value: 100. This sets the length of the FIR filter. Longer filters require greater processing times. In practical terms, the maximum order is around 20 at the default DSP rate of 44.1 kHz.

Math

The Math Block allows the user to process one or more signals through an equation.

Many of the math functions may be available in Real-Time on both the Host and the DSP; others only on the Host, and some only in table generation and non-Real-Time, as noted in the examples below. On the DSP, all numbers must be between $-1$ and $+1$, inclusive; on the Host, the range is much wider, spanning from $-256$ to $+255.9$.

user name: As above.

A (B,C etc.), output: Min value: $-\infty$ Max value: $+\infty$. These are the default values for the variable number of input ports (lettered A-Z) and the output port.

equation: The math block supports a large number of building blocks for equations, as listed below. Capital letters refer to the data at the input ports. The user may use constants and parentheses, and spaces are always ignored.

If the equation is not valid, the program will notify the user with dialog boxes. Zero divides and logarithms of zero are detected, as are powers of a negative number.

The functions min, max, ave, and mse support variable numbers of parameters.

Mathematical functions

+ (addition).

− (subtraction or unary minus).

* (multiply). Note that the shift left function efficiently performs multiplication by factors of 2.

A divide function is available on the Host only (see below). Note also that the shift right function efficiently performs division by factors of 2.

Logical functions

The following functions send out "0.0" for 0/false, and "+1.0" for 1/true. For logical input, less than or equal to zero is considered to be false, and greater than zero is considered to be true.

> (greater than).

>= (greater than or equal to).

< (less than).

<= (less than or equal to).

== (equal to).

!= (not equal to).

|| (logical or). If either of the arguments is positive (greater than zero), this function is true.

⊻ (logical exclusive or). If one, but not both, of the arguments is positive (greater than zero), this will send out a "1" (true).

! (logical not). This can be applied to a logical operation to send out the opposite of its evaluation, so that true becomes false and false becomes true. For instance, if A=0.5, then the expression !(A>0.6) is evaluated as follows. First, it is determined that (A>0.6) is false; that result is then inverted by the logical not, so that the false becomes a true, and "+1" is sent out.

Bitwise functions;

The bitwise functions operate on the individual bits of the digital signal, as opposed to the signal in its entirety.

<< (shift left). This shifts the bits of the left argument to the left, by the number of bits specified by the right argument. Effectively, this multiplies the signal by factors of 2. Shift left is much more computationally efficient than using the multiply operator. An example would be A>>1.

>> (shift right). This shifts the bits of the left argument to the right, by the number of bits specified by the right argument. Effectively, this divides the signal by factors of 2. Shift right is much more computationally efficient than using the divide operator—and can be performed on the DSP, while an actual divide cannot.

& (bitwise and).

| (bitwise or).

!! (bitwise not).

Other functions;

squ (square).

abs (absolute value).

sign. "Signum" function, also known as a hard limiter. Outputs a "+1.0" for positive input, and a "−1.0" for negative input.

DSP-Only Functions

These functions are available only on the DSP, and not on the host.

uadd (unsigned add).

usub (unsigned subtract).

lmult (low multiply). Low multiply acts as the usual multiply, but takes its result from the low 24 bits of the 48 bit result. Imult(x,y) is (x*y)<<24. If used properly, the user can do multiplies of greater than one in real time. The only trick is that y should be a very small number, and both x and y should be positive only. Although y is small, its resolution will not be very good, since it still must be a 24 bit number.

Notice that x=Imult(x, 1.0/16777216.0). Thus, x times y (where y is greater than one) is Imult(x,y/16777216.0). For y=4.0, 4.0/1677216.0=0.0000023849045, so the user would use Imult(x,0.0000023849045).

Host-Only Functions:

These functions are available only on the host, and not on the DSP.

/ (divide). See also the shift right function.

max (maximum). This function may have a variable number of arguments.

min (minimum). This function may have a variable number of arguments.

mod (modulus). This function divides the first argument by the second, and then sends out the remainder. If x=11 and y=3, for instance, mod(x,y)=2.

mse (mean squared error). This function measures the spread of its arguments by computing the sample standard deviation. Mean squared error may have a variable number of arguments.

ave (average). The ave function takes the average of its arguments; for instance, ave(7, 9, 8)=8. Average may have a variable number of arguments.

Non-Real Time functions;

These functions are available only in table generation or non-RealTime operation in the system of FIG. 1.

acos (arccosine). This returns (arccosine x)/.
asin (arcsine). This returns (arcsine x)/.
atan (arctangent). This returns (arctangent x)/.
cos (cosine).This computes the cosine of x.
cosh (hyperbolic cosine).
exp (exponential base e).
exp2 (exponential base 2).
exp10 (exponential base 10).
log2 (logarithm base 2).
log10 (logarithm base 10 ).
ln (logarithm base e).
noize (noise).
sin (sine). This computes the sine of x.
sinh (hyperbolic sine).
sqrt (square root).
tan. This computes the tangent of x.
tanh (hyperbolic tangent). This function is useful for creating s-shaped distortion, or flute model curves.

$\wedge$(power). A$\wedge$B is A raised to the power of B; 2$\wedge$3, then, is 2 cubed, or 8. Note that the squ (square) function is available in RealTime.

pow (power). This performs the same function as the "$\wedge$", but uses a different syntax; pow(x,y) is x$\wedge$y.

Examples of Valid Equations:
A+0.5
(A−B)*0.3
squ(A)+0.3*A+0.1
pow(A,B)*0.5
exp(0.9/A)
ln(A+B)
noise(0.1)*A
min(A,B,0.1)

Conditional Executions:

Conditional executions of the form "if x is true, return y; otherwise, return z" are also supported. The syntax is just like in the C programming language, so that the above condition becomes x?y:z. Some examples are:

(A>0.1)?A:B
(abs(A)>abs(B))?0.2:B*0.4 limit: Practically speaking, limiting is always in effect on the DSP, since its numbers can only be between −1.0 and +1.0.

True. When limit is set to true, the results are limited to a range between −1.0 and +1.0.

False. When limit is set to false, the results are passed out unchanged.

Meter (col. 5, row 9)

The Meter block can be used to display the level of a Engine signal. The Meter is a Control Panel block, similar to the Slider and Selector. The block itself doesn't do anything, but it causes a bar-graph style meter to appear in the Control Panel. This bar-graph shows the level of input to the Meter block, updated 6 times per second. The user can use this to determine the overall level at a certain point in the patch, or to monitor clipping.

Each meter has two lines of text underneath the icon. The first contains the normal information—block number and user name. The second line displays the second name, which also identifies the Meter in the Control Panel.

user name: As above.

Input: Min value: $-\infty$ Max value: $+\infty$. The level of this input is graphically displayed in the Control Panel meter.

name: Use this field to enter a description of the signal which the Meter is monitoring. This name will identify the Meter in the Control Panel.

minimum: Min value: $-\infty$ Max value: $+\infty$. This sets the value of the Meter at its lowest position.

maximum: Min value: $-\infty$ Max value: $+\infty$. This sets the value of the Meter at its topmost position.

horizontal: Min value: $-\infty$ Max value: $+\infty$. This sets the horizontal position of the Meter in the control panel.

vertical: Min value: $-\infty$ Max value: $+\infty$. This sets the vertical position of the Meter in the control panel.

width: Min value: $-\infty$ Max value: $+\infty$. This sets the width of the Meter in the control panel.

height: Min value: $-\infty$ Max value: $+\infty$. This sets the height of the Meter in the control panel.

Mixer (col. 5, row 6)

The Mixer block may be grown for more inputs.

Double-clicking or using the Edit Tool brings up the Graphic Mixer window; command-clicking brings up the text edit window.

The Graphic Mixer window (double-click) is shown in FIG. 18.

The Graphic Mixer allows the user to change the gain of each input by moving the graphic sliders shown in FIG. 18 with the mouse. Move the sliders by clicking and dragging on them.

user name: As above.

gain(n): Min value: −1.0 Max value: +1.0. This is the gain value for input (n).

Text Edit window (command-click)

user name: As above.

output, input (n): Min value: $-\infty$ Max value: $+\infty$. These are the default values for the output and input(n) audio ports.

gain(n): Min value: −1.0 Max value: +1.0. This is the gain value for input (n).

Noise (col. 6, row 2)

The Noise block generates white noise, for use in percussive sounds, adding noise to waveguide models, or injecting randomness into any algorithm.

user name: As above.

output: Min value: $-\infty$ Max value: $+\infty$. This is the default value for the audio output port.

amplitude: Min value: $-\infty$ Max value: $+\infty$. This is the default value for the amplitude modulation port, which controls the amplitude, or loudness, of the noise.

filter: Min value: −1.0 Max value: +1.0. This sets the cutoff point of the built-in first order filter, which can be either highpass or lowpass. In the range from 0.0 to 1.0 it is a lowpass filter, with 1.0 being the greatest amount; in the range from −1.0 to 0.0 it is a highpass filter, with −1.0 being the greatest amount. A value of 1 (or −1, in highpass mode) is equal to the Nyquist frequency of the DSP sampling rate, as set under Parameters in the DSP menu.

Noise Type menu: This menu allows the user to select the method of noise generation.

Additive. This is the recommended selection.

Length 17. This is an alternate noise generation method.

Length 23. This is another alternate noise generation method.

Oscillator (col. 3, row 2)

The Oscillator block comes with several standard waveforms, and may additionally play back complex tables generated from an equation or drawn by the user.

user name: As above.

reset: When a trigger is received at the reset port, the oscillator's phase is reset.

phase: Min value: 0.0 Max value: 1.0. This controls the phase of the oscillator. Using another oscillator as the phase modulation source produces FM. To allow deeper modulation for those synthesis techniques, the input is scaled by a factor of 4.

output: Min value: $-\infty$ Max value: $+\infty$. This is the default value for the audio output port.

frequency: Min value: 0.0 Max value: +1.0. This sets the frequency of the oscillator. The frequency port expects Note Exponential input.

amplitude: Min value: $-\infty$ Max value: $+\infty$. This sets the amplitude, or loudness, of the oscillator.

noise: Min value: $-\infty$ Max value: $+\infty$. This parameter determines the amount of noise to be added to the table when the Noise button is pressed.

Interpolate menu: The Oscillator block (along with the Lfo block) features a special interpolation method, which "wraps" from the end of the table back to the beginning—so that interpolation of points near the end of the table takes into account the points at the beginning, and vice-versa. This is conceptually similar to cross-fade looping a sample.

None. This option is computationally efficient, but may sometimes cause the user's wave shapes to sound grainy.

Linear. This option uses linear interpolation to clean up the sound of the table.

Wave Shape menu: To apply the selected Wave Shape to the oscillator, press the Calculate button.

Sine.
Triangle.
Square.
Sawtooth.

Calculate button: Calculates a new table based on the specified table shape, noise amount, and (if applicable) power.

Import button: Import allows the user to use a table from another file. Clicking on this button will bring up the standard Macintosh File dialog box, allowing the user to choose the source file. The user will then be asked to select a table from that file.

Equation button: Equation allows the user to generate a table from an equation. Clicking on this button will bring up a dialog box with a text field, into which an equation may be entered. Entering the desired equation and then clicking OK will cause the table to be generated.

Noise button: This adds an amount of noise (specified in the noise parameter above) to the current table.

Bandlimit button: This function may be used to smooth out a table. Pressing this button brings up the Bandlimit dialog box.

Bandlimit Dialog Box

Frequency: Min value: 0.0 Max value: +1.0. This parameter works in conjunction with Length to determine the amount of smoothing which occurs. The lower the frequency, the more smoothing. Try values of 0.1 or less.

Length: Min value: 0.0 Max value: length of table. This parameter determines the length of the bandlimiting window (how many samples are looked at for the generation of each point), and so works in conjunction with Frequency to determine the amount of smoothing which occurs. The greater the length, the greater the smoothing. Try lengths of 100 or more.

Window shapes: The shape of the bandlimiting window determines the weighting curve of the points within the window. The Rectangular shape weights all of the points equally; the other shapes may weight points closer to the center more heavily, and so on.

Rectangular. This is the default.
Hanning. This is an alternate window shape.
Hamming. This is another alternate window shape.
Blackman. This is yet another alternate window shape.

Limit This option limits the output of the table to $-1$ and $+1$.

Normalize This option normalizes the output of the bandlimiting, so that the maximum deviation of the waveform is 1.

Amplitude This option scales the output of the bandlimiting function.

Pan (col. 6, row 6)

The Pan block enables the user to control the spread of one or two inputs over the stereo field as shown in FIG. 19. Pan may be dynamically modulated.

user name: As above.

input1 200, input2 201, outputLeft 202, outputRight 203: Min value: $-\infty$ Max value: $+\infty$. These are the default values for the input1, outputLeft, input2, and outputRight audio ports.

pan: Min value: 0.0 Max value: 1.0. This determines the panning of the two inputs controlled in gain stages 204–207. A value of 0.5 will send equal amounts of both inputs to each output; a value of 0.0 results in hard panning with input 1 to the right and input 2 to the left; a value of 1.0 results in hard panning with input 1 to the left and input 2 to the right. Intermediate values produce soft panning.

Patch (col. 1, row 9)

The Patch block will allow the user to configure an algorithm for MIDI performance. Double-clicking on this block opens up the algorithm edit window for the patch; command-clicking opens up the text edit window.

Text Edit window (command-click)

user name: As above.

allocation: Cycle. This is the default allocation mode, in which each available voice is used in turn. If the same key is struck and then re-struck, both notes will sound through their release. Cycle always looks for the oldest inactive voice.

Retrigger. This allocation mode is slightly more efficient than Cycle. Instead of taking the time to search for the oldest inactive voice, it simply uses the first one that it finds. Generally, the user should not need to use Retrigger.

Reuse. In this mode, if the same key is struck and then re-struck, the old note will be stolen by the new. Otherwise, this mode is identical to Cycle, described above.

Legato. This causes the voice to use monophonic voice allocation, so that only one note sounds at a time. Additionally, if a note is played legato—that is, if it is pressed down before a previously sounding note is released—the pitch of the note will change, but it will not be re-triggered. This method is good for simulating monophonic instruments, such as winds, or lead sounds.

voices: Min value: 0 Max value: limited by complexity of patch. This sets the maximum number of voices which the patch can simultaneously sound. The maximum possible number of voices will change relative to the complexity of the patch. This value must be an integer.

transpose: Min value: $-\infty$ Max value: $+\infty$. This sets the number of steps by which the voice will be transposed. This value must be an integer.

midi port: Modem. This will cause the voice to receive MIDI data from the Macintosh's Modem port.

Printer. This will cause the voice to receive MIDI data from the Macintosh's Printer port.

midi channel: Omni. This will cause the voice to respond to all MIDI channels on the selected port.

1–16. This will put the voice into Poly mode on the selected channel number. It will thus respond to MIDI data only on the selected channel of the selected port.

key low: Min value: 0 Max value: 127. This sets the lowest MIDI key number on which the voice will sound.

key high: Min value: 0 Max value: 127. This sets the lowest MIDI key number on which the voice will sound.

velocity low: Min value: 1 Max value: 127. This sets the lowest MIDI velocity level on which the voice will sound.

velocity high: Min value: 1 Max value: 127. This sets the highest MIDI velocity level on which the voice will sound.

Patch Link (col. 2, row 9)

The PatchLink block is similar to the Patch block, except that it establishes a link to a Patch in another file stored on disk. This allows the user to use the same Patch in a number of sounds, and keep all of the sounds updated with the most recent version of the Patch. The Patch algorithm can only be edited in the original file; only the MIDI performance parameters may be altered in the PatchLink.

Double-clicking on this block opens up the text edit window.

Allocation: Cycle. This is the default allocation mode, in which each available voice is used in turn. If the same key is struck and then re-struck, both notes will sound through their release. Cycle always looks for the oldest inactive voice.

Retrigger. This allocation mode is slightly more efficient than Cycle. Instead of taking the time to search for the oldest inactive voice, it simply uses the first one that it finds. Generally, the user should not need to use Retrigger.

Reuse. In this mode, if the same key is struck and then re-struck, the old note will be stolen by the new. Otherwise, this mode is identical to Cycle, described above.

Legato. This causes the voice to use monophonic voice allocation, so that only one note sounds at a time. Additionally, if a note is played legato—that is, if it is pressed down before a previously sounding note is released—the pitch of the note will change, but it will not be re-triggered. This method is good for simulating monophonic instruments, such as winds, or lead sounds.

voices: Min value: 0 Max value: limited by complexity of patch. This sets the maximum number of voices which the patch can simultaneously sound. The maximum possible number of voices will change relative to the complexity of the patch. This value must be an integer.

transpose: Min value: $-\infty$ Max value: $+\infty$. This sets the number of steps by which the voice will be transposed. This value must be an integer.

midi port: Modem. This will cause the voice to receive MIDI data from the Macintosh's Modem port.

Printer. This will cause the voice to receive MIDI data from the Macintosh's Printer port.

midi channel: Omni. This will cause the voice to respond to all MIDI channels on the selected port.

1–16. This will put the voice into Poly mode on the selected channel number. It will thus respond to MIDI data only on that channel of the selected port.

key low: Min value: 0 Max value: 127. This sets the lowest MIDI key number on which the voice will sound.

key high: Min value: 0 Max value: 127. This sets the lowest MIDI key number on which the voice will sound.

velocity low: Min value: 1 Max value: 127. This sets the lowest MIDI velocity level on which the voice will sound.

velocity high: Min value: 1 Max value: 127. This sets the highest MIDI velocity level on which the voice will sound.

File Characteristics

The values are presented for reference purposes. To re-configure a Patch Link, use the Specify Link button.

name: This is the name of the source file which contains the linked algorithm.

Volume Number: This identifies the disk containing the source file of the linked algorithm.

Directory ID: This identifies the folder containing the source file of the linked algorithm.

Creation: This is the time when the source file was created, just like the Creation Date of a folder, application, or document in the Macintosh Finder.

Number: Since some files can contain more than one algorithm, it is necessary to differentiate between them. This is the number of the linked algorithm in the source file.

Algorithm: This is the user name of the linked algorithm within the source file. It is redundant with the linked algorithm number.

Specify Link button: Pressing this button brings up the Macintosh Standard File dialog box, enabling the user to specify a new file to be referenced by the link.

Check Link button: This function checks to make sure that the linked file still exists.

PitchShifter (col. 2, row 5)

The Pitch Shifter block allows the user to shift the pitch of a signal. This may be used for thick, stable chorusing effects, or for more radical transposition.

user name: As above.

input, outputLeft, outputRight: Min value: $-\infty$ Max value: $+\infty$. These are the default values for the input and output ports.

The two outputs are phase-inverted, to create a stereo effect.

mix: Min value: 0.0 Max value: 1.0. This is the mix between the original and pitch-shifted signals.

predelay: Min value: 10 Max value: limited by available memory. This set the delay, in milliseconds, before the signal is output. It must be set to 10 ms. or greater.

pitch: Min value: −1.0 Max value: +1.0. This sets the amount of pitch alteration. −1 is equal to an octave down, 0 causes no pitch shifting, and +1 is equal to a fifth up.

Receive (col. 4, row 8)

The Receive Block may be used by itself to route MIDI modulation within Engine, or to create virtual wires in conjunction with the Send Block.

Double-clicking or using the Edit Tool brings up the menu-based window; command-clicking brings up the text edit window.

Menu Edit window (double-click)

output: Min value: −∞ Max value: +∞. This is the default value for the output port.

filter: Min value: 0.0 Max value: +1.0. This is a built-in, first-order lowpass filter, provided for the purpose of smoothing out controller data. Like other filters in the engine, a filter cutoff of 1.0 is equal to the nyquist frequency of the current DSP sampling rate (the default rate for the Sound Accelerator is 44.1 kHz, so the nyquist frequency is 22.05 kHz).

The filter works with all receive options except for the Note On/Off Triggers and the Sustain On/Off Triggers.

name menu: This is the name of the bus on which this block receives. The user name is completely separate from the bus name.

Clicking on this field brings up a menu of bus selections.

Note On Trigger. This sends out a trigger each time a note on occurs. The Note On Trigger may be used to re-start envelopes with each note on event, for instance, or to sync oscillators or LFOs.

Note Off Trigger. This sends out a trigger each time a note on occurs.

Sustain On Trigger. This sends out a trigger each time the sustain pedal (MIDI Controller 64) is pressed down.

Sustain Off Trigger. This sends out a trigger each time the sustain pedal (MIDI Controller 64) is let up.

Note On Gate. This sends out a 1 as long as the key is held down, and a 0 when it is released.

Note Off Gate. This sends out a 0 as long as the key is held down, and a 1 when it is released.

Sustain On Gate. This sends out a 1 as long as the sustain pedal (MIDI Controller #64) is held down, and a 0 when it is released.

Sustain Off Gate. This sends out a 0 as long as the sustain pedal (MIDI Controller #64) is held down, and a 1 when it is released.

Note Linear. This option should be used when the note data will be merged with another controller, such as pitch bend. After all desired controllers have been merged with the note linear data, the result should be sent through an Exponential block, and then routed to the frequency input.

Note Exponential. This option should be used when the note data will be sent directly to its destination, such as an Filter, Glottal, Hammer, or Oscillator (and Sample, when it becomes functional).

Length Linear. This option converts MIDI note data to control the length of a Delay, Tube segment, or Waveguide. Length Linear should be used only when other pitch modulators, such as pitch bend, will be merged with the MIDI notes. After using a Mixer block to merge the controllers and the Length Linear output, the sum must be processed through an Exponential block.

Length Exponential. This option should be used when the note data will be sent directly to a Delay, Tube, or Waveguide.

Velocity. This receives the velocity of the key down.

Release Velocity. This receives the velocity of the key up.

Time. This is a percentage (expressed as 0–1) of the total generate time, when not working in RealTime.

Pitch Bend. This receives the MIDI pitch bend wheel. It must be merged with Note or Length Linear, and then processed through the Exponential block.

Aftertouch. This receives monophonic aftertouch.

Mod Wheel. This receives the MIDI Mod Wheel (Controller #1).

Breath Control. This receives MIDI Breath Control (Controller #2).

Foot. This receives MIDI Foot Controller (Controller #4).

Portamento. This receives MIDI Portamento Controller (Controller #5).

Data. This receives MIDI Data Controller (Controller #6).

Volume. This receives MIDI Volume (Controller #7).

Joystick X. This receives the X-axis of the joystick (Controller #16).

Joystick Y. This receives the Y-axis of the joystick (Controller #17).

Mouse X. This receives the horizontal position of the Macintosh mouse. To use this source, make sure that Mouse, under the RealTime menu, is checked. This is required to enable the mouse as a modulation source.

Mouse Y. This receives the vertical position of the Macintosh mouse. To use this source, make sure that Mouse, under the RealTime menu, is checked. This is required to enable the mouse as a modulation source.

Any bus names used by active sends appear at the bottom, and may be selected.

Text Edit window (command-click)

Command-clicking on the Receive block brings up the text edit window, which also contains some of the parameters from above.

user name: As above. Note that this is entirely separate from the bus name selected from the "name" menu.

Reed (col. 5, row 5)

Figure 20:
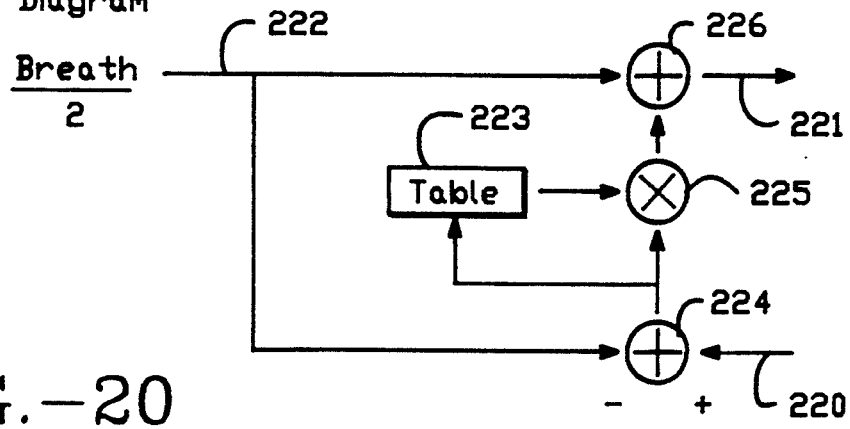
FIG. 20 is a block diagram of the Reed function block.

The Reed block, as illustrated in FIG. 20, may be used, in conjunction with a waveguide system, to create a model of a single-reed woodwind instrument. In addition to using the hc, m, and curvature parameters to specify a Table, the user may also use equations to generate a table, draw one directly onto the screen, or import one from another document.

user name: As above.

input 220, output 221: Min value: −∞ Max value: +∞. These are the default values for the input and output audio ports.

breath 222: Min value: −∞ Max value: +∞. This is the default value for the breath modulation port. The modulation source (often an envelope) connected to this port is analogous to the strength of breath into a wind instrument; this is roughly equivalent to volume.

The input 220 is supplied to adder 224, where it is combined with the breath 222 parameter (divided by 2).

Figure 21:
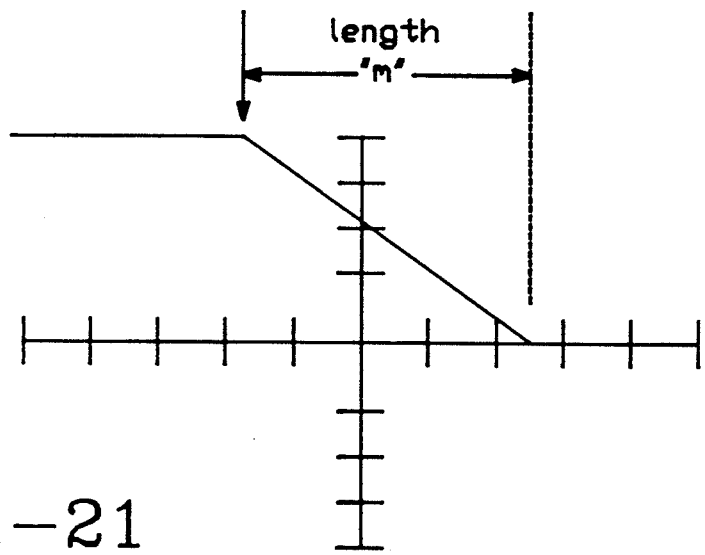
FIGS. 21 and 22 are examples of the reed tables used with the Reed function block.
Figure 22:
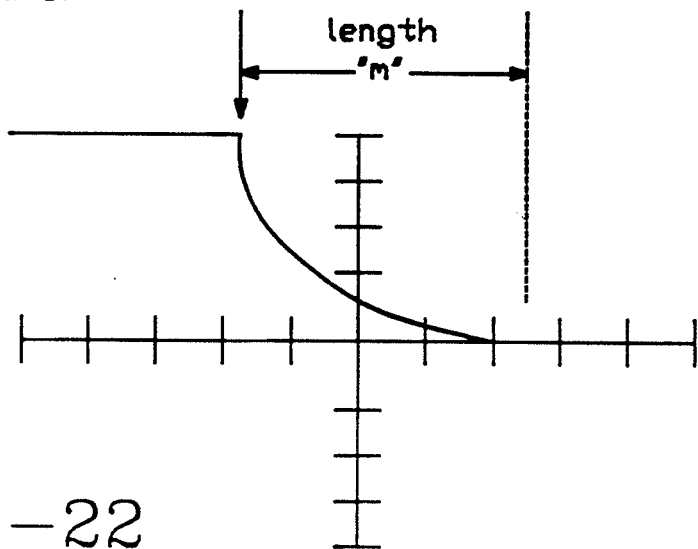

The output of the adder 224 is supplied to multiplier 225 and to table 223. The output of the table 223 is supplied to multiplier 225, the output of which is added to the breath parameter (divided by 2) in adder 226, which supplies the output 221. The tables are specified as shown in FIGS. 21 and 22.

hc: Min value: $-1.0$ Max value: $+1.0$. This sets the start point of the slope in the reed table (see FIGS. 21 and 22).

m: Min value: 0.0 Max value: $+$. This sets the length of the slope in the reed table (see FIGS. 21 and 22).

curvature: Min value: $-\infty$ Max value: $+\infty$. This sets the curvature of the slope in the reed table. If this is set to 0, the slope is linear, as shown in FIG. 21. FIG. 22 shows a non-linear reed table.

noise: Min value: $-\infty$ Max value: $+\infty$. This parameter determines the amount of noise to be added to the table when the Add Noise function under Reed Type is used.

Calculate button: Calculates a new table based on the chosen bow shape, hc, m, and curvature values, and noise amount.

Import button: Import allows the user to use a table from another file. Clicking on this button will bring up the standard Macintosh File dialog box, allowing the user to choose the source file. The user will then be asked to select a table from that file.

Equation button: Equation allows the user to generate a table from an equation. Clicking on this button will bring up a dialog box with a text field, into which an equation may be entered. Entering the desired equation and then clicking OK will cause the table to be generated.

Noise button: This adds the amount of noise specified in the noise parameter above to the current table.

Bandlimit button: This function may be used to smooth out a table. Pressing this button brings up the Bandlimit dialog box.

Bandlimit Dialog Box

Frequency: Min value: 0.0 Max value: $+1.0$. This parameter works in conjunction with Length to determine the amount of smoothing which occurs. The lower the frequency, the more smoothing.

Length: Min value: 0.0 Max value: length of table. This parameter determines the length of the bandlimiting window (how many samples are looked at for the generation of each point), and so works in conjunction with Frequency to determine the amount of smoothing which occurs. The greater the length, the greater the smoothing.

Window shapes: The shape of the bandlimiting window determines the weighting curve of the points within the window. The Rectangular shape weights all of the points equally; the other shapes may weight points closer to the center more heavily, and so on.

Rectangular. This is the default.
Hanning. This is an alternate window shape.
Hamming. This is another alternate window shape.
Blackman. This is yet another alternate window shape.

Limit This option limits the output of the table to $-1$ and $+1$.

Normalize This option normalizes the output of the bandlimiting, so that the maximum deviation of the waveform is 1.

Amplitude This option scales the output of the bandlimiting function.

Sample (col. 5, row 2)

The sample block allows the user to use SND resource audio samples with the Engine.

Double-clicking brings up the default edit window, which allows the user to adjust playback parameters of the sample; command-clicking brings up the expert editor, which allows the user to examine the characteristics of the sample's source file.

Default Editor window (double-click)

phase: Min value: 0.0 Max value: 1.0. This sets the phase at which the sample will be played back.

output: Min value: $-\infty$ Max value: $+\infty$. This is the default value for the output port.

frequency: Min value: 0 Max value: $+\infty$. This sets the frequency at which the sample is played back. Its input should be Note Exponential.

amplitude: Min value: $-\infty$ Max value: $+\infty$. This sets the amplitude, or loudness, of the sample.

interpolate: Interpolation improves the quality of the generated audio.

None. No interpolation.

Linear. This uses simple lowpass filtering for interpolation. This is less computationally expensive than Allpass (below), but will slightly alter the timbre.

Allpass Host. This uses allpass filtering for interpolation, calculated on the Host. Currently, this will cause zippering effects when the Waveguide length is modulated (such as when the user plays a new note, or move the pitch bend wheel). Usually, either Linear or Allpass Table interpolation are better choices.

Allpass Table. This option generates a table stored on the DSP to provide high-quality allpass filtering, allowing glitchless modulation of Waveguide Length. It is somewhat more computation-intensive than Linear (above), but does not alter the timbre.

Expert Editor window (command-click)

Parameters not included in the default edit window are:

user name: As above.

name: This is the name of the file from which the sample is taken.

File Characteristics

These values are presented primarily for reference purposes, and changing them is not recommended.

VolNum: This identifies the disk containing the source file of the sample.

dirID: This identifies the folder containing the source file of the sample.

creationDate: This is the time when the sample file was created, just like the Creation Date os a folder, application, or document in the Macintosh Finder.

number: Since some files can contain more than one sample, it is necessary to differentiate between them. This is the number of the sample in the source file.

sample: This is the name of the sample within the source file. It is redundant with the sample number.

Selector (col. 4, row 9)

The Selector block uses a graphic slider to send modulation data. It is intended to be used to create control panel interfaces for easy modification of specific parameters in patches.

Each Selector has two lines of text underneath the icon. The first contains the normal information—block number and user name. The second line displays the second name (which identifies the Selector in the Control Panel) and the current value of the Selector.

The Grow tool may be used to add more states to the Selector.

user name: As above.

output: Min value: $-\infty$ Max value: $+\infty$. This displays the current value of the slider.

name: Use this field to enter a description of the characteristic which the Selector is modulating. This name will identify the Selector in the Control Panel.

horizontal: Min value: $-\infty$ Max value: $+\infty$. This sets the horizontal position of the Selector in the control panel.

vertical: Min value: $-\infty$ Max value: $+\infty$. This sets the vertical position of the Selector in the control panel.

width: Min value: $-\infty$ Max value: $+\infty$. This sets the width of the Selector in the control panel.

height: Min value: $-\infty$ Max value: $+\infty$. This sets the height of the Selector in the control panel.

type: Selector 1, 2, and 3. These options are currently the same.

label (n): Each state of the Selector may have its own label. This is the label for state (n).

Send (col. 3, row 8)

The Send Block is used in conjunction with the Receive Block to create virtual wires within Engine, primarily for the purpose of modulation.

Double-clicking or using the Edit Tool brings up the Menu Edit window; command-clicking brings up the Text Edit window.

Menu Edit window (double-click)

input: Min value: $-\infty$ Max value: $+\infty$. This is the default value for the input port.

name: This is the name of the bus on which this block will send. The user name is completely separate from this bus name.

Once a send has been assigned a bus name, that name will appear at the bottom of the name menu in all Receive blocks.

Text Edit window (command-click)

In addition to containing the parameters discussed above, the Text Edit window allows the user to set the user name of the block.

user name: As above.

Shelf (col. 4, row 3)

The Shelf block provides a pair of filters, separated by a single breakpoint. The amplitude of frequencies above the breakpoint may be set independently from those below the breakpoint.

user name: As above.

input, output:Min value: $-\infty$ Max value: $+\infty$. These are the default values for the input and output audio ports.

frequency: Min value: 0.0 Max value: 1.0. This sets the breakpoint frequency of the shelf filter. A value of 1.0 is equal to the Nyquist frequency of the DSP sampling rate, as set under Parameters in the DSP menu. This means that, if the user changes the sampling rate, the user will probably need to change the user's filter cutoff points as well.

lower: Min value: 0.0 Max value: +. This sets the amplitude change for frequencies below the breakpoint. Values greater than 1 will increase the amplitude; values less than 1 will decrease it. This value is in standard Engine amplitude amounts, and not in dB.

upper: Min value: 0.0 Max value: $+\infty$. This sets the amplitude change for frequencies above the breakpoint. Values greater than 1 will increase the amplitude; values less than 1 will decrease it. This value is in standard Engine amplitude amounts, and not in dB.

Slider (col. 3, row 9)

The Slider block uses a graphic slider to send modulation data. It is intended to be used to create control panel interfaces for easy modification of specific parameters in Engine patches.

Each slider has two lines of text underneath the icon. The first contains the normal information—block number and user name. The second line displays the second name (which identifies the Slider in the Control Panel) and the current value of the Slider.

user name: As above.

output: Min value: $-\infty$ Max value: $+\infty$. This displays the current value of the Slider.

name: Use this field to enter a description of the characteristic which the Slider is modulating. This name will identify the Slider in the Control Panel.

minimum: Min value: $-\infty$ Max value: $+\infty$. This sets the value of the Slider at its lowest position.

maximum: Min value: $-\infty$ Max value: $+\infty$. This sets the value of the Slider at its topmost position.

horizontal: Min value: $-\infty$ Max value: $+\infty$. This sets the horizontal position of the Slider in the control panel.

vertical: Min value: $-\infty$ Max value: $+\infty$. This sets the vertical position of the Slider in the control panel.

width: Min value: $-\infty$ Max value: $+\infty$. This sets the width of the Slider in the control panel.

height: Min value: $-\infty$ Max value: $+\infty$. This sets the height of the Slider in the control panel.

type: Slider 1, 2, and 3. These options are currently the same. the same.

Table (col. 3, row 7)

The user may draw into a table, use preset table shapes, generate tables from equations, and add noise to a preexisting table.

user name: As above.

input: Min value: $-1.0$ Max value: $+1.0$. This is the default value for the input port.

output: Min value: $-\infty$ Max value: $+\infty$. This is the default value for the output port. For more information, please see "Default Values of Ports" on page 12.

power: Min value: 0.0 Max value: $+\infty$. This is the power used ($\times 2$, $\times 3$, etc.) used for the Power table shape (see below).

noise: Min value: $-\infty$ Max value: $+\infty$. This is the amount of noise that will be used when generating a table from the table shape menu, or the amount of noise added when the Noise button is pressed.

table shape menu: After choosing a table shape, the user must press the Calculate button for that shape to be used.

Power. This produces the function $y=x^n$, where (n) is the number entered in the power parameter above.

Noise. This produces a table of random noise.

Sine. This produces a sine function.

Cosine. This produces a cosine function.

Exponential. This produces an exponential curve.

Logarithm. This produces a logarithmic curve.

Absolute Value. This table passes positive numbers through, and converts negative numbers to positive numbers.

Calculate button: Calculates a new table based on the specified table shape and noise amount.

Import button: Import allows the user to use a table from another file. Clicking on this button will bring up the standard Macintosh File dialog box, allowing the user to choose the source file. The user will then be asked to select a table from that file.

Equation button: Equation allows the user to generate a table from an equation. Clicking on this button will bring up a dialog box with a text field, into which an equation may be entered. Entering the desired equation and then clicking OK will cause the table to be generated.

Noise button: This adds an amount of noise (specified in the noise parameter above) to the current table.

Bandlimit button: This function may be used to smooth out a table. Pressing this button brings up the Bandlimit dialog box.

Bandlimit Dialog Box

Frequency: Min value: 0.0 Max value: +1.0. This parameter works in conjunction with Length to determine the amount of smoothing which occurs. The lower the frequency, the more smoothing.

Length: Min value: 0.0 Max value: length of table. This parameter determines the length of the bandlimiting window (how many samples are looked at for the generation of each point), and so works in conjunction with Frequency to determine the amount of smoothing which occurs. The greater the length, the greater the smoothing.

Window shapes: The shape of the bandlimiting window determines the weighting curve of the points within the window. The Rectangular shape weights all of the points equally; the other shapes may weight points closer to the center more heavily, and so on.

Rectangular. This is the default.

Hanning. This is an alternate window shape.

Hamming. This is another alternate window shape.

Blackman. This is yet another alternate window shape.

Limit This option limits the output of the table to −1 and +1.

Normalize: This option normalizes the output of the bandlimiting, so that the maximum deviation of the waveform is 1.

Amplitude: This option scales the output of the bandlimiting function.

Tap (col. 1, row 5)

The Tap block creates a variable number of single-sample delays, to be used for dispersion. By using a Tap in conjunction with a mixer and varying the number and relative volumes of the delays, it is possible to create complex filters, such as FIRs.

The Grow tool may be used to add more outputs.

For the default DSP frequency of 44.1 kHz, a single-sample delay is equal to 22.7 milliseconds.

user name: As above.

input, output (n): Min value: $-\infty$ Max value: $+\infty$. These are the default values for the input and output (n) ports.

Tube (col. 4, row 4)

The Tube block is a collection of a variable number of waveguides and junctions, featuring a user-friendly graphic interface.

The sum of the ratios is constrained to less than 1. Both admittances and ratios can be modulated.

Figure 23:
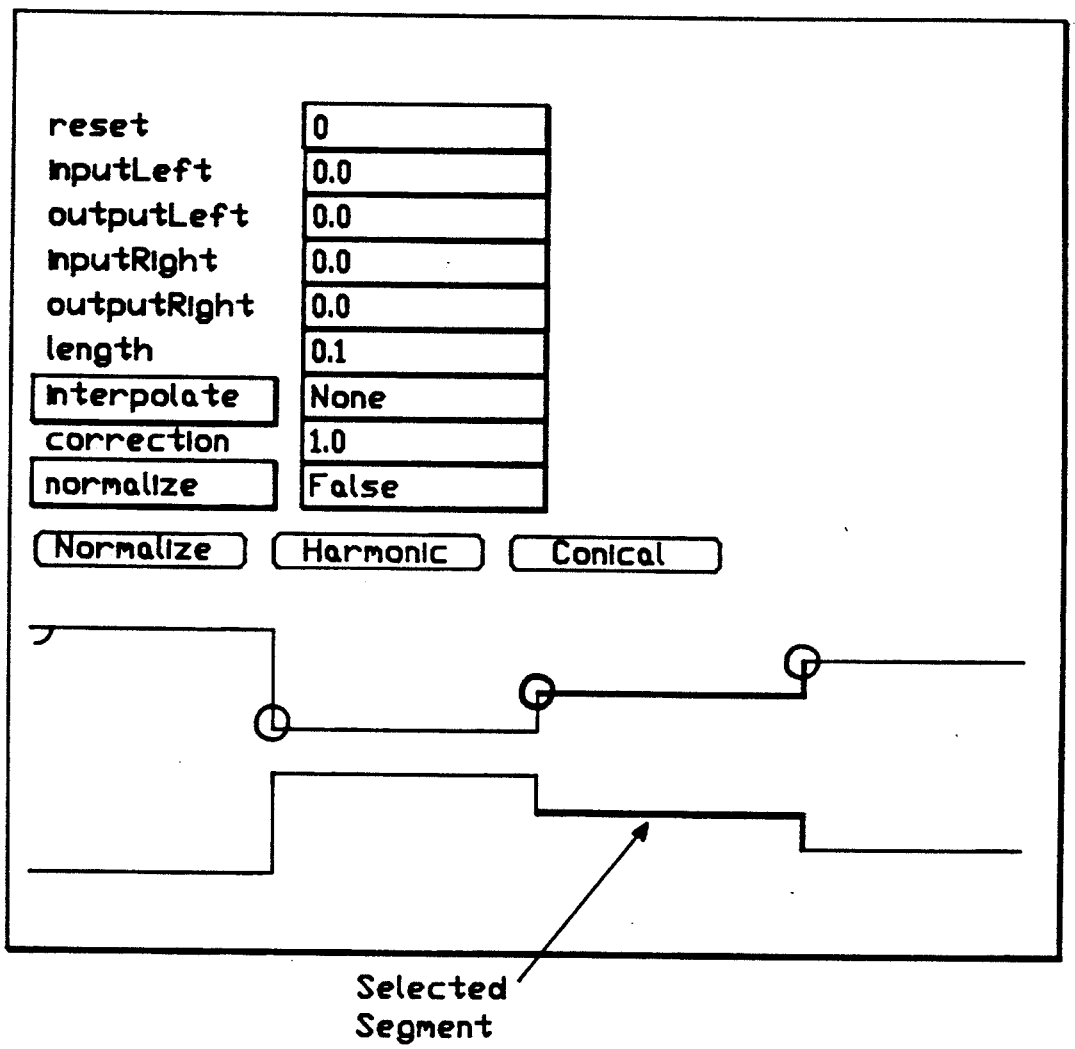
FIG. 23 is an example of the tube edit menu for use with the Tube function block.

Double-clicking or using the Edit Tool brings up the Tube Edit window as shown in FIG. 23; command-clicking brings up the Text Edit window. The Grow tool may be used to add more tube segments; this may also be done simply by clicking on blank space in the graphical Tube editor.

Tube Edit window (double-click)

inputLeft, inputRight, outputLeft, outputRight: Min value: $-\infty$ Max value: $+\infty$. These are the default values for the input and output ports.

length: Min value: 0.0 Max value: limited by available memory. This sets the length, and thus the pitch, of the Waveguide. Its input should be Length Exponential.

interpolate: Interpolation improves the quality of the generated audio.

None. No interpolation.

Linear. This uses simple lowpass filtering for interpolation. This is less computationally expensive than Allpass (below), but will slightly alter the timbre.

Allpass Host. This uses allpass filtering for interpolation, calculated on the Host. Currently, this will cause zippering effects when the Waveguide length is modulated (such as when the user plays a new note, or move the pitch bend wheel). Usually, either Linear or Allpass Table interpolation are better choices.

Allpass Table. This option generates a table stored on the DSP to provide high-quality allpass filtering, allowing glitchless modulation of Waveguide Length. It is somewhat more computation-intensive than Linear (above), but does not alter the timbre.

correction: Min value: +1.0 Max value: +50.0. This is a pitch-correction option, which compensates for the total delay of the waveguide loop (in samples). The default value is 1 (meaning that the net delay is a single sample), and the user probably should not make it any less than that amount. If the user inserts a filter into the loop, it will introduce a small amount of extra delay, which will affect the tuning. To compensate for this, a correction amount of 1.25, or 1.5 may work.

normalize: This function should not be confused with that of the Normalize button.

True. This attempts to equalize the energy on both sides of each of the junctions in the Tube, to avoid clipping within the block.

False. This preserves energy in the junctions, allowing clipping to occur within the block.

Normalize button: This feature adjusts the admittances of the tube segments so that the maximum admittance is 1. Relationships between admittances are preserved.

Harmonic button: This feature adjusts the lengths of each segment to be equal, to avoid detuning.

Conical button: This feature adjusts the admittances of a series of waveguides to simulate a cone. The user may select two or more segments as the start and end points to be interpolated between. If no segments are selected, the first and last segments are used as breakpoints.

Cone Type

Admittance. This creates a tube of the specified shape by altering the admittance of each tube segment. Since admittance is essentially an area (admittance is proportional to radius$^2$), as opposed to width, the 2-dimensional display may not look as the user would expect it to.

Radius. This creates a tube of the specified shape by altering the radius of each tube segment.

Cone Shape

Linear. This creates equal changes in admittance or radius from segment to segment.

Flare. This produces a cone with a variable amount of curvature, according to the flare amount set in the box at the right. Flare amounts of greater than one cause the greatest change to occur at the right side of the cone; amounts less than one cause the greatest change to occur at the left side of the cone; a flare amount of one is the same as selecting a Linear shape.

Exponential. This produces a cone with an exponential curve between the selected segments.

Logarithmic. This produces a cone with a logarithmic curve between the selected segments.

Segment Lengths

Unchanged. This option causes segment lengths to remain the same.

Harmonic. This causes segment lengths to be made equal, just like using the Normalize button.

Equal Area. This option is not currently supported.

Tube Edit mouse commands

The Tube Edit window incorporates a few special mouse-based commands, as described below.

Click and drag on point. Dragging horizontally changes the length of the Tube segment; dragging vertically changes the admittance of the segment.

Click and drag on line. Dragging vertically changes the admittance of the segment.

Double-click on line. Double-clicking brings up a small dialog box, allowing the user to precisely set the segment's admittance and length.

Command-click on line. Command clicking, in this instance, is the same as double-clicking.

Click on "empty" space. Inserts a new Tube segment, with a point at the place that the user clicked.

Text Edit window (command-click)

The text edit window contains the following additional parameters.

user name: As above.

ratio (n): Min value: 0.0 Max value: 1.0. This is the length of waveguide segment (n), expressed as a ratio of the total length of the tube.

admittance (n): Min value: $-\infty$ Max value: $+\infty$. This is the admittance of waveguide segment (n).

Waveguide (col. 2, row 4)

The Waveguide block is the heart of a waveguide modeling system.

user name: As above.

reset: This feature is not currently implemented.

inputLeft, inputRight, outputLeft, outputRight: Min value: $-\infty$ Max value: $+\infty$. These are the default values for the input and output ports.

length: Min value: 0.0 Max value: limited by available memory. This sets the length, and thus the pitch, of the Waveguide. Its input should be Length Exponential.

interpolate: Interpolation improves the quality of the generated audio.

None. No interpolation.

Linear. This uses simple lowpass filtering for interpolation. This is less computationally expensive than Allpass (below), but will slightly alter the timbre.

Allpass Host. This uses allpass filtering for interpolation, calculated on the Host. Currently, this will cause zippering effects when the Waveguide length is modulated (such as when the user plays a new note, or move the pitch bend wheel). Usually, either Linear or Allpass Table interpolation are better choices.

Allpass Table. This option generates a table stored on the DSP to provide high-quality allpass filtering, allowing glitchless modulation of Waveguide Length. It is somewhat more computation-intensive than Linear (above), but does not alter the timbre.

correction: Min value: +1.0 Max value: +50.0. This is a pitch-correction option, which compensates for the total delay of the waveguide loop (in samples). The default value is 1 (meaning that the net delay is a single sample), and the user probably should not make it any less than that amount. If the user inserts a filter into the loop, it will introduce a small amount of extra delay, which will affect the tuning. To compensate for this, try entering a correction amount of 1.25, or 1.5.

Waveguide Filter (col. 3, row 4)

The Waveguide Filter block is a waveguide with a built-in, first order lowpass filter, allowing the efficient creation of a simple, lossy waveguide system.

user name: As above.

inputLeft, inputRight, outputLeft, outputRight: Min value: $-\infty$ Max value: $+\infty$. These are the default values for the input and output ports.

length: Min value: 0.0 Max value: limited by available memory. This sets the length, and thus the pitch, of the Waveguide. Its input should be Length Exponential.

interpolate: Interpolation improves the quality of the generated audio.

None. No interpolation.

Linear. This uses simple lowpass filtering for interpolation. This is less computationally expensive than Allpass (below), but will slightly alter the timbre.

Allpass Host. This uses allpass filtering for interpolation, calculated on the Host. This may cause zippering effects when the Waveguide length is modulated (such as when the user plays a new note, or move the pitch bend wheel). Usually, either Linear or Allpass Table interpolation are better choices.

Allpass Table. This option generates a table stored on the DSP to provide high-quality allpass filtering, allowing glitchless modulation of Waveguide Length. It is somewhat more computation-intensive than Linear (above), but does not alter the timbre.

correction: Min value: +1.0 Max value: +50.0. This is a pitch-correction option, which compensates for the total delay of the waveguide loop (in samples). The default value is 1 (meaning that the net delay is a single sample), and the user probably should not make it any less than that amount. If the user inserts a filter into the loop, it will introduce a small amount of extra delay, which will affect the tuning. To compensate for this, try entering a correction amount of 1.25, or 1.5.

filter: Min value: $-1.0$ Max value: $+1.0$. This sets the cutoff point of the built-in first order filter, which can be either highpass or lowpass. In the range from 0.0 to 1.0 it is a lowpass filter, with 1.0 being the greatest amount; in the range from $-1.0$ to 0.0 it is a highpass filter, with $-1.0$ being the greatest amount. A value of 1.0 is equal to the nyquist frequency of the DSP card's sample rate (22.05 kHz for the Sound Accelerator's default of 44.1 kHz), or to nyquist frequency of the generate frequency in non-RealTime.

MENUS

The Engine has a number of menus, each of which contains commands and settings pertaining to a particular aspect of the program. Many of the menus contain submenus (marked by a ( ) to the right of the selection), which offer their own sets of related commands. The Macintosh command key is represented by the symbol "+".

File Menu

Engine's File menu contains options and commands for opening, saving, importing, and printing Engine files.

New (+N): This creates a new, empty file.

Open . . . (+O): This brings up the standard Macintosh open file dialog box, allowing the user to open a previously created file. Multiple documents may be open at one time, within the limitations of the user's Macintosh's memory, and (if the user is using MultiFinder) the memory allotted to the Engine program.

Import Drag . . . : This brings up a variation of the standard Macintosh open file dialog box, allowing the user to open files created with the Sun program "drag." After the file has been converted and opened, it should be saved as a Engine file using the Save or Save As commands.

Close (+W): This closes the current file. If the user has not yet saved the file, a dialog box will automatically appear, allowing the user to do so.

Save . . . (+S): This saves the current file to disk, using the same name and folder location. If the user uses this command with an unnamed, new file, the Save As . . . dialog will appear, allowing the user to name the file.

Save As . . . : This allows the user to save a file with a different name, in a different folder, or on a different disk. Use this command to store variations of a file, or to make backups from within Engine.

Save Macro . . . : This saves the Macro of the current file into a text-only document, for use in DSP simulation.

Save Setup: Saves the current values for the Generate, Listen, and Align parameters, so that subsequent new files will be configured to the user's preferences.

Revert to Saved. This closes the current file without saving, and loads the old version of the file from the disk, effectively discarding all changes since the last save.

File Type. This allows the user to choose the manner in which sample data will be stored, or whether the sample will be saved at all. The selection here is redundant with the selection in the Generate Parameters window, so that making a change there also makes the change in this menu.

Normal. This causes the generate command to produce a sample in 8-bit SND resource format. If the user wishes to conserve disk space, use this option. The Listen feature, however, does not currently work with the Normal format.

Interleaved. This causes the sample to be produced and saved in 16-bit, Sound Designer II compatible format. If the user is using the Sound Accelerator card to listen to samples, the user should use either this format or Chunky (see below). This format, unlike Chunky, will not play back on the Macintosh internal speaker.

Chunky. This causes the generate command to produce a sample in a 16-bit format not compatible with Sound Designer II. If the user is using the Sound Accelerator card to listen to samples, the user should use either this format or Interleaved (see above). Chunky, unlike Interleaved, also works with the Mac internal speaker.

No Samples. This saves the algorithm, but not the generated sample, saving space on disk.

Page Setup . . . : This brings up the standard Macintosh Page Setup dialog box, allowing the user to set the paper size, orientation, etc. used for printing (see Print, below).

Print . . . : This brings up the standard Macintosh Print dialog box, allowing the user to print the graphics of the selected window of the current file.

Quit (+Q): This quits the Engine program. If the user has not saved the current file(s), a dialog box will appear, allowing the user to do so.

Edit Menu

The Edit menu provides many of the Macintosh's familiar editing operations, in addition to some useful low-level block editing commands.

Undo (+Z) : Cancels the last operation performed, with some exceptions.

Cut (+X): Deletes the selected item(s).

Copy (+C): Copy is not currently supported by Engine.

Paste (+V) : Paste is not currently supported by Engine.

Clear: Deletes the selected item(s).

Select All (+A): Selects all blocks and connections in the current algorithm.

Merge: This feature allows the user to group one or more blocks into a single icon, to facilitate cleaner-looking and better-organized algorithms. To use merge, the user must first select the item(s) to be grouped.

Unmerge: This feature is not currently supported.

Edit Icon: This feature is not currently supported.

Alignment: This command allows the user to automatically adjust the positions of the selected blocks horizontally and/or vertically, to ease the creation of "clean" looking algorithms.

Align (+Y). This command aligns the selected objects according to the settings made in Parameters (below).

Parameters. This selection brings up a dialog box which contains two fields and a number of radio buttons to precisely select alignment parameters.

Parameters dialog box

Horizontal Grid. Arranges the selected blocks along a horizontal grid of the specified number of pixels. The part of the block matched to the grid (right side, left side, or center) is set by the horizontal align by: buttons, to the right of the window.

Horizontal Average. Averages the horizontal positions of the selected blocks. The part of the block used for the average (right side, left side, or center) is set by the horizontal align by: buttons, to the right of the window.

Horizontal Unchanged. The Align command will not affect horizontal position when this option is selected.

Right. Blocks will be horizontally aligned by their right sides.

Left. Blocks will be horizontally aligned by their left sides.

Center. Blocks will be horizontally aligned by their center points.

Vertical Grid. Arranges the selected blocks along a vertical grid of the specified number of pixels. The part of the block matched to the grid (top, bottom, or center) is set by the vertical align by: buttons, to the right of the window.

vertical Average. Averages the vertical positions of the selected blocks. The part of the block used for the average (top, bottom, or center) is set by the vertical align by: buttons, to the right of the window.

Vertical Unchanged. The Align command will not affect vertical position when this option is selected.

Top. Blocks will be vertically aligned by their top sides.

Bottom. Blocks will be vertically aligned by their bottom sides.

Center. Blocks will be vertically aligned by their center points.

Numbering: This menu selection allows the user to change the numbering of a specified block, or of an entire algorithm. The number of a blocks is important to the order of operations; for more information, please see "Order of Operations".

Change Number. This selection brings up a dialog box which enables the user to manually change the number of the selected block. Type in the desired number and press "Okay."

Renumber. This command re-numbers all of the blocks in the current algorithm, starting at the left and working to the right. If two or more blocks are in the same horizontal position, renumbering starts at the top and works to the bottom.

Flip: This feature changes the orientation of the selected block's icon and ports. It may be used to clean up algorithms, avoiding the phenomenon of wires crossing over icons. This command only changes the way in which the block is displayed; it does not change the connections to the block, or any of its functions.

Horizontal (+H). Flips the selected block's icon horizontally.

Vertical (+T). Flips the selected block's ports vertically.

Port Types: This option allows the user to change the ports of all selected blocks to the specified type. This setting determines whether a block is executed on the host or the DSP.

Dsp. The block will be executed on the Dsp, for maximum resolution and speed.

Host 1. The block will be executed on the Host (the Macintosh), using the Priority 1 update speed, as set under Priorities on the RealTime menu.

Host 2. The block will be executed on the Host, using the Priority 2 update speed, as set under Priorities on the RealTime menu.

Host 3. The block will be executed on the Host, using the Priority 3 update speed, as set under Priorities on the RealTime menu.

Host 4. The block will be executed on the Host, using the Priority 4 update speed, as set under Priorities on the RealTime menu.

Comment: This opens a text window, allowing the user to enter a comment describing the file. Use this to describe unusual aspects of algorithms for later reference by the user or others.

Synthesize Menu

The Synthesize menu contains parameters and commands for generating sound from non-RealTime Engine algorithms. For RealTime operation, use the DSP and RealTime menus.

Macros . . . : This displays the Macro file(s) for the current algorithm.

Generate: This menu contains the controls for generating audio sample files from non-RealTime Engine patches, along with related functions.

Generate (+G). This generates an audio file, or sample, from the current algorithm.

Parameters. This brings up a special window which allows the user to configure the generation of the audio file.

Sampling. This determines the sample rate, in hertz, of the audio file. The default is 44,100.

Length. This determines the length of the sample.

Frequency. Min value: 0; Max value: half of the Sampling frequency.

This determines the base frequency of the sample to be generated, in hertz. Engine parameters relating to frequency, such as the frequency of an oscillator, cutoff of a filter, or length of a waveguide, are expressed as ratios of this amount. This allows the user to easily change the pitch of a patch without having to change each parameter individually. The default is middle C, 261.23.

Clip Detect. Checking this box causes Engine to look for and report any clipping which occurs in the generated sample. Clipping should, in general, be avoided, as it can cause severe distortion in digital systems such as Engine.

Clip Report. This is a record, block by block, of all clipping that occurred while generating the sample.

Liste: This allows the sample of the current patch to be played, according to various configurable parameters.

Listen (+L). This plays the audio file(s) of the current algorithm, as determined by the Device parameter (see below).

Mode. This brings up a submenu which allows the user to select the number of output channels.

Mono. This produces a single-channel sample file.

Stereo. This produces a two-channel, stereo sample file.

Quad. This produces a four-channel, quadraphonic sample file.

Left Channel. This sets the Engine audio channel played by the left speaker of the user's monitor system.

Right Channel. This sets the Engine audio channel played by the left speaker of the user's monitor system.

Device. This submenu allows the user to select the device on which the Engine audio will be played back.

Mac Speaker. If this is selected, the audio will be played through the Macintosh speaker.

Sound Accelerator. If this is selected, the audio will be played through a Sound Accelerator board, if such is installed. For best results with the Sound Accelerator, use the Interleaved or Chunky formats for generating the sample (see below).

Format. This submenu allows the user to choose the format in which the sample will be stored.

Normal. This causes the generate command to produce a sample in 8-bit SND resource format. If the user wishes to conserve disk space, use this option. The Listen feature, however, does not currently work with the Normal format.

Interleaved. This causes the sample to be produced and saved in 16-bit, Sound Designer II compatible format. If the user is using the Sound Accelerator card to listen to samples, the user should use either this format or Chunky (see below). This format, unlike Chunky, will not play back on the Macintosh internal speaker.

Chunky. This causes the generate command to produce a sample in a 16-bit format not compatible with Sound Designer II. If the user is using the Sound Accelerator card to listen to samples, the user should use either this format or Interleaved (see above). Chunky, unlike Interleaved, also works with the Mac internal speaker.

Display: This brings up the Display window for the selected audio bus, allowing the user to listen to the sample and view it in various different ways. and For more information on the Display window options, please see the description of the Audio Output block.

DSP Menu

The DSP menu contains parameters and commands for using Engine algorithms in RealTime. For non-RealTime operation, use the Synthesize menu.

Compile . . . (+K): The Engine has to go through a number of different processes to convert an algorithm into a playable RealTime file—extracting the macro file, pre-processing the macro, assembling, etc. The user can execute each of these processes individually—but the Compile command allows the user to automate all of them at the touch of a button. The processes which the Compile command executes are determined by the settings in the Parameters dialog box, as explained below.

Parameters . . . : This dialog box determines the processes that Engine will carry out with the Compile command. Normally, all should be selected (with the possible exception of the AD in, if the user is not using this accessory).

Extract. This causes Compile to execute the Extract command, as described below.

Quick Tables. This option is not currently supported.

Macro. This causes Compile to execute the Macro command, as described below.

Use Library. This means that Engine will use the 56000 macro library embedded in the program.

Assemble causes Compile to execute the Assemble command, as described below.

Optimize causes Compile to execute the Optimize command, as described below.

Use Shell causes Engine to use the 56000 assembly shell to initialize the Sound Accelerator.

AD in should be selected when the optional AD in device is connected. This will also cause the DSP sampling rate to be 44.1 kHz, regardless of the setting under Sample Rate below.

Download causes Compile to execute the Optimize command, as described below.

Run causes Compile to execute the Run command, as described below.

Download and Run on Activate causes the DSP code to be automatically downloaded when a file is loaded, or when an algorithm window is brought to the front.

Sample Rate sets the output sample rate for synchronous routines of the DSP for producing the sound data. The default rate, offering optimal fidelity, is 44.1 kHz. Other available rates, which may be used to increase either the fidelity (with higher rates) or the practical horsepower (with lower rates) of the DSP, are 77175.0, 51450.0, 38587.5, 30870.0, 25725.0, 22050.0, 19293.8, and 17150.0 Hz.

Pitch Detection: This feature allows the user to use pitch detection for autotuning.

Extract (+E): This writes a macro source file from the patch that has been defined.

Macro (+M): This takes the macro source file and processes it with (optionally) the "Use Library" 56000 library to generate the assembler source file. It also creates the symbol table, specifies x, y, io, linear, circular, and host memories, and specifies control routines and triggers.

Assemble (+B): This assembles the assembler source file into the code memory.

Download (+D): This allocates the DSP card and downloads the DSP code and memories into the card.

Run (+R) : This runs the real-time control routines.

Stop (+P): This stops the real-time control routines, without releasing the DSP card.

Free (+F): This stops the real-time control routines, and additionally releases the DSP card.

Sizes: This shows the sizes of all of the memory partitions for the eight patches.

Edit: This allows the user to edit the intermediate steps in the compile process, as well as all of the memory specifications.

Diagnostics: Diagnostics checks to see which DSP cards have been allocated and installed.

Access Memory: Access Memory allows the user to read/write to/from the different memories in the system.

Sine Wave: This feature plays a stereo sine wave out of the DSP card for diagnostic purposes only.

RealTime Menu

The RealTime menu contains parameters relating to the control of Engine patches via MIDI. It also allows the user to create a control panel, for real-time, slider-based editing of Engine algorithms.

Control Panel: This brings up a submenu, which allows the user to select the Patch containing the desired Control Panel. Each of the Patch numbers is a submenu in its own right, containing the names of the Control Panels contained in the Patch. A Patch may contain up to 100 Control Panels.

The Control Panels are based on the Sliders, Selectors, and Meters placed in the algorithm. When an algorithm is first compiled, all of these Control Panel items are automatically placed on the first Control Panel, using the names (not to be confused with its user name), maximum and minimum values, heights and widths, vertical and horizontal position offsets, and current value as entered in the blocks. Thereafter, only new or renamed Slider, Selector, or Meter blocks are added. If the user wants to rename a Slider, Selector, or Meter without losing the user's Control Panel settings, the user must make sure to rename both the block and all of its Control Panel representatives.

Control Panel mouse commands click on name or value. This brings up a dialog box which allows the user to view and change a number of parameters for that Slider, Selector, or Meter, as described below.

name. Use this field to enter a description of the characteristic which the Slider or Selector is modulating, or that the Meter is displaying. If the user wishes to change this name but retain all of the user's Control Panel settings, make sure to rename the block in the algorithm as well.

minimum (Slider and Meter only). This sets the value of the Slider or Meter at its lowest position.

maximum (Slider and Meter only). This sets the value of the Slider or Meter at its topmost position.

horizontal. This sets the horizontal position of the object.

vertical. This sets the vertical position of the object.

width. This sets the width of the object.

height. This sets the height of the object.

state (Selector only). This displays the number of states for this selector. It cannot be changed in the Control Panel—if the user wishes to add more states, the user must do so in the block, and then re-compile the algorithm.

option-click on name or value. This allows the user to move the object's location in the Control Panel.

Click and hold above or below the Slider or Selector handle. This causes the value to move smoothly in the appropriate direction (up if the user clicks above, down if the user clicks below).

Add Control Panel: This brings up a dialog box for adding a Control Panel. If the current top window is a Control Panel, the new one will be initialized with its settings. By adding a new control panel every once in a while, the user can keep a record of the user's edits- —and return to the older version later. Pressing "Okay" will add the Control Panel.

Patch menu. This specifies the patch to which the Control Panel will be added.

Name. This allows the user to give the Control Panel a name. If the user wants to rename it later, use the Rename Control Panel feature described below.

Delete Control Panel: This brings up a submenu which allows the user to delete a specific Control Panel. Pressing the Okay button performs the Delete.

Patch menu. This specifies the patch from which the Control Panel will be deleted.

Name menu. This allows the user to choose the Control Panel to delete.

Rename Control Panel: This brings up a submenu, which allows the user to select the Patch containing the desired Control Panel. Pressing the Okay button causes the Control Panel to be renamed.

Patch menu. This specifies the patch containing the Control Panel to be renamed (only one is available for now).

Name menu. This allows the user to choose the Control Panel to be renamed.

Rename to. Enter the new name in to this field.

Priorities: This brings up a dialog box, which allows the user to select the update rates (in milliseconds) for each of the four host priorities. Currently, only Priority 1 is functional; if a port is set to any of Priorities 2-4, the rate for Priority 1 is used instead.

Control & MIDI . . . : This menu selection allows the user to set various parameters regarding the MIDI control of Engine algorithms.

allocation. These options determine the way in which Engine will assign voices in response to MIDI note messages.

Cycle. This is the default allocation mode, in which each available voice is used in turn. If the same key is struck and then re-struck, both notes will sound through their release. Cycle always looks for the oldest inactive voice.

Retrigger. This allocation mode is slightly more efficient than Cycle. Instead of taking the time to search for the oldest inactive voice, it simply uses the first one that it finds. Generally, one should not need to use Retrigger.

Reuse. In this mode, if the same key is struck and then re-struck, the old note will be stolen by the new. Otherwise, this mode is identical to Cycle, described above.

Legato. This causes the voice to use monophonic voice allocation, so that only one note sounds at a time. Additionally, if a note is played legato—that is, if it is pressed down before a previously sounding note is released—the pitch of the note will change, but it will not be re-triggered. This method is good for simulating monophonic instruments, such as winds, or lead sounds.

voices. This sets the maximum number of voices which the patch can simultaneously sound. The maximum possible number of voices will change relative to the complexity of the patch. This value must be an integer.

transpose. This sets the number of steps by which the voice will be transposed. This value must be an integer.

port. This sets the Macintosh serial port on which MIDI will be received.

Modem. This will cause the voice to receive MIDI data from the Macintosh's Modem port.

Printer. This will cause the voice to receive MIDI data from the Macintosh's Printer port.

channel. This sets the MIDI channel to which Engine will respond.

Omni. This will cause the voice to respond to all MIDI channels on the selected port.

1-16. This will put the voice into Poly mode on the selected channel number. It will thus respond to MIDI data only on that channel of the selected port.

key low. This sets the lowest MIDI key number on which the voice will sound.

key high. This sets the lowest MIDI key number on which the voice will sound.

velocity low. This sets the lowest MIDI velocity level on which the voice will sound.

velocity high. This sets the highest MIDI velocity level on which the voice will sound.

Mouse (+U): This option enables the user to enable and disable the use of the Macintosh mouse as a modulation source. When receiving Mouse X or Mouse Y, the user may wish to select a menu option, or use the mouse for any other operation (editing a blocks, etc.), without disrupting the user's modulation. The user may do this by placing the mouse in the position desired for modulation, freezing that value by using (U) to turn mouse modulation off, selecting a menu item (or doing any other mouse operation), and then turning mouse modulation back on.

Test . . . : Test allows the user to bypass the MIDI input and send messages to the real-time controller directly for diagnostic purposes only.

User Menu

In addition to the basic blocks supplied with the program, Engine allows the user to install a number of User Blocks, so that the user's most commonly used building blocks can be easily accessible. The User Blocks are essentially a shortcut for placing an Algorithm block.

Install Directory: This feature allows the user to designate the directory from which Engine will draw the User Blocks.

Algorithm: This option has a check mark by it when selected. It is mutually exclusive with Link (below). When Algorithm is selected, User Blocks will be placed as algorithms, actually copied into the file.

Link: This option has a check mark by it when selected. It is mutually exclusive with Algorithm (above). When Link is selected, User Blocks will be placed as Links, references to the original file.

User Blocks (Names of files and folders): Under the other choices in the User menu appear the contents of the Installed Directory. Files may be selected from this menu and placed in the algorithm, just like normal blocks. Folder names appear as hierarchical menus; negotiate the menus until the desired file is reached. Folders may be nested within one another, so the User Blocks may be organized in any way that the user likes.

EXAMPLES OF GRAPHIC MODELS

FIGS. 24-28 provide examples of patches implemented using the graphic programming engine described above.

Figure 24:
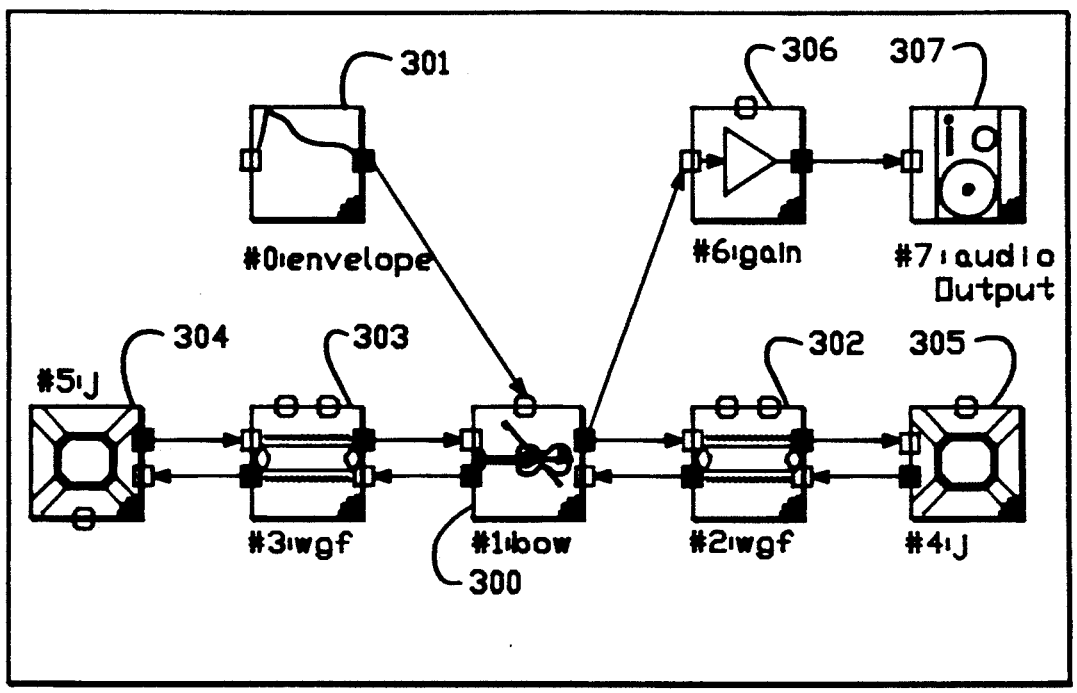
FIG. 24 is an example of a bow model created using the graphical programming engine of the present invention.

FIG. 24 provides an example of a model for a bow instrument. A bow model function block 300 sits at the core of the algorithm. An envelope 301 controls the pressure on the bow model 300. The bow model excites two wave guides, wave guide 302 and wave guide 303 on each side of the bow as if a bow was being played across the middle of the string. Junction boxes 304, 305 are connected to either side of the wave guides 303 and 302.

The output of the bow is connected to a gain block 306. The output of the gain block 306 is supplied to an audio output block 307.

Figure 25:
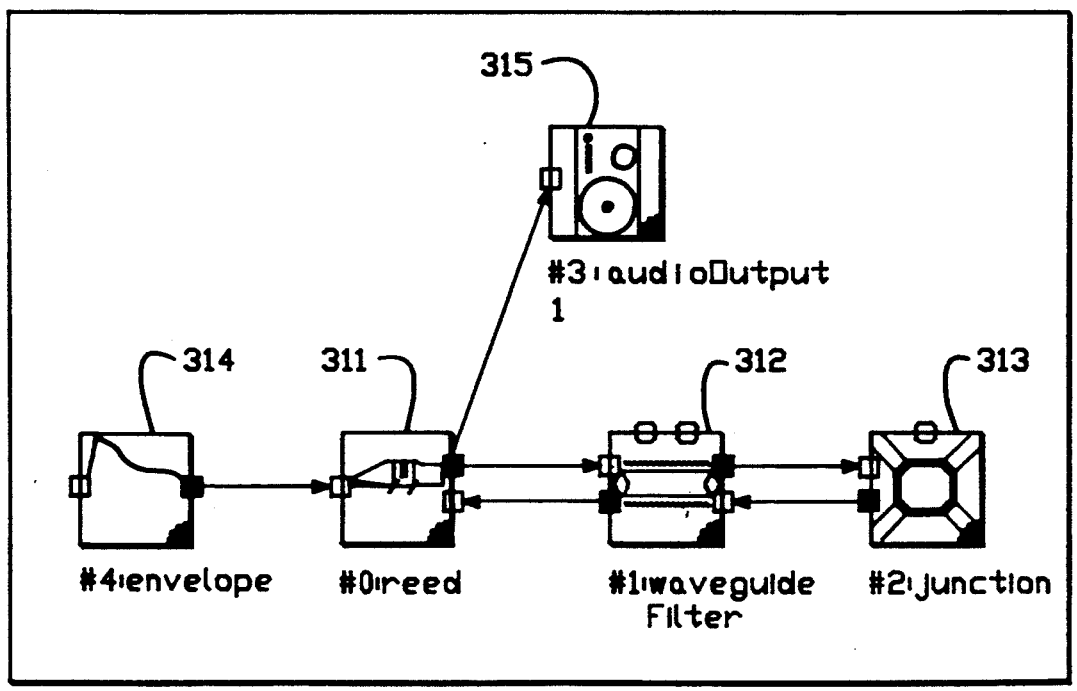
FIG. 25 is an example of a clarinet model created with the graphic programming engine according to the present invention.

FIG. 25 provides an example of a clarinet model. A reed block 311 operates at the core of the model. The reed block 311 is coupled to a wave guide filter 312 which is in turn coupled to a junction block 313. The input to the reed is driven by an envelope 314. The output of the reed is delivered directly to an audio output block 315. This example has a reed 311 exciting a single wave guide filter 312. The signal is reflected and inverted by the single junction box 313. The breath on the reed is controlled by an envelope 314. Note that while the envelope has a very quick attack, that of the actual sound is somewhat slower. This is because the model takes some time to build up its energy, due to the characteristics of the reed's default table. Changing this table will alter the attack and other characteristics of the model.

Figure 26:
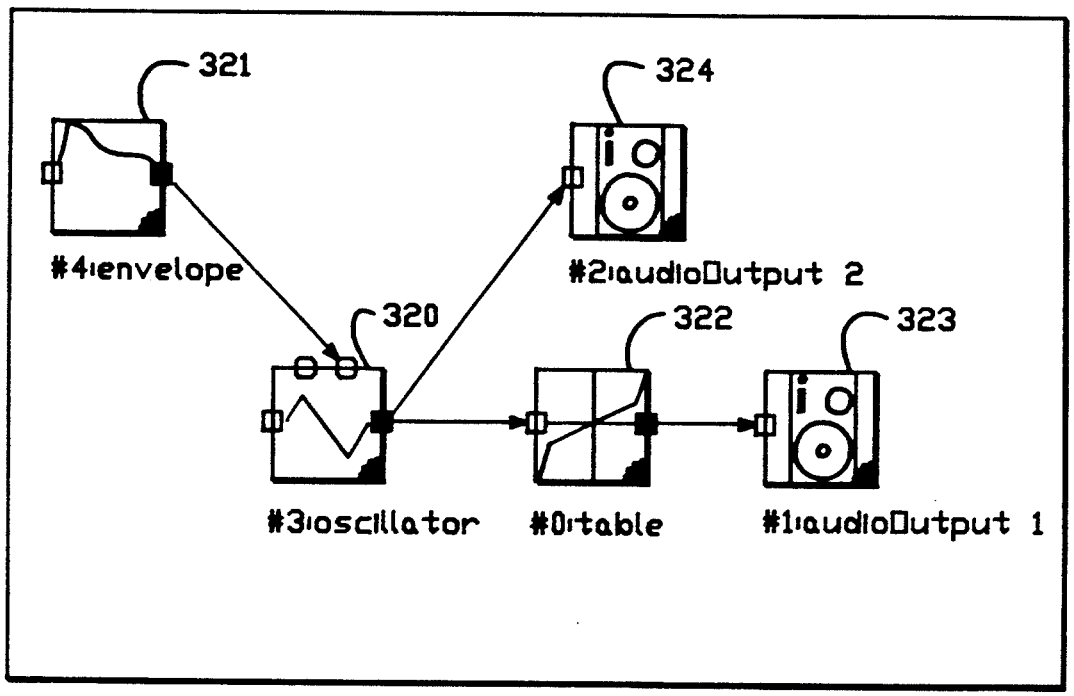
FIG. 26 is an example of a non-linear model created using the graphical programming engine of the present invention.

FIG. 26 illustrates application of the program to generate a model of a non-linear sound source. This sound source includes an oscillator 320 which is modulated by an envelope 321. The output of the oscillator 320 is supplied to a table 322, which in turn is supplied directly to an audio output block 323. The unprocessed sine wave is sampled by a second audio output block 324.

According to this example, the sine wave from the oscillator 320 is processed through table 322 which is basically linear in the middle and becomes increasingly non-linear towards its extremes. This results in soft notes being mostly unaffected, and loud notes being altered considerably. A processed sign wave is then delivered through output 323. The unprocessed sign wave may be sampled through output 324.

Figure 27:
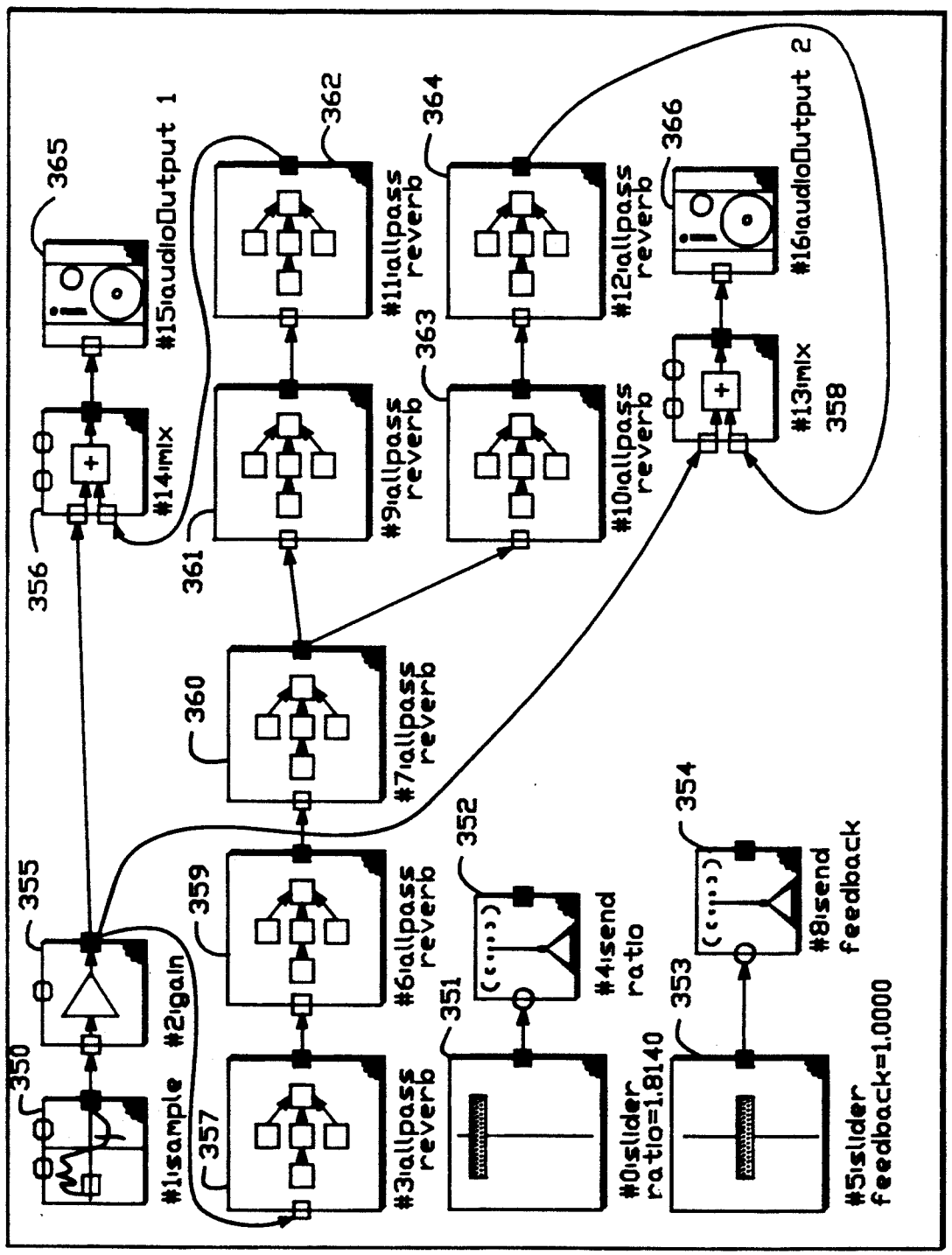
FIG. 27 is an example of a more complex model generated using several aspects of the graphic programming engine of the present invention.

FIG. 27 provides a model of a complex reverberator which demonstrates several features of the engine.

The inputs to the algorithm include a sample block 350, which supplies a sample of a clarinet sound previously generated. A slider 351 supplies an input to a send block 352 and a slider 353 supplies an input to a send block 354. The output of the sample block 350 is supplied to a gain stage 355. The output of the gain stage is supplied to three destinations. The first destination is mixer 356, the second destination is a first all-pass reverb algorithm block 57 and the third destination is mixer 358.

Figure 28:
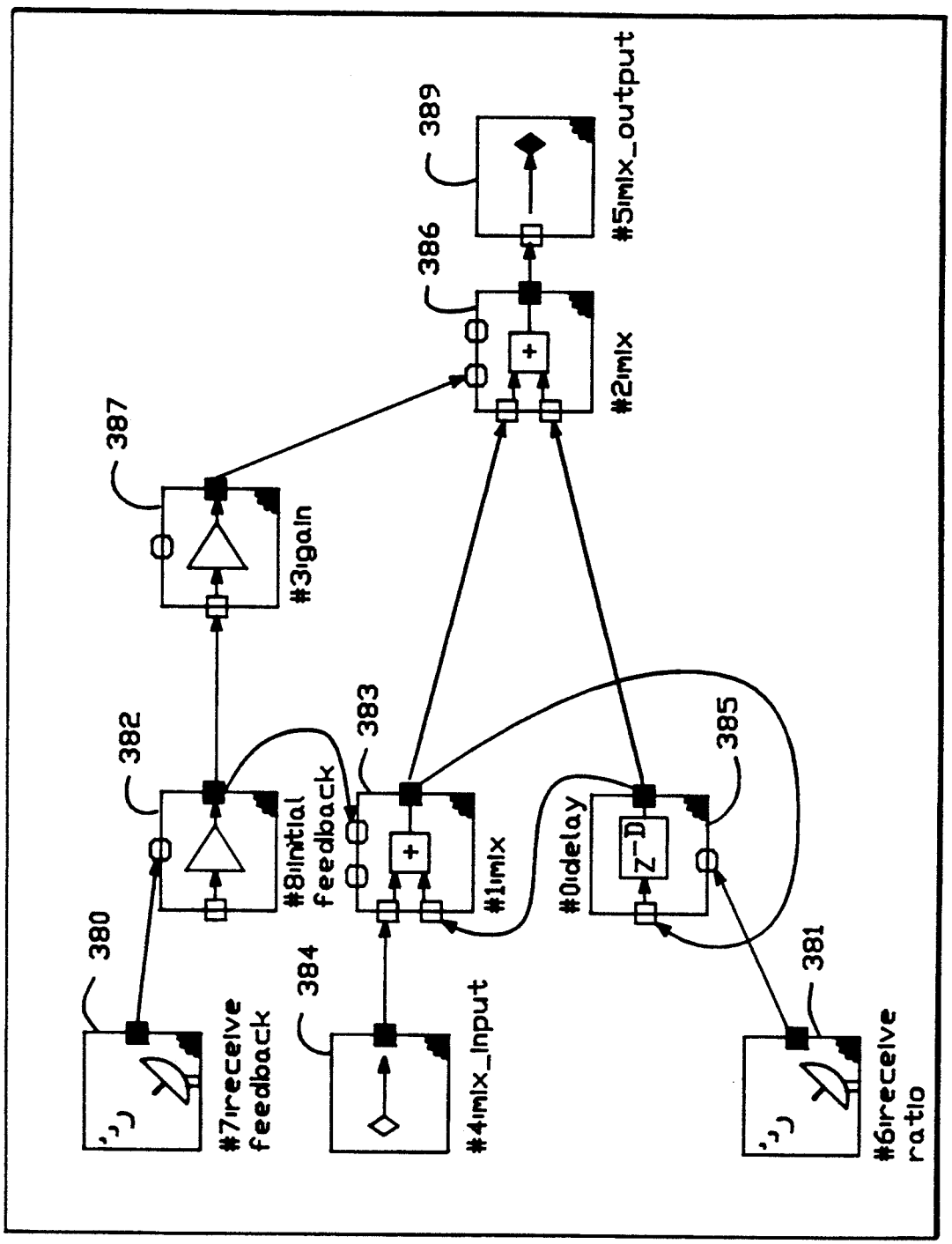
FIG. 28 is an example of the "all pass reverb" algorithm function block used in the model of FIG. 27.

A sequence of all-pass reverb algorithm blocks is connected with all-pass reverb block 357. The all-pass reverb block is an algorithm which is implemented by the engine as shown in FIG. 28. The sequence includes algorithm blocks 359, 360, 361 and 362 which are connected in series from block 357, and blocks 363 and 364 which receive the output of block 360 and then are connected in series. The output of block 362 supplies the second input to mixer 356, and the output of block 364 supplies the second input to the mixer 358. The output of mixer 356 is supplied to an audio output 365 and the output of mixer 358 is supplied to an audio output 366.

The send block 352 supplies a "ratio" parameter and the send block 354 supplies a "feedback" parameter to all of the all-pass reverb algorithm blocks.

The all-pass reverb block of FIG. 28 includes a receive block 380 for receiving the "feedback" parameter and a receive block 381 for receiving the "ratio" parameter. The output of the receive block 380 is supplied to a gain stage 382. The output of the gain stage 382 is supplied at an input to mixer 383. The other inputs to mixer 383 include the input for the algorithm at block 384 and the output of delay block 385. The delay block is modulated by the ratio value received from the receive block 381. The input of the delay block is the output of the mixer 383 and the output of the delay block is supplied as a third input to the mixer 383. The output of mixer 383 and the output of the delay block 385 are supplied to mixer 386 which is again modulated by the output of gain stage 387. The input of gain stage 387 is supplied at the output of gain stage 382. The output of the mixer 386 is supplied to the algorithm output block 387.

By placing several of these blocks in a series as done in the model of FIG. 27, a well spread diffusion effect is produced.

Figure 29:
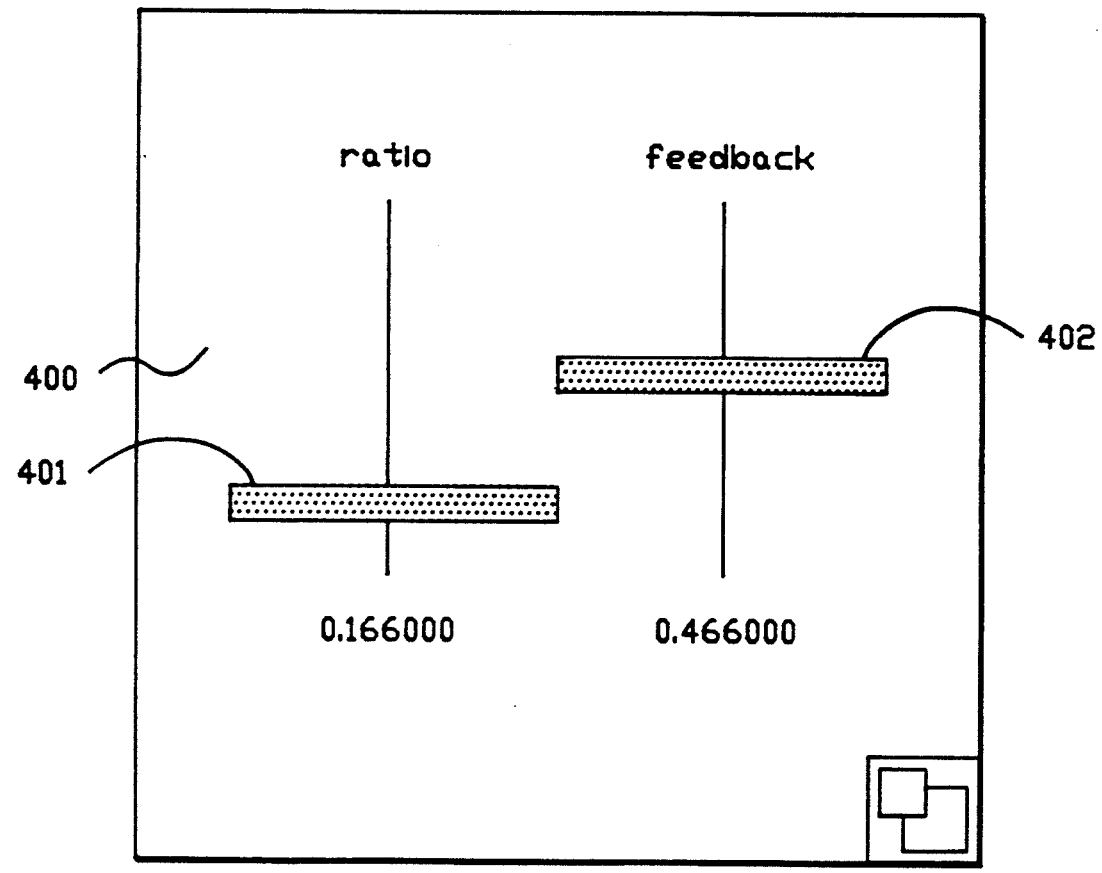
FIG. 29 is an example of a control panel for the model of FIG. 26 according to the present invention.

FIG. 29 illustrates a control panel which is generated as described above with respect to the real time menu in response to the algorithm of FIG. 27. As can be seen, the algorithm of FIG. 27 includes the two sliders for the ratio parameter and the feedback parameter respectively. The sliders are automatically compiled into a control panel window as illustrated in FIG. 29. The control panel window may be manipulated in real time using the mouse command on the real time menu to affect an executing program. The parameters generated by manipulating the control panel of FIG. 29 are executed by the host system asynchronous to the routines running in the DSP that produce the sound. The values are updated in DSP memory at the host update rate.

The window of FIG. 29 in the form of a control panel may be displayed simultaneously with the patch window of FIG. 27 in standard windowing computers.

The control panel of FIG. 29 consists of a display window, generally 400, enclosing a first slider icon 401 and a second slider icon 402. The first slider icon 401 corresponds to the slider icon 351 of FIG. 27, and the second slider icon 402 corresponds to the slider icon 353 of FIG. 27. The name of the slider "ratio" and "feedback", respectively, is displayed within the window 400. Similarly, the value being generated by the slider routine represented by the slider icon is displayed within the window. The values shown in FIG. 29 differ from those shown in FIG. 27, illustrating that the control panel can be used to alter the value.

Samples of preprocessor source text for representative function blocks are set out in the table below. As will be appreciated by those of skill in the art, these samples illustrate one object oriented programming technique suitable for implementing the present invention.

| PREPROCESSOR CODE SAMPLES © 1992 KORG |
|---|
| Waveguide (col.2, row 4) |
| 1 ;waveguide |
| 2 #if INTERPOLATE = = 0 |
| 3 waveguide_no_interp(@=) |
| 4 #else if INTERPOLATE = = 1 |
| 5 waveguide_linear_interp(@=) |
| 6 #else if INTERPOLATE = = 2 |
| 7 waveguide allpasshost interp(@=) |
| 8 #else if INTERPOLATE = = 3 |
| 9 waveguide_allpasstable_interp(@=) |
| 10 #else |
| 11 # error waveguide interpolate |
| 12 #endif |
| Waveguide No Interpolation |

PREPROCESSOR CODE SAMPLES
© 1992 KORG

```
1  ;waveguide_no_interp
2  #dsc @_delayleft MAXWG
3  #dsc @_delayright MAXWG
4  #dcx @_correcthigh int(CORRECTION)
5  #dcx @_correctlow fraction(CORRECTION)*2

6  ;start of left delay line
7  move #@_delayleft,nCIRCULAR
8  nop
9  lua (rCIRCULAR)+nCIRCULAR,rCIRCULAR_USE1
10 ;start of right delay line
11 move #@_delayright,nCIRCULAR
12 nop
13 lua (rCIRCULAR)+nCIRCULAR,rCIRCULAR_USE2

14 #if symbolx INLEFT
15    move x:INLEFT,x0
16 #else if number INLEFT
17 #  dcx @_inleft INLEFT
18    move x:@_inleft,x0
19 #else
20 #  error waveguide no interp inleft
21 #endif 22 #if symbolx INRIGHT
23    move x:INRIGHT,x1
24 #else if number INRIGHT
25 #  dcx @_inright INRIGHT
26    move x:@_inright,x1
27 #else
28 #  error waveguide no interp inright
29 #endif 30 #if symbolx LENGTH
31    move x:LENGTH,y0
32 #else if symbolh LENGTH
33 #  dsx @_length 1
34 #  routine1 connection LENGTH,@_length
35    move x:@_length,y0
36 #else if number LENGTH
37 #  dcx @_length LENGTH
38    move x:@_length,y0
39 #else
40 #  error waveguide no interp length
41 #endif 42 ;left input to delay line
43 move x0,CIRCULAR:(rCIRCULAR_USE1)

44 ;right input to delay line
45 move x1,CIRCULAR:(rCIRCULAR_USE2)

46 ;calculate offset
47 move #MAXWG,x0
48 mpy y0,x0,a
49 ;correction
50 move x:@_correcthigh,b
51 move x:@_correctlow,b0
52 sub b,a 53 ;save
54 move a1,nCIRCULAR_USE1
55 move a1,nCIRCULAR_USE2

56 #dsx @_calclength 1
57 move a1,x:@_calclength
58
59 ;read right output
60   move
61 CIRCULAR:(rCIRCULAR_USE1+nCIRCULAR
   _USE1),x1
62 #if symbolx OUTRIGHT
63    move x1,x:OUTRIGHT
64 #else
65 #  error waveguide no interp right output
66 #endif 67 ;read left output
68   move
69 CIRCULAR:(rCIRCULAR_USE2+
```

```
   nCIRCULAR_USE2),x1
70 #if symbolx OUTLEFT
71    move x1,x:OUTLEFT
72 #else
73 #  error waveguide no interp left output
74 #endif
```

Waveguide Linear Interpolation

```
1  ;waveguide_linear_interp
2  #dsc @_delayleft MAXWG
3  #dsc @_delayright MAXWG
4  #dcx @_correcthigh int(CORRECTION)
5  #dcx @_correctlow fraction(CORRECTION)*2

6  ;start of left delay line
7  move #@_delayleft,nCIRCULAR
8  nop
9  lua (rCIRCULAR)+nCIRCULAR,rCIRCULAR_USE1
10 ;start of right delay line
11 move #@_delayright,nCIRCULAR
12 nop
13 lua (rCIRCULAR)+nCIRCULAR,rCIRCULAR_USE2

14 #if sylbolx INLEFT
15    move x:INLEFT,x0
16 #else if number INLEFT
17 #  dcx @_inleft INLEFT
18    move x:@_inleft,x0
19 #else
20 #  error waveguide linear interp inleft
21 #endif 22 #if sylbolx INRIGHT
23    move x:INRIGHT,x1
24 #else if number INRIGHT
25 #  dcx @_inright INRIGHT
26    move x:@_inright,x1
27 #else
28 #  error waveguide linear interp inright
29 #endif 30 #if symbolx LENGTH
31    move x:LENGTH,y0
32 #else if symbolh LENGTH
33 #  dsx @_length 1
34 #  routine1 connection LENGTH,@_length
35    move x:@_length,y0
36 #else if number LENGTH
37 #  dcx @_length LENGTH
38    move x:@_length,y0
39 #else
40 #  error waveguide linear interp length
41 #endif 42 ;left input to delay line
43 move x0,CIRCULAR:(rCIRCULAR_USE1)

44 ;right input to delay line
45 move x1,CIRCULAR:(rCIRCULAR_USE2)

46 ;calculate offset
47 move #MAXWG,x0
48 mpy y0,x0,a
49 ;correction
50 move x:@_correcthight,b
51 move x:@_correctlow,b0
52 sub b,a 53 ;save
54 move a1,nCIRCULAR_USE1
55 move a1,nCIRCULAR_USE2
56 lua
57 (rCIRCULAR_USE1)+nCIRCULAR_USE1,
   rCIRCULAR_USE1
58 lua
59 (rCIRCULAR_USE2)+nCIRCULAR_USE2,
   CIRCULAR_USE2

60 #dsx @_calclength 1
61 move a1,x:@_calclength
```

-continued

PREPROCESSOR CODE SAMPLES
© 1992 KORG

```
62 ;get interpolation
63 move a0,a1
64 lsr a
65 move a1,y0
66 move #1.0,a
67 sub y0,a
68 move a,y1

69 #dsx @_interp0 1
70 move y0,x:@_interp0
71 #dsx @_interp1 1
72 move y1,x:@_interp1
73
74 ;read first right output
75 move CIRCULAR;(rCIRCULAR_USE1)+,x1
76 mpy y1,x1,b 77 ;read next right output
78 move CIRCULAR:(rCIRCULAR_USE 1),x1
79 mac x1,y0,b 80 #if symbolx OUTRIGHT
81    move b,x:OUTRIGHT
82 #else
83 # error waveguide linear interp right output
84 #endif 85 ;read first left output
86 move CIRCULAR:(rCIRCULAR_USE2)+,x1
87 mpy y1,x1,b
88 ;read next left output
89 move CIRCULAR:(rCIRCULAR_USE2),x1
90 mac x1,y0,b 91 #if symbolx OUTLEFT
92    move b,x:OUTLEFT
93 #else
94 # error waveguide linear interp left output
95 #endif
```

Waveguide Allpass Host Interpolation

```
1 ;waveguide allpasshost_interp
2 ;y[n] = f*x[n] + x[n-1]-f*y[n-1]
3 #dsc @_delayleft MAXWG
4 #dsc @_delayright MAXWG
5 #dcx @_correcthigh int(CORRECTION)
6 #dcx @_correctlow fraction(CORRECTION)*2

7 #dsx @_lastinputright 1
8 #dsx @_lastinputleft 1
9 #dsx @_interp 1
10 #dsx @_f 1

11 #routine1 wgCalcAllpass @_interp,@_f

12 ;start of left delay line
13 move #@_delayleft, nCIRCULAR
14 nop
15 lua (rCIRCULAR)+nCIRCULAR,rCIRCULAR_USE1

16 ;start of right delay line
17 move #@_delayright,nCIRCULAR
18 nop
19 lua (rCIRCULAR)+nCIRCULAR,rCIRCULAR_USE2

20 #if symbolx INLEFT
21    move x:INLEFT,x0
22 #else if number INLEFT
23 # dcx @_inleft INLEFT
24    move x:@_inleft,x0
25 #else
26 # error waveguide allpass host interp inleft
27 #endif
28 #if sylbolx INRIGHT
29    move x:INRIGHT,x1
30 #else if number INRIGHT
31 # dcx @_inright INRIGHT
32    move x:@_inright,x1
33 #else
```

-continued

PREPROCESSOR CODE SAMPLES
© 1992 KORG

```
34 # error waveguide allpass host interp inright
35 #endif

36 #if symbolx LENGTH
37    move x:LENGTH,y0
38 #else if symbolh LENGTH
39 # dsx @_length 1
40 # routine1 connection LENGTH,@_length
41    move x:@_length,y0
42 #else if number LENGTH
43 # dcx @_length LENGTH
44    move x:@_length,y0
45 #else
46 # error waveguide allpass host interp length
47 #endif 48 ;left input to delay line
49 move x0,CIRCULAR:(rCIRCULAR_USE1)

50 ;right input to delay line
51 move x1,CIRCULAR:(rCIRCULAR_USE2)

52 ;calculate offset
53 move #MAXWG,x0
54 mpy y0,x0,a

55 ;correction
56 move x:@_correcthigh,b
57 move x:@_correctlow,b0
58 sub b,a

59 ;save
60 move a1,nCIRCULAR_USE1
61 move a1,nCIRCULAR_USE2

62 #dsx @_calclength 1
63 move a1,x:@_calclength
64 ;get interpolation
65 move a0,a1
66 lsr a
67 move a1,x:@_interp 68 ;read right output
69    move
70 CIRCULAR:(rCIRCULAR_USE1+
   nCIRCULAR_USE1),x0

71 #if symbolx OUTRIGHT
72    move x:OUTRIGHT,x1
73 #else
74 # error waveguide allpass host interp output right
75 #endif 76 ;allpass delay calculations
77 move x:@_f,y0
78 move x:@_lastinputright,a
79 move x0,x:@_lastinputright
80 mac y0,x0,a
81 mac -x1,y0,a 82 #if symbolx OUTRIGHT
83    move a,x:OUTRIGHT
84 #else
85 # error waveguide allpass host interp output right
86 #endif 87 ;read left output
88    move
89 CIRCULAR:(rCIRCULAR_USE2+
   nCIRCULAR_USE2),x0

90 #if symbolx OUTLET
91    move x:OUTLEFT,x1
92 #else
93 # error waveguide allpass host interp output left
94 #endif 95 ;allpass delay calculations
96 move x:@_lastinputleft,a
97 move x0,x:@_lastinputleft
```

PREPROCESSOR CODE SAMPLES
© 1992 KORG

```
98  mac y0,x0,a
99  mac -x1,y0,a
100 #if symbolx OUTLEFT
101    move a,x:OUTLEFT
102 #else
103 # error waveguide allpass host interp output left
104 #endif
```

Waveguide Allpass Table Interpolation

```
1  ;waveguide_allpasstable_interp
2  ;y[n] = f*x[n] + x[n-1] - f*y[n-1]
3  #dsc @_delayleft MAXWG
4  #dsc @_delayright MAXWG
5  #dcx @_correcthigh int(CORRECTION)
6  #dcx @_correctlow fraction(CORRECTION)*2

7  #dsx @_lastinputright 1
8  #dsx @_lastinputleft 1

9  #if ! symboll wgAllpassTable
10 # tablel wgAllpassTable allpass
11 #endif

12 ;start of left delay line
13 move #@_delayleft,nCIRCULAR
14 nop
15 lua (rCIRCULAR)+nCIRCULAR,rCIRCULAR_USE1

16 ;start of right delay line
17 move #@_delayright,nCIRCULAR
18 nop
19 lua (rCIRCULAR)+nCIRCULAR,rCIRCULAR_USE2

20 #if symbolx INLEFT
21    move x:INLEFT,x0
22 #else if number INLEFT
23 # dcx @_inleft INLEFT
24    move x:@_inleft,x0
25 #else
26 # error waveguide allpass table interp inleft
27 #endif 28 #if symbolx INRIGHT
29    move x:INRIGHT,x1
30 #else if number INRIGHT
31 # dcx @_inright INRIGHT
32    move x:@_inright,x1
33 #else
34 # error waveguide allpass table interp inright
35 #endif 36 #if symbolx LENGTH
37    move x:LENGTH,y0
38 #else if symbolh LENGTH
39 # dsx @_length 1
40 # routine1 connection LENGTH,@_length
41    move x:@_length,y0
42 #else if number LENGTH
43 # dcx @_length LENGTH
44    move x:@_length,y0
45 #else
46 # error waveguide allpass table interp length
47 #endif 48 ;left input to delay line
49 move x0,CIRCULAR:(rCIRCULAR USE1)

50 ;right input to delay line
51 move x1,CIRCULAR:(rCIRCULAR_USE2)

52 ;calculate offset
53 move #MAXWG,x0
54 mpy y0,x0,a

55 ;correction
56 move x:@_correcthigh,b
57 move x:@_correctlow,b0
58 sub b,a

59 ;save
60 move a1,nCIRCULAR_USE1
61 move a1,nCIRCULAR_USE2

62 #dsx @_calclength 1
63 move a1,x:@_calclength 64
65 ;get interpolation
66 move a0,a1
67 lsr a 68 #dsx @_interp 1
69 move a1,x:@_interp
70 ;get allpass coefficient
71 ;assume all tables length 1024
72 move a1,x0
73 move #$400,y0
74 mpy y0,x0,a 75 ;mask
76 move #$3ff,x1
77 and x1,a 78 ;lookup without interpolation
79 move #LINEAR_ADDRESS+wgAllpassTable,r0
80 move a1,n0
81 nop
82 move LINEAR:(r0+n0),y0

83 #dsx @_f1
84 move y0,x:@_f

85 ;read right output
86    move
87 CIRCULAR:(rCIRCULAR_USE1+
     nCIRCULAR_USE1),x0

88 #if symbolx OUTRIGHT
89    move x:OUTRIGHT,x1
90 #else
91 # error waveguide allpass table interp output right
92 #endif 93 ;allpass delay calculations
94 move x:@_lastinputright,a
95 move x0,x;@_lastinputright
96 mac y0,x0,a
97 mac -x1,y0,a 98 #if symbolx OUTRIGHT
99    move a,x:OUTRIGHT
100 #else
101 # error waveguide allpass table interp output right
102 #endif 103 ;read left ouptput
104   move
105 CIRCULAR:(rCIRCULAR_USE2+
     nCIRCULAR_USE2),x0
106 #if symbolx OUTLEFT
107    move x:OUTLEFT,x1
108 #else
109 # error waveguide allpass table interp output left
110 #endif 111 ;allpass delay calculations
112 move x:@_lastinputleft,a
113 move x0,x:@_lastinputleft
114 mac y0,x0,a
115 mac -x1,y0,a 116 #if symbolx OUTLEFT
117    move a,x:OUTLEFT
118 #else
119 # error waveguide allpass table interp output left
120 #endif
```

Junction (col. 3, row 5)

```
1 ;junction
2 #if @* == 5
```

PREPROCESSOR CODE SAMPLES
© 1992 KORG

```
 3   junction_invert(@=)
 4  #else if NORMALIZE == TRUE
 5   junction normalize(@=)
 6  #else if @* == 8
 7  #  if (number JUNCTION) && (JUNCTION == 1.0)
 8    junction_two(@=)
 9  #  else
10    junction_regular(@=)
11  #  endif
12  #else
13   junction_regular(@=)
14  #endif
```

Junction Invert

```
 1  ;junction invert
 2  #if symbolx INPUT
 3   move x:INPUT,a
 4  #else if number INPUT
 5  #  dcx @_input INPUT
 6    move x:@_input,a
 7  #else
 8  #  error junction invert input
 9  #endif 10  ;invert
11   neg a 12  #if symbolx OUTPUT
13    move a,x:OUTPUT
14  #else
15  #error junction invert output
16  #endif
```

Junction Two

```
 1  ;junction two
 2  #if number ADMITTANCE1 && number ADMITTANCE2
 3  ;constant admittances
 4   move
 5   #(ADMITTANCE1-ADMITTANCE2)/
     (ADMITTANCE1+ADMITTANCE2),x1
 6  #else
 7  ;varying admittances
 8  #  dsx @_k 1
 9  #  routine2 junctionCalcTwo
10    @_k,ADMITTANCE1,ADMITTANCE2
11    move x:@_k,x1
12  #endif 13  #if symbolx INPUT1
14    move x:INPUT2,x0
15  #else if number INPUT1
16  #  dcx @_input1 INPUT1
17    move x:@_input1,x0
18  #else
19  #  error junction two input1
20  #endif 21  #if symbolx INPUT2
22    move x:INPUT2,y0
23  #else if number INPUT2
24  #  dcx @_input2 INPUT2
25    move x:@_input2,y0
26  #else
27  #  error junction two input2
28  #endif 29  ;scale (input1-input2) by k
30   move x0,a
31   sub y0,a
32   move a,y1
33   mpy y1,x1,a 34  ;output1
35   move a,b
36   add y0,b 37  #if symbolx OUTPUT1
38    move b,x:OUTPUT1
39  #else
40  #  error junction two output1
41  #endif 42  ;output2
43   move a,b
44   add x0,b 45  #if symbolx OUTPUT2
46    move b,x:OUTPUT2
47  #else
48  #  error junction two output2
49  #endif
```

Junction Regular

```
 1  ;junction regular
 2  #define FIXED yeah
 3  #define SUM 0.0
 4  #for INDEX=2,@*,3
 5  #  if notnumber @[INDEX+2]
 6  #    undefine FIXED
 7  #  else
 8  #    redefine SUM SUM+@[INDEX+2]
 9  #  endif
10  #endfor 11  #if notdefined FIXED
12  ;not fixed
13  #  dsx @_alpha 10
14  #  routine2 junctionCalcReg @_alpha,@=
15  #else
16  ;fixed
17  #endif
18  #define MPY mpy
19  #for INDEX=2,@*,3
20  ;calculate pj
21  #if symbolx @[INDEX]
22    move x:@[INDEX],x0
23  #else if number @[INDEX]
24  #  dcx @_inputINDEX @[INDEX]
25    move x:@_inputINDEX,x0
26  #else
27  #  error junction regular input
28  #endif 29  ;get alpha
30  #if defined FIXED
31    move #@[INDEX+2]/(SUM),y0
32  #else
33    move x:@_alpha+(INDEX-2)/3,y0
34  #endif 35  ;scale by alpha
36   MPY y0,x0,a
37  #redefine MPY mac
38  #endfor
39  #undefine MPY 40  ;scale up by two
41   asl a 42  #if symbolx JUNCTION
43    move x:JUNCTION,y0
44  #  define DO_JUNCTION yes
45  #else if symbolh JUNCTION
46  #  dsx @_junction 1
47  #  routine1 connection JUNCTION,@_junction
48    move x:@_junction,y0
49  #  define DO_JUNCTION yes
50  #else if number JUNCTION
51  #  if JUNCTION !=1.0
52  #    dcx @_junction JUNCTION
53    move x:@_junction,y0
54  #    define DO_JUNCTION yes
55  #  endif
56  #else
57  #  error junction regular junction
58  #endif
59  #if defined DO_JUNCTION
60  #  undefine DO_JUNCTION
61  ;scale by junction
62    move a,x0
63    mpy y0,x0,a
```

PREPROCESSOR CODE SAMPLES
© 1992 KORG

```
64  #endif

65  #for INDEX=2,@*,3
66  ;calculate output
67  #if symbolx @[INDEX]
68    move x:@[INDEX],x0
69  #else if number @[INDEX]
70    move x:@_inputINDEX,x0
71  #else
72  # error junction regular input
73  #endif 74  move a,b
75  sub x0,b
76  #if symbolx @[INDEX+1]
77    move b,x:@[INDEX+1]
78  #else
79  # error junction regular output
80  #endif
81  #endfor 82  #undefine FIXED
83  #UNDEFINE SUM
```

Junction2 (col. 4, row 5)

```
1   ;junction2
2   #if symbolx REFLECTION
3     move x:REFLECTION,x1
4   #else if symbolh REFLECTION
5   # dsx @_reflection 1
6   # routine1 connection REFLECTION,@_reflection
7     move x:@_reflection,x1
8   #else if number REFLECTION
9   # dcx @_reflection REFLECTION
10    move x:@_reflection,x1
11  #else
12  # error junction2 reflection
13  #endif
14  #if symbolx INPUT1
15    move x:INPUT2,x0
16  #else if number INPUT1
17  # dcx @_input1 INPUT1
18    move x:@_input1,x0
19  #else
20  # error junction2 input1
21  #endif 22  #if symbolx INPUT2
23    move x:INPUT2,y0
24  #else if number INPUT2
25  # dcx @_input2 INPUT2
26    move x:@_input2,y0
27  #else
28  # error junction2 input2
29  #endif 30  ;scale (input1-input2) by reflection
31  move x0,a
32  sub y0,a
33  move a,y1
34  mpy y1,x1,a 35  ;output1
36  move a,b
37  add y0,b 38  #if symbolx OUTPUT1
39    move b,x:OUTPUT1
40  #else
41  # error junction2 output1
42  #endif 43  ;output2
44  move a,b
45  add x0,b 46  #if symbolx OUTPUT2
47    move b,x:OUTPUT2
48  #else
49  # error junction2 output2
50  #endif
```

Reed (col. 5, row 5)

```
1   ;reed
2   #dsl TABLE LENGTH
3   #if symbolx INPUT
4     move x:INPUT,a
5   #else if symbolh INPUT
6   # dsx @_input 1
7   # routine1 connection INPUT,@_input
8     move x:@_input,a
9   #else if number INPUT
10  # dcx @_input INPUT
11    move x:@_input,a
12  #else
13  # error reed input
14  #endif 15  #if symbolx BREATH
16    move x:BREATH,b
17  #else if symbolh BREATH
18  # dsx @_breath 1
19  # routine1 connection BREATH,@_breath
20    move x:@_breath,b
21  #else if number BREATH
22  # dcx @_breath BREATH
23    move x:@_breath,b
24  #else
25  # error reed breath
26  #endif
27  ;breath/2
28  asr b 29  ;calculate table input
30  sub b,a
31  move a,x0

32  ;assume all tables length 1024
33  move #$200,y1
34  mpy x0,y1,a

35  ;invert most significant bit
36  eor y1,a

37  ;mask
38  move #$3ff,x1
39  and x1,a
40  ;lookup without interpolation
41  move #LINEAR_ADDRESS+TABLE,r0
42  move a1,n0
43  nop
44  move LINEAR:(r0+n0),y0

45  ;output
46  jmpy y0,x0,a
47  add b,a

48  #if symbolx OUTPUT
49    move a,x:OUTPUT
50  #else
51  # error reed output
52  #endif
```

Bow (col. 6, row 5)

```
1   ;bow
2   #dsl TABLE LENGTH
3   #if symbolx INPUTL
4     move x:INPUTL,x0
5   #else if symbolh INPUTL
6   # dsx @_inputl 1
7   # routine1 connection INPUTL,@_inputl
8     move x:@_inputl,x0
9   #else if number INPUTL
10  # dcx @_inputl INPUTL
11    move x:@_inputl,x0
12  #else
13  # error bow inputl
14  #endif 15  #if symbolx INPUTR
16    move x:INPUTR,y0
```

PREPROCESSOR CODE SAMPLES
© 1992 KORG

```
17  #else if symbolh INPUTR
18  #  dsx @_inputr 1
19  #  routine1 connection INPUTR,@_inputr
20     move x:@_inputr,y0
21  #else if number INPUTR
22  #  dcx @_inputr INPUTR
23     move x:@_inputr,y0
24  #else
25  #  error bow inputr
26  #endif
27  #if symbolx VELOCITY
28     move x:VELOCITY,a
29  #else if symbolh VELOCITY
30  #  dsx @_velocity 1
31  #  routine1 connection VELOCITY,@_velocity
32     move x:@_velocity,a
33  #else if number VELOCITY
34  #  dcx @_velocity VELOCITY
35     move x:@_velocity,a
36  #else
37  #  error bow velocity
38  #endif 39  ;calculate table input
40  sub x0,a
41  sub y0,a
42  move a,x1

43  ;assume all tables length 1024
44  move #$200,y1
45  mpy y1,x1,a

46  ;invert most significant bit
47  eor y1,a

48  ;mask
49  move #$3ff,y1
50  and y1,a

51  ;lookup without interpolation
52  move #LINEAR_ADDRESS+TABLE,r0
53  move a1,n0
54  nop
55  move LINEAR:(r0+n0),y1

56  ;scale table output
57  mpy y1,x1,a
58  #if symbolx PRESSURE
59     move x:PRESSURE,y1
60  #else if symbolh PRESSURE
61  #  dsx @_pressure 1
62  #  routine1 connection PRESSURE,@_pressure
63     move x:@_pressure,y1
64  #else if number PRESSURE
65  #  dcx @_pressure PRESSURE
66     move x:@_pressure,y1
67  #else
68  #  error bow pressure
69  #endif 70  ;scale by pressure
71  move a,x1
72  mpy y1,x1,a 73  ;output left
74  move a,b
75  add y0,a 76  #if symbolx OUTPUTL
77     move a,x:OUTPUTL
78  #else
79  #  error bow outputl
80  #endif 81  ;output right
82  add x0,b 83  #if symbolx OUTPUTR
84     move b,x:OUTPUTR
85  #else
86  #  error bow outputr
87  #endif Brass (col. 1, row 6)
1   ;brass
2   ;x = (1.0-mix)*input + mix*lips
3   ;output = x * (x + offset)
4   #if symbolx INPUT
5      move x:INPUT,x0
6   #else if number INPUT
7   #  dcx @_input INPUT
8      move x:@_input,x0
9   #else
10  #  error brass input
11  #endif 12  #if symbolx LIPS
13     move x:LIPS,a
14  #else if symbolh LIPS
15  #  dsx @_lips 1
16  #  routine1 connection LIPS,@_lips
17     move x:@_lips,a
18  #else if number LIPS
19  #  dcx @_lips LIPS
20     move x:@_lips,a
21  #else
22  #  error brass lips
23  #endif 24  #if symbolx MIX
25     move x:MIX,y0
26  #else if symbolh MIX
27  #  dsx @_mix 1
28  #  routine1 connection MIX,@_mix
29     move x:@_mix,y0
30  #else if number MIX
31  #  dcx @_mix MIX
32     move x:@_mix,y0
33  #else
34  #  error brass mix
35  #endif 36  #if symbolx OFFSET
37     move x:OFFSET,y1
38  #else if symbolh OFFSET
39  #  dsx @_offset 1
40  #  routine1 connection OFFSET,@_offset
41     move x:@_offset,y1
42  #else if number OFFSET
43  #  dcx @_offset OFFSET
44     move x:@_offset,y1
45  #else
46  #  error brass offset
47  #endif
48  ;x = (1.0-mix)*input + mix*lips
49  ;x = input + mix*(lips-input)
50  sub x0,a
51  move a,x1
52  mpy x1,y0,a
53  add x0,a
54  move a,y0

55  ;x + offset
56  add y1,a
57  move a,x0

58  ;output
59  mpy y0,x0,a

60  #if symbolx OUTPUT
61     move a,x:OUTPUT
62  #else
63  08#  error brass output
64  #endif
```

CONCLUSION

The present invention provides a workstation for developing music synthesizer sounds using a graphical programming engine. The programming engine is a powerful, flexible program for digital audio synthesis. Sounds are created by linking together a number of specialized signal processing elements. By operating in a digital domain, the programming engine is extremely malleable, capable of familiar synthesis techniques and new ones, including FM, subtractive, additive, wave guide modeling, and resonant filter excitation. Further, the engine can grow with the developing art of music synthesizers.

A powerful tool for composing a sound generating program, and for executing the results of that program in real time has been provided. This greatly improves the accessibility of this computational technique for synthesizing sounds to musicians in the field by relieving them of the burdens of fully understanding the computer programming languages involved in various synthesizers. It also provides for composing a portable specification of a model using an object oriented programming approach that can provide an easy to understand basis for communicating algorithms among users, and for implementing a portable sound generation program.

Finally, by providing real time operation of these programs with the system that includes the graphic programming tool, the development of the models of the sound generating programs is greatly improved. The developer of a model can listen to the results of modifications of the model in real time, providing effective feedback for the development process.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. The embodiments were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

What is claimed is:

1. An apparatus for generating sound, comprising:
   a user input to supply input data;
   graphical programming engine, coupled with the user input, to generate and connect graphic symbols into a graphical model representative of a sound generating program in response to the input data;
   a display, coupled with the graphical programming engine, to display the graphical model;
   a translation engine, coupled with the graphical programming engine, which translates the graphical model into a sound generating program for execution; and
   a processor, coupled with the user input and the translation engine, to process input data in real time according to the sound generating program to generate output data representative of sound.

2. The apparatus of claim 1, wherein the translation engine includes:
   resources to produce a first portion of the sound generating program including routines synchronous with the output data representative of sound; and
   resources to produce a second portion of the sound generating program including routines asynchronous of the output data representative of sound.

3. The apparatus of claim 2, wherein the processor includes a first processor synchronized with the output data representative of sound for executing the first portion of the sound generating program, and a second processor asynchronous with the first processor for executing the second portion of the sound generating program.

4. The apparatus of claim 1, wherein the translation engine includes:
   resources to produce a first portion of the sound generating program including routines synchronous with the output data representative of sound; and
   resources to produce a second portion of the sound generating program including routines asynchronous of the output data representative of sound; and
   resources to produce a third portion of the sound generating program for connecting data generated in the second portion to locations accessed by routines in the first portion of the sound generating program.

5. The apparatus of claim 1, wherein the user input includes a first instrument port for supplying input data to the graphical programming engine, and a second instrument port for supplying input data to the processor.

6. The apparatus of claim 1, wherein the user input includes an alphanumeric keyboard port, and a port for a position indicating means for supplying input data to the graphical programming means.

7. The apparatus of claim 1, wherein the user input includes an instrument port for supplying MIDI standard input data for supply to the processing means.

8. The apparatus of claim 1, wherein the graphic symbols in the graphical programming engine include a set of function symbols, and the translation engine includes;
   a set of function code segments corresponding to the function symbols;
   a preprocessor, responsive to the graphic model, which selects function code blocks from the set and establishes connections for communication of data between the function code blocks; and
   a compiler to compile an executable sound generating program in response to the connected function code blocks.

9. The apparatus of claim 1, further including:
   a converter, coupled with the processor, which converts the output data into sound.

10. The apparatus of claim 1, wherein the graphic symbols in the graphical programming engine includes:
    a set of function symbols representative of function code blocks; and
    at least one external data source symbol representative of a source of input data for the sound generating program.

11. The apparatus of claim 10, wherein the graphic symbols in the graphical programming engine further include:

at least one controllable data source symbol representative of input data having a controllable value selected by user input data; and the graphical programming engine includes means for manipulating the controllable data source symbol to select a parameter for the sound generating program.

12. The apparatus of claim 10, wherein the graphical programming engine includes means for editing parameters of the function code block corresponding to a graphic symbol in the graphical model.

13. The apparatus of claim 1, wherein the graphical programming engine includes means for indicating an order of execution in association with the graphic symbols.

14. The apparatus of claim 1, wherein the processor includes a host data processor and a digital signal processor.

15. The apparatus of claim 14, wherein the sound generating program includes modules executed by the digital signal processor, and modules executed by the host data processor.

16. The apparatus of claim 11, wherein the graphical programming engine further includes:

means for displaying a graphical representation of a control panel including icons corresponding to controllable data source symbols included in the graphical model.

17. An apparatus for generating sound, comprising:
a user input to supply input data;
a host data processor;
a graphical programming engine, coupled with the user input and the host data processor, to generate and connect graphic symbols into a graphical model representative of a sound generating program in response to the input data;
a display, coupled with the graphical programming engine and the host data processor, to display the graphical model;
a signal processor coupled with the host data processor;
a translation engine, coupled with the graphical programming engine, to translate the graphical model into a sound generating program for execution by a combination of the signal processor and the host data processor; and
an execution, engine, coupled with the user input and the translation engine, to cause real time execution by the signal processor and the host data processor, in response to input data, of the sound generating program to generate output data representative of sound.

18. The apparatus of claim 17, wherein the translation engine includes:

resources to produce a first portion of the sound generating program for execution by the signal processor synchronously with the output data representative of sound;
resources to produce a second portion of the sound generating program for execution by the host data processor asynchronously relative to the output data representative of sound; and
resources to produce a third portion of the sound generating program for connecting the first portion and the second portion.

19. The apparatus of claim 17, wherein the user input includes a first instrument port for supplying input data to the graphical programming means, and a second instrument port for supplying input data to the execution means.

20. The apparatus of claim 17, wherein the user input includes an alphanumeric keyboard pod, and a port for a position indicating means for supplying input data to the graphical programming means.

21. The apparatus of claim 17, wherein the user input includes an instrument port for supplying MIDI standard input data for supply to the execution engine.

22. The apparatus of claim 17, wherein the graphic symbols in the graphical programming engine includes a set of function symbols, and the translation engine includes;

a set of function code segments corresponding to the function symbols;
preprocessing resources, responsive to the graphic model, which select function code segments from the set and establish connections for communication of data between the function code segments; and
compiling resources which compile an executable sound generating program in response to the connected function code blocks, the sound generating program including objects executed by the host data processor and objects executed by the signal processor.

23. The apparatus of claim 17, further including:
a converter, coupled with the execution engine, which converts the output data into sound.

24. The apparatus of claim 17, wherein the graphic symbols in the graphical programming engine include:
a set of function symbols representative of function code segments; and
at least one external data source symbol representative of a source of input data for the sound generating program.

25. The apparatus of claim 24, wherein the graphic symbols in the graphical programming engine further include:

at least one controllable data source symbol representative of input data having controllable values selected by user input data; and the graphical programming engine includes
resources to manipulate the controllable data source symbol to select a parameter for the sound generating program.

26. The apparatus of claim 25, wherein the graphical programming engine includes means for editing parameters of the function code segment corresponding to a graphic symbol in the graphical model.

27. The apparatus of claim 17, wherein the graphical programming engine includes means for indicating an order of execution in association with the graphic symbols.

28. The apparatus of claim 25, wherein the graphical programming engine further includes:
means for displaying on the display a graphical representation of a control panel including icons corresponding to controllable data source symbols included in the graphical model.

29. An apparatus for developing a sound generating program, comprising:
a user input to supply input data;
graphical programming engine, coupled with the user input and including a set of graphical function symbols, to generate and connect graphic function symbols into a graphical model representative of a sound generating program in response to input data, the set of graphical function symbols including a symbol for a real time output function that supplies output data and a symbol for a real time input function that receives at least a portion of the input data;

a display, coupled with the graphical programming engine, to display the graphical model;

translation resources coupled with the graphical programming engine, to translate the graphical model into an ordered list of object names with associated parameters specifying a sound generating program.

30. The apparatus of claim 29, further including:

means, coupled with the translation resources, for producing a first portion of the sound generating program in response to the ordered list including routines synchronous with the output data representative of sound; and means coupled with the translation resources, for producing a second portion of the sound generating program in response to the ordered list including routines asynchronous of the output data representative of sound.

31. The apparatus of claim 30, further including a first processor synchronized with the output data representative of sound to execute the first portion of the sound generating program, and a second processor synchronous with the first processor to execute the second portion of the sound generating program.

32. The apparatus of claim 29, further including:

means, coupled with the translation resources, for producing a first portion of the sound generating program in response to the ordered list including routines synchronous with the output data representative of sound;

means, coupled with the translation resources, for producing a second portion of the sound generating program in response to the ordered list including routines asynchronous of the output data representative of sound; and means, coupled with the translation resources, for generating a third portion of the sound generating program in response to the ordered list for connecting data generated in the second portion to locations accessed by routines in the first portion of the sound generating program.

33. The apparatus of claim 29, further including:

a set of function code segments corresponding to the object names;

a preprocessor, responsive to the ordered list, to select function code segments from the set and establishing connections for communication of data between the function code segments;

a compiler to compile an executable sound generating program in response to the connected function code blocks;

execution means, coupled with the user input and the compiler, for executing the sound generating program in real time to generate output data representative of sound; and a converter, coupled with the execution means, to convert the output data into sound to provide real time feedback to a user developing a model.

34. An apparatus for generating sound, comprising:
user input means for supplying input data;
a host data processor;
graphical programming means, coupled with the user input means and the host data processor and including a set of function symbols, for selecting and connecting function symbols into a graphical model representative of a sound generating program in response to the input data;

display means, coupled with the graphical programming means and the host data processor, for displaying the graphical model;

a signal processor coupled with the host data processor;

means, coupled with the graphical programming means, for translating the graphical model into an ordered list of object names with associated parameters specifying a sound generating program;

a set of function code segments corresponding to the object names;

preprocessing means, responsive to the ordered list, for selecting function code segments from the set and establishing connections for communication of data between the function code segments;

compiling means for compiling an executable sound generating program in response to the connected function code blocks; and execution means, coupled with the user input means and the means for translating, for causing execution by the signal processor of a first portion of the sound generating program in real time to generate output data representative of sound, in response to input data, and execution by the host data processor of a second portion of the sound generating program asynchronously with the first portion for supplying input data to the first portion.

35. The apparatus of claim 34, wherein the graphical programming means includes means for editing parameters of the function code segment corresponding to a graphic symbol in the graphical model.

36. The apparatus of claim 34, wherein the graphical programming means includes means for indicating an order of execution in association with the graphic symbols.

37. The apparatus of claim 34, wherein the user input means include a first instrument for supplying input data to the graphical programming means, and a second instrument for supplying input data to the execution means.

38. The apparatus of claim 34, wherein the user input means include an alphanumeric keyboard, and a position indicating means for supplying input data to the graphical programming means.

39. The apparatus of claim 34, wherein the user input means include an instrument for supplying MIDI standard input data for supply to the execution means.

40. The apparatus of claim 34, wherein the graphic symbols in the graphical programming means further include:

at least one external data source symbol representative of a source of input data for the sound generating program.

41. The apparatus of claim 34, wherein the graphic symbols in the graphical programming means include:

at least one controllable data source symbol representative of input data having a controllable value selected by user input data; and the graphical programming means includes means for manipulating the controllable data source symbol to select a parameter for the sound generating program.

42. The apparatus of claim 41, wherein the graphical programming means further includes:

means for displaying a graphical representation of a control panel including icons corresponding to controllable data source symbols included in the graphical model.

43. A method for developing a model for a sound generating program using a set of graphical symbols representing functional code blocks for processing sound data and tools for interconnecting the graphical symbols on a display, comprising:
  selecting a first graphical symbol from the set;
  positioning the first graphical symbol on the display;
  selecting a second graphical symbol from the set;
  positioning the second graphical symbol on the display;
  connecting an output of the first graphical symbol to an input of the second graphical symbol;
  assigning an order of execution to the selected graphical symbols;
  generating a computer program for generating sound in response to the selected graphical symbols, the connections between the selected graphical symbols and the assigned order; and
  executing the computer program to generate sound to provide feedback concerning the model.

44. A method for developing a sound generating program, comprising:
  providing a set of object names with associated parameters, object names in the set representing a function used in generating sound and the parameters associated with objects in the set representing variables of the associated functions, the set of objects including at least one object representing a synchronous function to be executed synchronously with respect to audio output data, and at least one object representing an asynchronous function to be executed asynchronously with respect to audio output data;
  selecting a subset of the set of objects for execution by the sound generating program, the subset including an object representing a real time audio output function;
  specifying connections among members of the subset to identify sources and destinations of data to be generated by the associated functions;
  specifying an order of execution for the functions associated with members of the subset; and
  setting the parameters for members of the subset to establish an instantiation of the sound generating program.

45. The method of claim 44, wherein the step of selecting includes:
  providing a set of graphical symbols representing the objects in the set of objects;
  selecting a graphical symbols from the set of graphical symbols;
  positioning the graphical symbols on a display.

46. The method of claim 45, wherein the step of specifying connections includes:
  connecting an output of a first one of the selected graphical symbols to an input of a second one of the selected graphical symbols using tools for drawing connections on the display.

47. The method of claim 44, further including:
  generating a computer program for generating sound in response to the selected objects, the connections between the objects and the assigned order;
  executing the computer program to generate sound using the audio output function to provide feedback concerning the model.

48. The method of claim 44, wherein the selected subset includes an object representing a real time input function, and further including:
  generating a computer program for generating sound in response to the selected objects, the connections between the objects and the assigned order;
  executing the computer program in response to data supplied by the real time input function to generate sound.

49. The method of claim 44, wherein the selected subset includes an object representing a real time input function for processing input data supplied by a user asynchronously with respect to the audio output data, and further including:
  generating a computer program for generating sound in response to the selected objects, the connections between the objects and the assigned order; and
  executing the computer program in response to the data supplied to a synchronous function executed synchronously with the audio output data by the real time input function to generate sound.

* * * * *